US011372200B2

(12) United States Patent
Sugiyama

(10) Patent No.: US 11,372,200 B2
(45) Date of Patent: Jun. 28, 2022

(54) IMAGING DEVICE

(71) Applicant: SONY SEMICONDUCTOR SOLUTIONS CORPORATION, Kanagawa (JP)

(72) Inventor: Toshinobu Sugiyama, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 94 days.

(21) Appl. No.: 16/756,171

(22) PCT Filed: Oct. 12, 2018

(86) PCT No.: PCT/JP2018/038042
§ 371 (c)(1),
(2) Date: Apr. 15, 2020

(87) PCT Pub. No.: WO2019/082686
PCT Pub. Date: May 2, 2019

(65) Prior Publication Data
US 2020/0249428 A1 Aug. 6, 2020

(30) Foreign Application Priority Data

Oct. 27, 2017 (JP) .............................. JP2017-208111
Jan. 22, 2018 (JP) .............................. JP2018-008193

(51) Int. Cl.
*G02B 7/34* (2021.01)
*H04N 5/225* (2006.01)
(Continued)

(52) U.S. Cl.
CPC ............. *G02B 7/34* (2013.01); *G02B 27/425* (2013.01); *G03B 13/20* (2013.01); *H04N 5/2254* (2013.01);
(Continued)

(58) Field of Classification Search
None
See application file for complete search history.

(56) References Cited

U.S. PATENT DOCUMENTS 9,233,470 B1 * 1/2016 Bradski ................. B25J 9/1694
10,209,202 B1 * 2/2019 Sullivan ............ G01N 21/8806
(Continued)

FOREIGN PATENT DOCUMENTS

JP 2014-150470 A 8/2014
JP 2017-187471 A 10/2017
(Continued)

OTHER PUBLICATIONS

International Search Report and Written Opinion of PCT Application No. PCT/JP2018/038042, dated Dec. 11, 2018, 09 pages of ISRWO.

*Primary Examiner* — Rebecca A Volentine
(74) *Attorney, Agent, or Firm* — Chip Law Group

(57) ABSTRACT

The present technology relates to an imaging device capable of efficiently separating signals having different characteristics. An image generating unit generates an image of a subject on the basis of pixel signals obtained by performing imaging in a state where light of a predetermined pattern from a structured light (SL) light source is irradiated to projection areas of specific pixels of an imaging unit that images the subject. The present disclosure can be applied to, for example, a camera system including an SL light source and an imaging device.

11 Claims, 34 Drawing Sheets

(51) Int. Cl.
    *G02B 27/42*     (2006.01)
    *G03B 13/20*     (2021.01)
    *H04N 5/232*     (2006.01)

(52) U.S. Cl.
    CPC ..... *H04N 5/2256* (2013.01); *H04N 5/232121* (2018.08)

(56) References Cited

U.S. PATENT DOCUMENTS

| | | | |
|---|---|---|---|
| 2012/0075534 A1* | 3/2012 | Katz | G01S 17/89 348/602 |
| 2014/0055349 A1 | 2/2014 | Itoh | |
| 2015/0256813 A1* | 9/2015 | Dal Mutto | H04N 9/045 348/47 |
| 2016/0188963 A1* | 6/2016 | Kim | H04N 5/23219 382/118 |
| 2017/0070662 A1* | 3/2017 | Honkanen | G03B 21/53 |
| 2017/0180654 A1* | 6/2017 | Swaminathan | H04N 13/254 |
| 2017/0237960 A1* | 8/2017 | Kamm | H04N 5/332 348/46 |
| 2017/0289468 A1 | 10/2017 | Fujii et al. | |
| 2017/0353649 A1* | 12/2017 | Yang | G01S 7/4863 |
| 2018/0010903 A1 | 1/2018 | Takao et al. | |
| 2018/0041718 A1* | 2/2018 | Price | G01S 7/4816 |
| 2018/0073873 A1 | 3/2018 | Takao et al. | |
| 2018/0146186 A1* | 5/2018 | Akkaya | H04N 13/282 |
| 2018/0328855 A1* | 11/2018 | Kido | G01B 11/2545 |
| 2019/0079192 A1* | 3/2019 | Fenton | G01S 17/42 |

FOREIGN PATENT DOCUMENTS

| | | |
|---|---|---|
| WO | 2012/117508 A1 | 9/2012 |
| WO | 2016/157593 A1 | 10/2016 |
| WO | 2016/199518 A1 | 12/2016 |

* cited by examiner

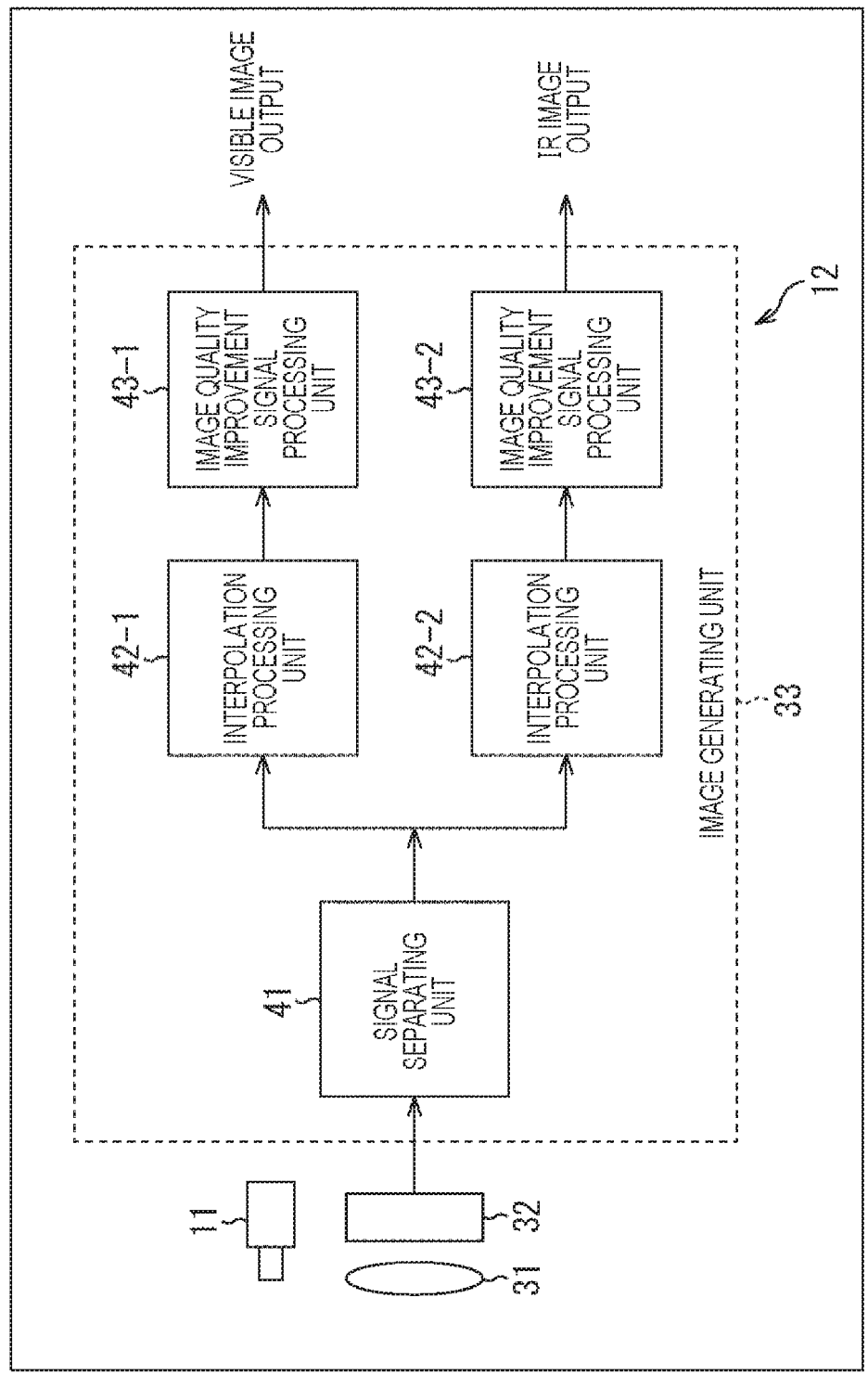

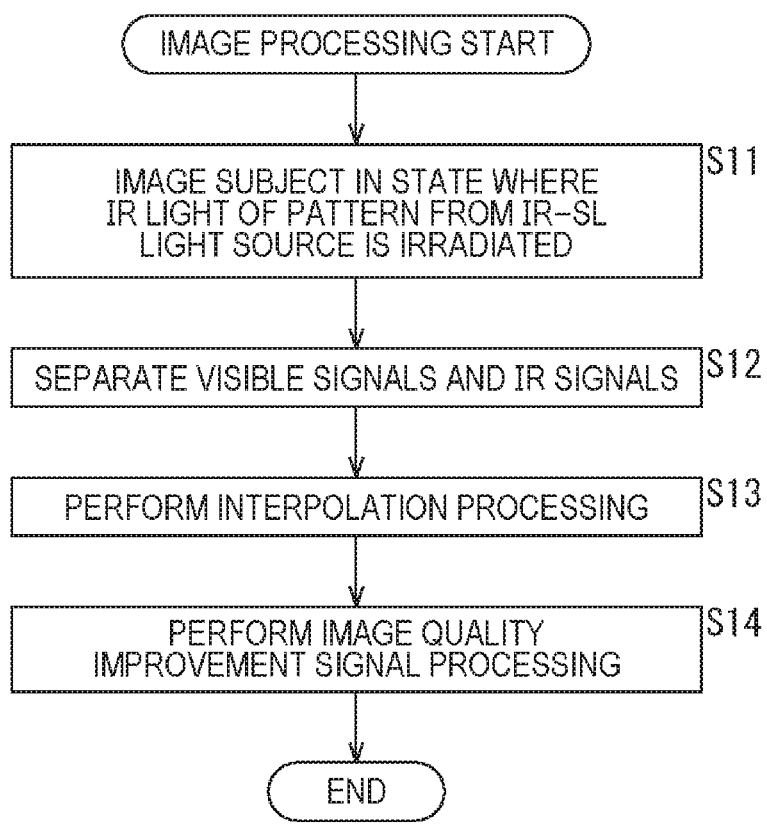

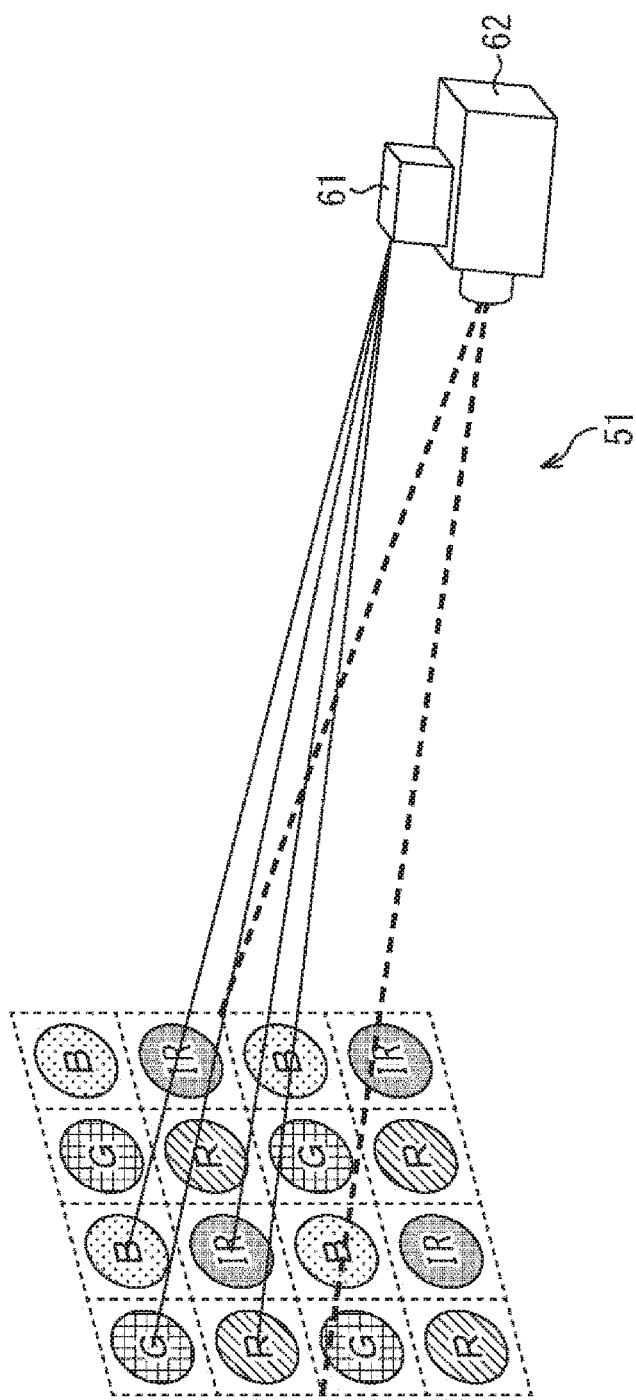

IMAGING DEVICE

CROSS REFERENCE TO RELATED APPLICATIONS

This application is a U.S. National Phase of International Patent Application No. PCT/JP2018/038042 filed on Oct. 12, 2018, which claims priority benefit of Japanese Patent Application No. JP 2018-008193 filed in the Japan Patent Office on Jan. 22, 2018 and claims priority benefit of Japanese Patent Application No. JP 2017-208111 filed in the Japan Patent Office on Oct. 27, 2017. Each of the above-referenced applications is hereby incorporated herein by reference in its entirety.

TECHNICAL FIELD

The present technology relates to an imaging device, and particularly, to an imaging device capable of efficiently separating signals having different characteristics.

BACKGROUND ART

As a technology of object recognition or information sensing used in a surveillance camera system, a security system, an in-vehicle system, a game machine, and the like, a method using an infrared (IR) image in addition to a visible image has been widely used. Conventionally, a combination of a normal image sensor for acquiring the visible image and a dedicated IR sensor for receiving IR light and acquiring the IR image has been mainly used, but recently, an image sensor capable of simultaneously acquiring the visible image and the IR image has been proposed.

Patent Document 1 proposes, for example, that one G pixel of a 2×2 Bayer array is replaced with an IR pixel that transmits only IR light, as the image sensor capable of simultaneously acquiring the visible image and the IR image. The proposal of Patent Document 1 separates the visible signal and the IR signal by performing arithmetic processing on signals from each of R, G, B, and IR pixels, and outputs respective images according to a purpose.

CITATION LIST

Patent Document

Patent Document 1: Japanese Patent Application Laid-Open No. 2014-150470

SUMMARY OF THE INVENTION

Problems to be Solved by the Invention

However, in the proposal of Patent Document 1, in a case where a subject is irradiated with IR light, R, G, and B pixels also receive strong IR light, which has made it difficult to completely separate the visible signal and the IR signal only by arithmetic processing and has caused deterioration in image quality (noise and color reproducibility) of the visible image.

Therefore, in order to acquire a visible image and an IR image with excellent image quality, a method of more efficiently separating the IR light and the visible light has been required.

The present technology has been made in view of such a situation, and can efficiently separate signals having different characteristics.

Solutions to Problems

An imaging device according to an aspect of the present technology includes: an imaging unit that images a subject; and an image generating unit that generates an image of the subject on the basis of pixel signals obtained by performing imaging in a state where light of a predetermined pattern from a structured light (SL) light source is irradiated to projection areas of specific pixels of the imaging unit.

According to an aspect of the present technology, the image of the subject is generated on the basis of the pixel signals obtained by performing the imaging in the state where the light of the predetermined pattern from the SL light source is irradiated to the projection areas of the specific pixels of the imaging unit that images the subject.

Effects of the Invention

According to the present technology, signals having different characteristics can be efficiently separated.

Note that effects described in the present specification are merely examples, and effects of the present technology are not limited to the effects described in the present specification and may have additional effects.

BRIEF DESCRIPTION OF DRAWINGS

FIG. 4 is a block diagram illustrating a configuration example of an imaging device of FIG. 1.

FIG. 5 is a flowchart for describing imaging processing of the camera system of FIG. 1.

FIG. 7 is a diagram illustrating a second configuration example of a camera system to which the present technology is applied.

MODE FOR CARRYING OUT THE INVENTION

Hereinafter, modes for carrying out the present disclosure (hereinafter, referred to as embodiments) will be described. A description will be given in the following order.

1. First Embodiment
2. Second Embodiment
3. Third Embodiment
4. Fourth Embodiment
5. Fifth Embodiment
6. Application example 1
7. Application example 2

First Embodiment

<Configuration Example of Camera System>

Figure 1:
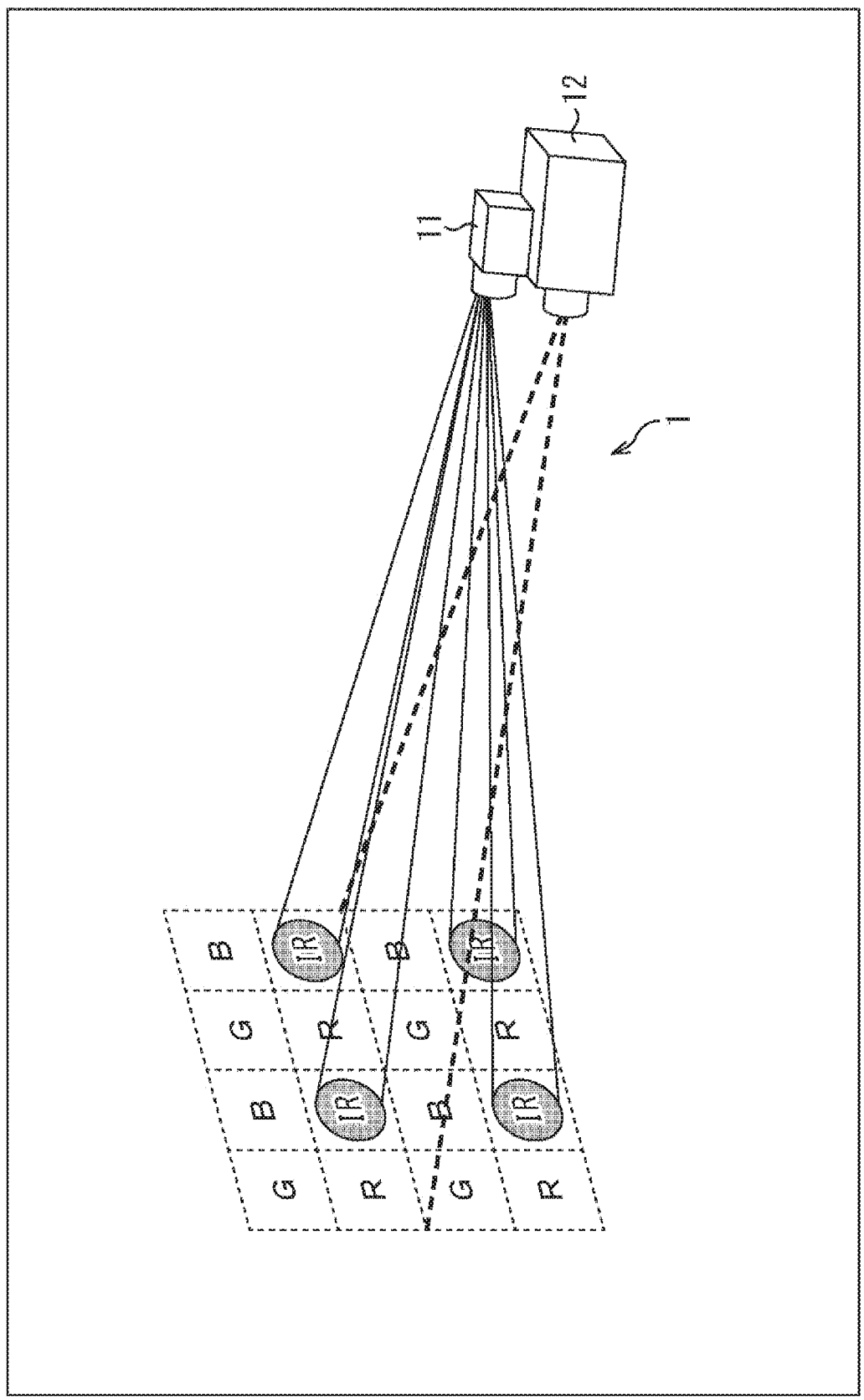
FIG. 1 is a diagram illustrating a first configuration example of a camera system to which the present technology is applied.

FIG. 1 is a diagram illustrating a first configuration example of a camera system to which the present technology is applied. In the camera system according to the present technology, imaging is performed at a position close to a structured light (SL) light source in a state where light of a dot pattern is projected from the SL light source onto projection areas of predetermined pixels.

The camera system 1 of FIG. 1 includes an infrared (IR) light irradiating device 11 as an IR-SL light source and an imaging device 12. In FIG. 1, projection areas of pixels are virtually indicated by broken lines on a plane assumed to be a subject. The projection areas include areas corresponding to a pixel array of an image sensor in the imaging device 12. A character shown in each projection area indicates that a pixel corresponding to each projection area is an R, G, or B pixel, or an IR pixel.

The IR light irradiating device 11 is a device that irradiates IR light, and is fixedly arranged close to the imaging device 12. The IR light irradiating device 11 irradiates IR light of a dot pattern to be irradiated only to projection areas corresponding to the IR pixels. Each dot of the dot pattern is projected as the IR light from the IR light irradiating device 11, as illustrated by a colored circle, onto the projection areas of the IR pixels among the projection areas.

The imaging device 12 includes an image sensor in which R, G, and B pixels, and IR pixels are arranged in a 2×2 matrix shape, as an example. A shutter system of the image sensor may be a rolling shutter system or may be a global shutter system.

Note that in FIG. 1, only projection areas of 4×4 pixels are illustrated and projection areas irradiated with the IR light are four areas, but actually, each dot of the IR light is irradiated to each of more projection areas.

The imaging device 12 images a subject in a state where the IR light of the dot pattern to be irradiated only to the projection areas corresponding to the IR pixels is irradiated by the IR light irradiating device 11. The R, G, and B pixels receive visible light from a predetermined light source. Therefore, in the imaging device 12, a visible image corresponding to signals from the R, G, and B pixels and an IR image corresponding to signals from the IR pixels are generated.

<Principle of Structured Light (SL) Light Source>

Figure 2:
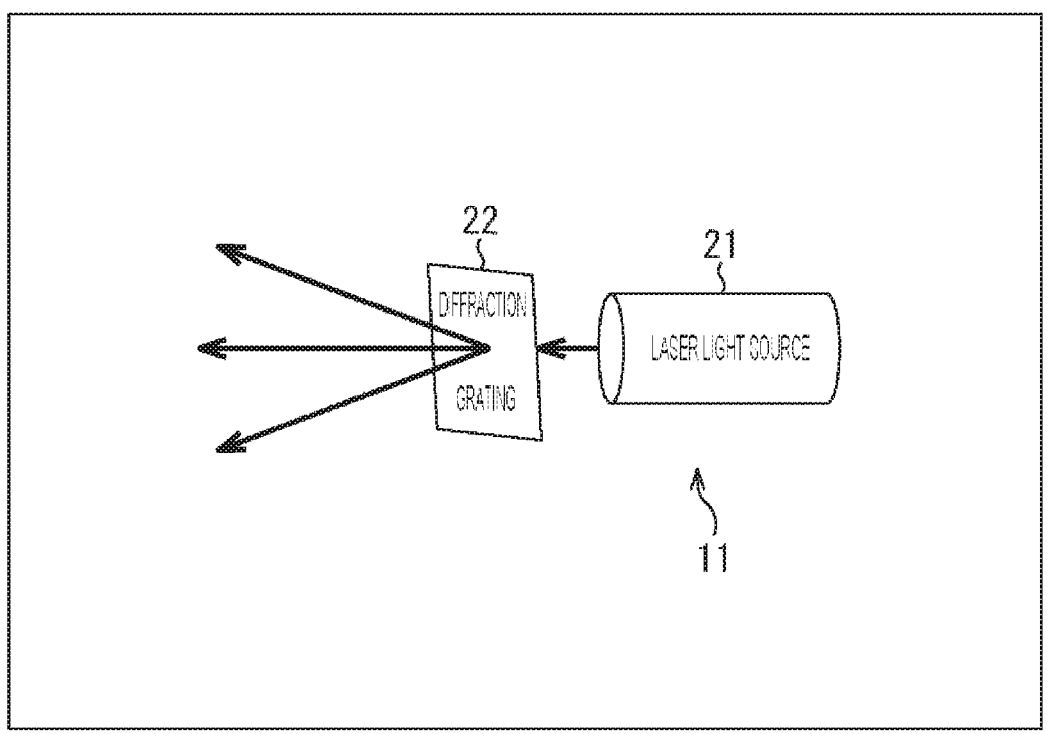
FIG. 2 is a diagram for describing a principle of a structured light (SL) light source.

FIG. 2 is a diagram for describing a principle of an SL light source.

The IR light irradiating device 11 has a configuration in which a diffraction grating 22 is provided in front of a laser light source 21. By appropriately designing the diffraction grating 22, it becomes possible to irradiate arbitrary positions (for example, the projection areas of the IR pixels of FIG. 1) of a matrix shape with the IR light of the dot pattern.

<Relationship Between Angle of View of Imaging Device and Irradiation Angle of IR-SL Light Source>

Figure 3:
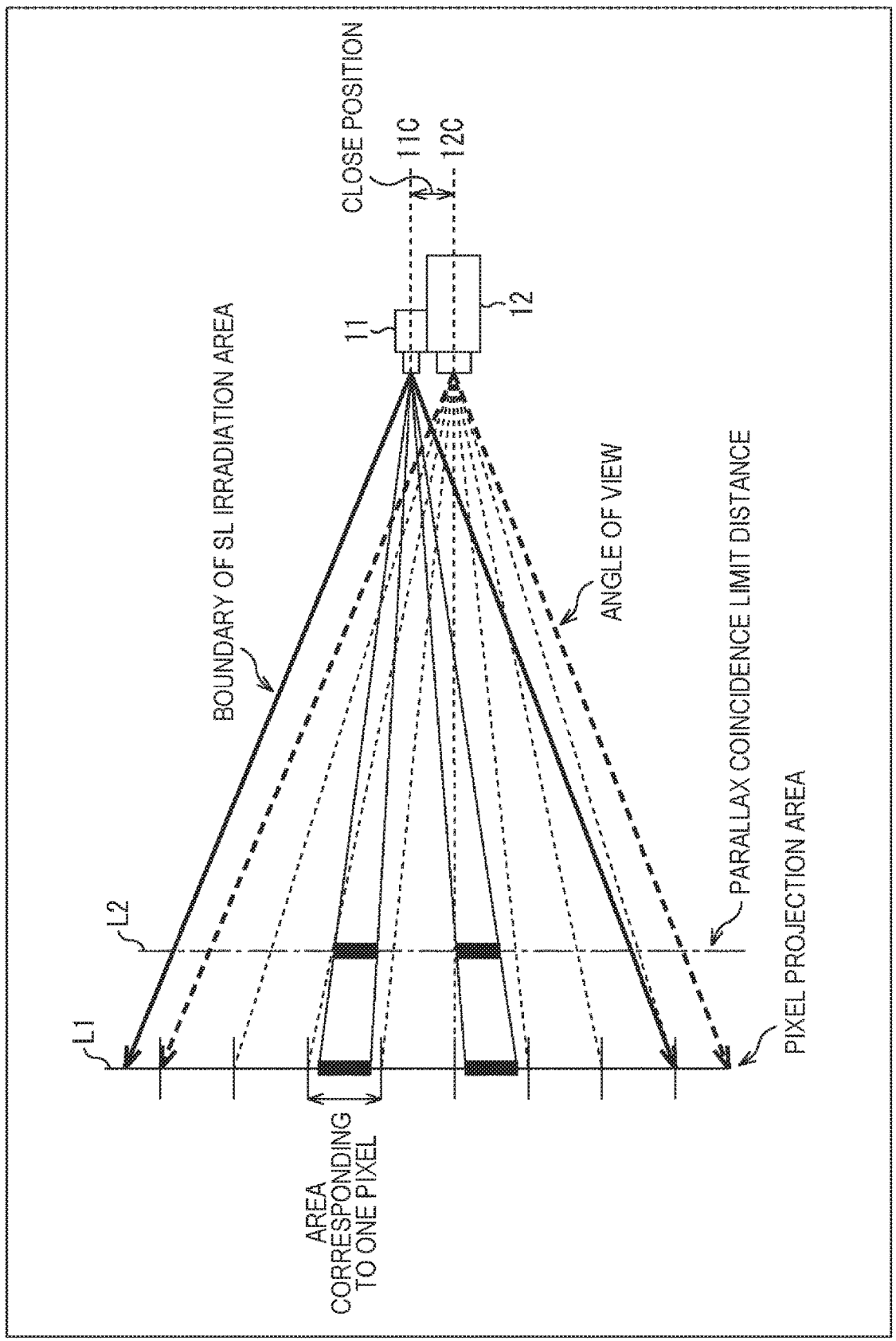
FIG. 3 is a diagram for describing a relationship between an angle of view of an imaging device and an irradiation angle of an infrared (IR)-SL light source.

FIG. 3 is a diagram for describing a relationship between an angle of view of an imaging device and an irradiation angle of an IR-SL light source.

Each solid line within an SL irradiation angle around an optical axis 11C of the IR light irradiating device 11 indicates a boundary of an SL irradiation area, and each broken line within an angle of view around an optical axis 12C of the imaging device 12 indicates a boundary of a pixel area. The SL irradiation area is an area where dots are irradiated from the IR-SL light source to the pixel area. In the camera system 1, the SL irradiation angle of the IR light irradiating device 11 and the angle of view of the imaging device 12 are set to approximately coincide with each other.

A solid line L1 on the left side of FIG. 3 indicates a projection area of the imaging device 12. A range indicated by a bidirectional arrow corresponds to a projection area of one pixel. An alternate long and short dash line L2 on the right side of a pixel projection area indicates a parallax coincidence limit distance. The parallax coincidence limit distance is a distance from the IR light irradiating device 11 and the imaging device 12 as a starting point to a point where a parallax between the IR light irradiating device 11 and the imaging device 12 substantially coincides. Black rectangles on the solid line L1 and on the alternate long and short dash line L2 represent each dot of the dot pattern.

The IR light of the dot pattern from the IR light irradiating device 11 of FIG. 3 is irradiated only to areas corresponding to the IR pixels in the pixel array of the imaging device 12. At that time, the imaging device 12 and the IR light irradiating device 11 are fixed.

Therefore, if a distance is more distant than the parallax coincidence limit distance indicated by the alternate long and short dash line L2 when viewed from the IR light irradiating device 11 and the imaging device 12, the IR light of the dot pattern irradiated from the IR light irradiating device 11 and the pixel projection area of the imaging device 12 do not deviate from each other regardless of a distance of a subject. Therefore, a projection boundary area of the IR pixel and the IR light of the dot pattern correspond to each other in a one-to-one manner. Reflected light of the IR light does not arrive at the R, G, and B pixels, and is received only by the IR pixels.

The parallax coincidence limit distance is about 60 cm, for example, when a pixel size of the image sensor is about 15 um, a focal length of a lens is about 3 mm, a distance difference between the optical axis 11C of the IR light irradiating device 11 and the optical axis 12C of the image sensor (lens) of the imaging device 12 is about 3 mm.

<Configuration Example of Imaging Device>

FIG. 4 is a block diagram illustrating a configuration example of an imaging device. The imaging of the subject in the camera system 1 is performed by the imaging device 12 in a state where the IR light of the dot pattern from the IR light irradiating device 11 as the IR-SL light source is constantly irradiated.

The imaging device 12 includes an optical system 31 such as a lens and the like, an image sensor 32, and an image generating unit 33.

Light from the subject is incident on the image sensor 32 via the optical system 31. The image sensor 32 has a pixel array unit in which R, G, and B pixels, and IR pixels are arranged in a 2×2 matrix shape. The image sensor 32 photoelectrically converts the incident light, and performs A/D conversion on a pixel value of each pixel in the pixel array unit to generate pixel signals.

The image generating unit 33 generates a visible image using signals (visible signals) from the R, G, and B pixels among a plurality of pixels configuring the pixel array unit of the image sensor 32, and outputs the generated visible image to a signal processing unit (not illustrated) of a subsequent stage. Furthermore, the image generating unit 33 generates an IR image using signals (IR signals) from the IR pixels among the plurality of pixels configuring the pixel array unit of the image sensor 32, and outputs the generated IR image to a signal processing unit (not illustrated) of a subsequent stage.

The image generating unit 33 includes a signal separating unit 41, an interpolation processing unit 42-1 and an interpolation processing unit 42-2, and an image quality improvement signal processing unit 43-1 and an image quality improvement signal processing unit 43-2.

The signal separating unit 41 separates the visible signals from the signals of the image sensor 32 and outputs the visible signals to the interpolation processing unit 42-1. Furthermore, the signal separating unit 41 separates the IR signals from the signals of the image sensor 32 and outputs the IR signals to the interpolation processing unit 42-2.

The interpolation processing unit 42-1 generates a visible image by performing interpolation processing such as demosaic processing or the like that generates a pixel signal of a missing color according to an array of the R, G, and B pixels, and supplies the visible image to the image quality improvement signal processing unit 43-1.

The interpolation processing unit 42-2 generates an IR image by performing interpolation processing of the IR signals, and outputs the IR image to the image quality improvement signal processing unit 43-2.

The image quality improvement signal processing unit 43-1 performs image quality improvement processing of the visible image, and outputs the visible image after the image quality improvement processing.

The image quality improvement signal processing unit 43-2 performs image quality improvement processing of the IR image, and outputs the IR image after the image quality improvement processing.

<Operation of Camera System>

Next, imaging processing of the imaging device 12 will be described with reference to a flowchart of FIG. 5.

In step S11 of FIG. 5, the image sensor 32 images the subject in a state where the IR light of the dot pattern from the IR light irradiating device 11 is irradiated. The image sensor 32 photoelectrically converts the incident light, and performs the A/D conversion on the pixel value of each pixel in the pixel array unit to generate the pixel signals.

In step S12, the signal separating unit 41 separates the visible signals and the IR signals from the signals from the image sensor 32. The separated visible signals are output to the interpolation processing unit 42-1, and the separated IR signals are output to the interpolation processing unit 42-2.

In step S13, the interpolation processing unit 42-1 generates the visible image by performing the interpolation processing of the visible signals. Furthermore, the interpolation processing unit 42-2 generates the IR image by performing the interpolation processing of the IR signals. The visible image after the interpolation is output to the image quality improvement signal processing unit 43-1. The IR image after the interpolation is output to the image quality improvement signal processing unit 43-2.

In step S14, the image quality improvement signal processing unit 43-1 performs the image quality improvement processing of the visible image. The image quality improvement signal processing unit 43-2 performs the image quality improvement processing of the IR image. The visible image and the IR image after the image quality improvement processing are output to a signal processing unit of a subsequent stage.

The visible image and the IR image obtained as described above are used, for example, for object recognition of a surveillance camera system. After the visible image and the IR image are separated, the visible image and the IR image may be synthesized with each other to acquire a color image.

Furthermore, the visible image and the IR image are used for face authentication or iris recognition for security for a personal computer or a smartphone. It is possible to simultaneously acquire the IR image and the visible image used for authentication or gesture recognition of a game and the like by a single imaging device.

As described above, since the reflected light from the subject due to the irradiation of the IR light is received only by the IR pixels, it does not affect the visible signal obtained by the RGB pixels. Therefore, it becomes possible to separate the visible signal and the IR signal, which are signals having different characteristics. Furthermore, it is not necessary to form dedicated on-chip filters for blocking the irradiated IR light on the R, G, and B pixels.

<Arrangement Example of IR-SL Light Source>

Figure 6A:
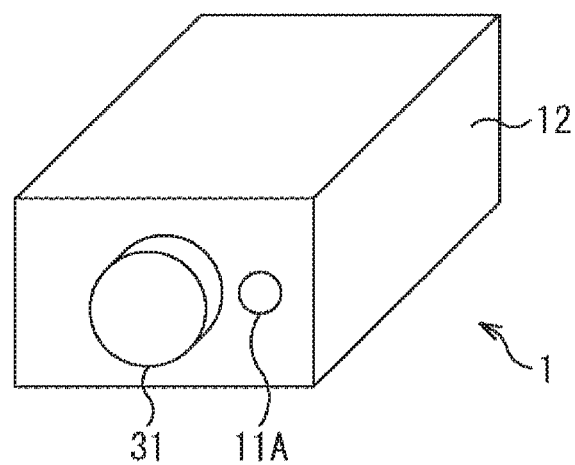
FIGS. 6A and 6B are appearance views illustrating an arrangement example of the IR-SL light source.
Figure 6B:
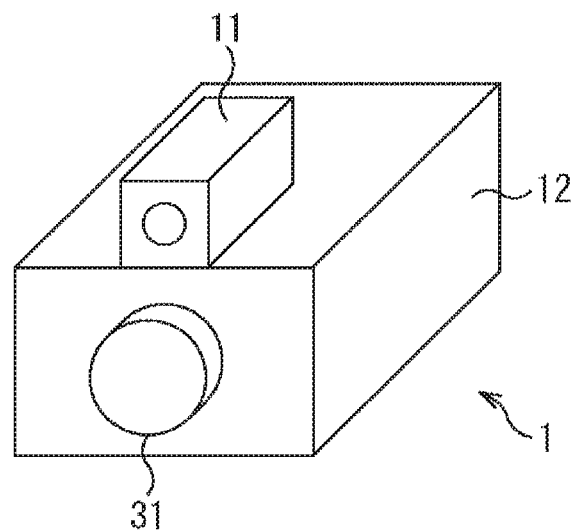

FIGS. 6A and 6B are appearance views illustrating an arrangement example of the IR-SL light source.

FIG. 6A illustrates an example in which an imaging configuration and an IR light irradiating configuration are integrated with each other in the same housing by incorporating an IR light irradiating unit 11A irradiating the IR light, as the IR-SL light source, in the imaging device 12. In this case, the IR light irradiating unit 11A is arranged near the optical system 31 typified by the lens of the imaging device 12.

By integrating the imaging configuration and the IR light irradiating configuration with each other as illustrated in FIG. 6A, a position of the image sensor 32 provided behind the optical system 31 and a position of the IR light irradiating unit 11A can be arranged closer to each other, and it becomes thus possible to make the dot pattern of the IR light coincide with the pixel projection area at a shorter distance.

FIG. 6B illustrates an example in which the imaging device 12 and the IR light irradiating device 11 as the IR-SL light source are configured independently of each other. The IR light irradiating device 11 is detachably mounted on a housing of the imaging device 12 with an adjuster and the like, for example.

By detachably mounting the IR light irradiating device 11 with the adjuster as illustrated in FIG. 6B, it becomes possible to replace the IR light irradiating device 11 according to a purpose, such that, for example, it is possible to switch the IR-SL light source into a light source having a different wavelength.

<Modification 1>

As described above, in the first embodiment, a case where an array of the RGB-IR pixels is an arrangement in the 2×2 matrix shape has been described by way of example, but the array of the RGB-IR pixels is not limited to the arrangement in the 2×2 matrix shape. For example, a pixel array may be another different pixel array that is not the array of the RGB-IR pixels, or may be a pixel array in which pixels may be arranged on a 3×3 or 4×4 matrix shape.

In the first embodiment, a case where a pattern shape of the IR-SL light source is the dot pattern configured by arranging each dot of the IR light in a predetermined pattern has been described by way of example, but the pattern shape of the IR-SL light source is not limited to the dot pattern, and may be another shape such as a pattern or the like formed so that light is applied across a plurality of pixels as long as such a shape corresponds to the projection areas of the pixels.

In the first embodiment, a case where each dot of the dot pattern is projected onto the projection areas of the IR pixels has been described by way of example, but each dot of the dot pattern is not limited to being projected only onto the projection areas of the IR pixels, and may be projected onto specific pixel areas of the R, G, and B pixels. For example, when each dot of the dot pattern is projected onto the IR pixel and a G pixel, the number of pixels that receive the IR signal increases, and resolution of the IR image can thus be increased. At this time, the IR signal mixed into the G pixel is subjected to subtraction processing by a matrix operation.

In the first embodiment, a case where one IR-SL light source is used has been described, but one pixel may be irradiated with light from a plurality of light sources, for example, in order to increase an intensity of irradiated light.

Second Embodiment

<Configuration Example of Camera System>

FIG. 7 is a diagram illustrating a second configuration example of a camera system to which the present technology is applied.

The camera system 51 of FIG. 7 includes a light irradiating device 61 as an SL light source and an imaging device 62. In FIG. 7, projection areas of pixels are virtually indicated by broken lines on a plane assumed to be a subject. The projection areas include areas corresponding to a pixel array in the imaging device 62. A character shown in each projection area indicates that a pixel corresponding to each projection area is an R, G, or B pixel, or an IR pixel.

The camera system 51 is different from the camera system 1 of FIG. 1 in that the light irradiating device 61 has four light sources of R, G, B, and IR light as SL light sources that form a dot pattern projected onto the projection area and in that the imaging device 62 uses a black-and-white (W/B) sensor in which an on-chip color filter is not mounted, as an image sensor. The other common parts have configurations similar to those of the camera system 1 of FIG. 1, and a repeated description therefor will thus be omitted.

The four light sources included in the light irradiating device 61 are an R light source that irradiates R light, a G light source that irradiates G light, a B light source that irradiates B light, and an IR light source that irradiates IR light.

The R light source irradiates R light of a dot pattern to be irradiated only to projection areas corresponding to the R pixels. The G light source irradiates G light of a dot pattern to be irradiated only to projection areas corresponding to the G pixels. The B light source irradiates B light of a dot pattern to be irradiated only to projection areas corresponding to the B pixels. The IR light source irradiates IR light of a dot pattern to be irradiated only to projection areas corresponding to the IR pixels.

As illustrated by four types of hatched circles, each dot of the dot pattern is simultaneously projected onto the projection areas as light from the four light sources of the light irradiating device 61.

The imaging device 62 images a subject in a state where light of the dot pattern to be irradiated only to the projection area of each pixel of R, G, B, and IR is irradiated from the four light sources of the light irradiating device 61. Therefore, it becomes possible to acquire a visible image in which an R image, a G image, and a B image are synthesized with each other and in IR image, similar to the first embodiment.

<Configuration Example of Imaging Device>

Figure 8:
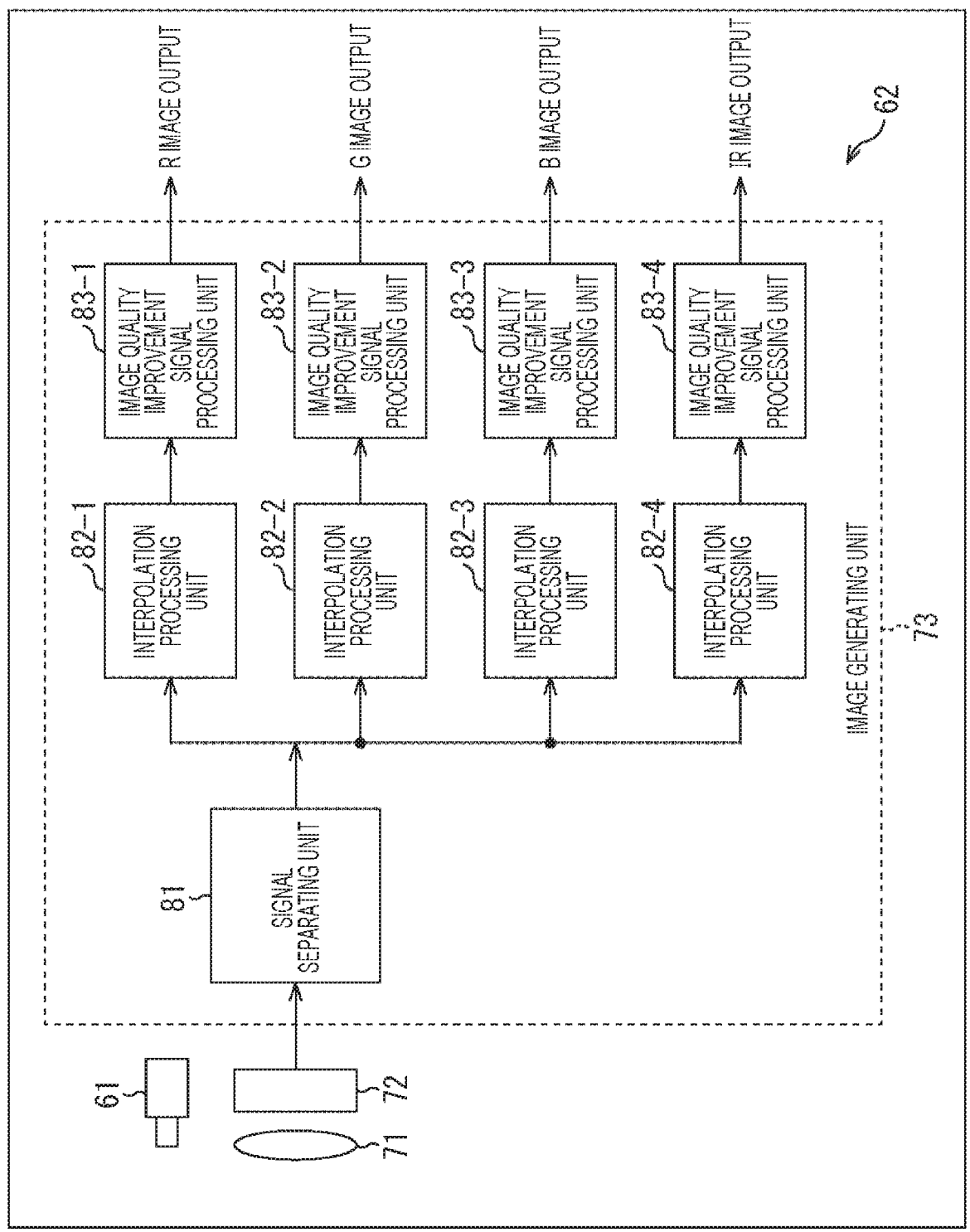
FIG. 8 is a block diagram illustrating a configuration example of an imaging device of FIG. 7.

FIG. 8 is a block diagram illustrating a configuration example of an imaging device. The imaging of the subject in the camera system 51 is performed by the imaging device 62 in a state where the light of the dot pattern from the light irradiating device 61 as the SL light source is constantly irradiated.

The imaging device 62 includes an optical system 71 such as a lens and the like, an image sensor 72, and an image generating unit 73.

Light from the subject is incident on the image sensor 72 via the optical system 71. The image sensor 72 photoelectrically converts the incident light, and performs A/D conversion on a pixel value of each pixel in a pixel array unit to generate pixel signals.

The image sensor 72 is a black-and-white (W/B) sensor in which an on-chip color filter is not mounted. The image sensor 72 has a pixel array unit in which R, G, and B pixels, and IR pixels are arranged in a 2×2 matrix shape.

The image generating unit 73 generates R, G, and B images, respectively, using R, G, and B signals from the R, G, and B pixels among a plurality of pixels configuring the pixel array unit of the image sensor 72, and outputs the generated R, G, and B images to a signal processing unit (not illustrated) of a subsequent stage. The image generating unit 73 generates an IR image using IR signals from the IR pixels among the plurality of pixels configuring the pixel array unit of the image sensor 72, and outputs the generated IR image to a signal processing unit (not illustrated) of a subsequent stage.

The image generating unit 73 includes a signal separating unit 81, interpolation processing units 82-1 to 82-4, and image quality improvement signal processing units 83-1 to 83-4.

The signal separating unit 81 separates the R signals from the signals of the image sensor 72 and outputs the R signals to the interpolation processing unit 82-1. The signal separating unit 81 separates the G signals from the signals of the image sensor 72 and outputs the G signals to the interpolation processing unit 82-2. The signal separating unit 81 separates the B signals from the signals of the image sensor 72 and outputs the B signals to the interpolation processing unit 82-3. The signal separating unit 81 separates the IR signals from the signals of the image sensor 72 and outputs the IR signals to the interpolation processing unit 82-4.

The interpolation processing units 82-1 to 82-3 generate an R image, a G image, and a B image by performing interpolation processing such as demosaic processing or the like that generates a pixel signal of a missing color according to an array of the R, G, and B pixels, respectively, and supply the R image, the G image, and the B image to the image quality improvement signal processing units 83-1 to 83-3, respectively.

The interpolation processing unit 82-4 generates an IR image after interpolation by performing interpolation processing of the IR signals, and outputs the IR image to the image quality improvement signal processing unit 83-4.

The image quality improvement signal processing units 83-1 to 83-3 perform image quality improvement processing of the R image, the G image, and the B image, respectively, and outputs the R image, the G image, and the B image after the image quality improvement processing, respectively.

The image quality improvement signal processing unit 83-4 performs image quality improvement processing of the IR image, and outputs the IR image after the image quality improvement processing.

<Arrangement Example of SL Light Source>

Figure 9A:
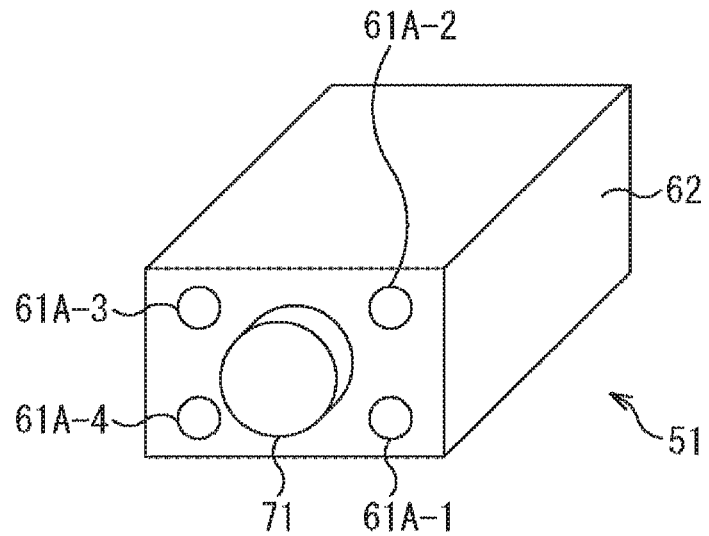
FIGS. 9A and 9B are appearance views illustrating an arrangement example of an SL light source.
Figure 9B:
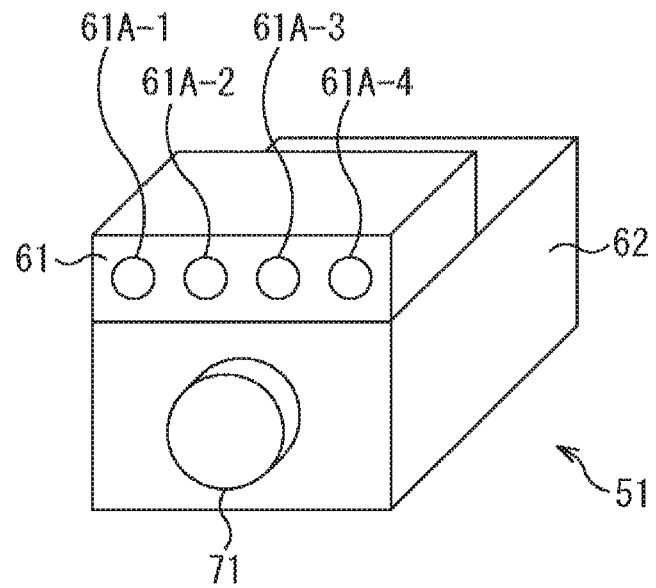

FIGS. 9A and 9B are appearance views illustrating an arrangement configuration example of the SL light source.

FIG. 9A illustrates an example in which an imaging configuration and a light irradiating configuration are integrated with each other in the same housing by incorporating a light irradiating unit 61A-1 irradiating the R light, a light irradiating unit 61A-2 irradiating the G light, a light irradiating unit 61A-3 irradiating the B light, and a light irradiating unit 61A-4 irradiating the IR light, as the SL light sources, in the imaging device 62. In this case, the light irradiating units 61A-1 to 61A-4 are arranged near the optical system 71 typified by the lens of the imaging device 62.

By integrating the imaging configuration and the light irradiating configuration with each other as illustrated in FIG. 9A, a position of the image sensor 72 provided behind the optical system 71 and positions of the light irradiating units 61A-1 to 61A-4 can be arranged closer to each other, and it becomes thus possible to make the dot pattern coincide with the pixel projection area at a shorter distance.

FIG. 9B illustrates an example in which the imaging device 62 and the light irradiating device 61 as the SL light source are configured independently of each other. The light irradiating device 61 includes a light irradiating unit 61A-1 irradiating the R light, a light irradiating unit 61A-2 irradiating the G light, a light irradiating unit 61A-3 irradiating the B light, and a light irradiating unit 61A-4 irradiating the IR light.

The light irradiating device 61 is detachably mounted on a housing of the imaging device 62 with an adjuster and the like, for example.

By detachably mounting the light irradiating device 61 with the adjuster as illustrated in FIG. 9B, it becomes possible to replace the light irradiating device 61 according to a purpose, such that, for example, it is possible to switch the SL light source into a light source having a different wavelength.

<Operation of Camera System>

Next, imaging processing of the camera system of FIG. 7 will be described with reference to a flowchart of FIG. 10.

Figure 10:
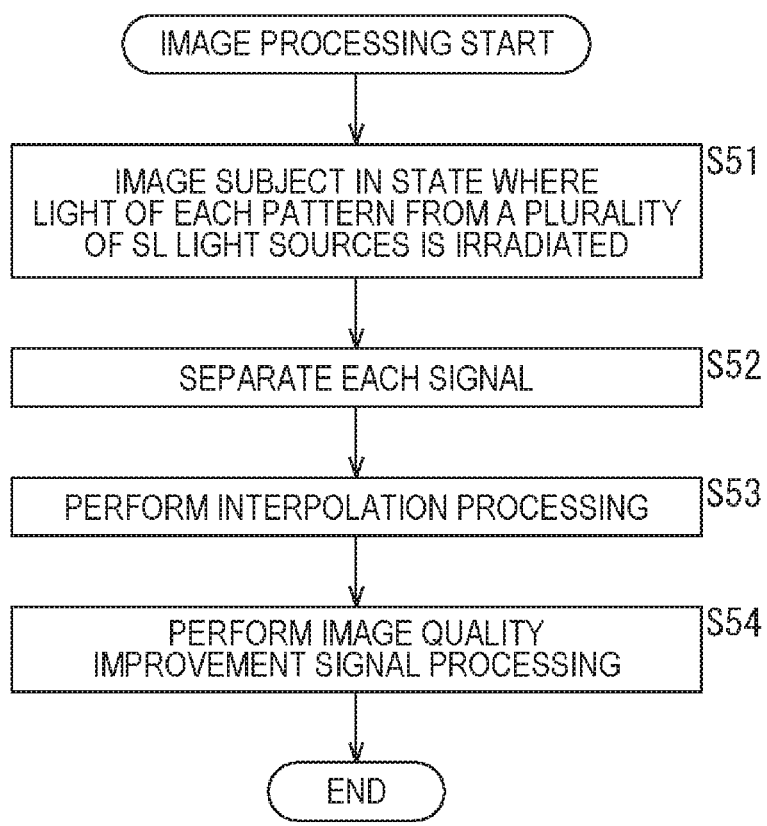
FIG. 10 is a flowchart for describing imaging processing of the camera system of FIG. 7.

In step S51 of FIG. 10, the image sensor 72 images the subject in a state where the light of the dot pattern from each of the light irradiating units 61A-1 to 61A-4 of the light irradiating device 61 is irradiated. The image sensor 72 photoelectrically converts the incident light, and performs A/D conversion on a pixel value of each pixel in a pixel array unit to generate pixel signals.

In step S52, the signal separating unit 81 separates the R signals, the G signals, the B signals, and the IR signals from the signals from the image sensor 72. The R signals, the G signals, and the B signals are output to the interpolation processing units 82-1 to 82-3, respectively. The IR signals are output to the interpolation processing unit 82-4.

In step S53, the interpolation processing units 82-1 to 82-3 generate R, G, and B images after interpolation by performing the interpolation processing of the R signals, the G signals, the B signals, respectively. The interpolation processing unit 82-4 generates an IR image after interpolation by performing interpolation processing of the IR signals. The R, G, and B images after the interpolation are output to the image quality improvement signals processing units 83-1 to 83-3, respectively. The IR image after the interpolation is output to the image quality improvement signal processing unit 83-4.

In step S54, the image quality improvement signal processing units 83-1 to 83-3 perform the image quality improvement processing of the R, G, and B images, respectively. The image quality improvement signal processing unit 83-4 performs the image quality improvement processing of the image of the IR signal. The R, G, and B images and the IR image after the image quality improvement processing are output to a signal processing unit of a subsequent stage.

<Example of Pixel Array>

Figure 11A:
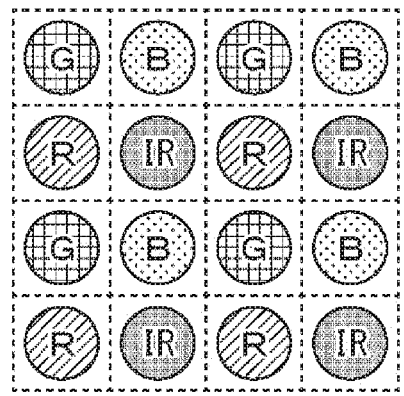
FIGS. 11A, 11B, and 11C are diagrams illustrating an example of a pixel array.
Figure 11B:
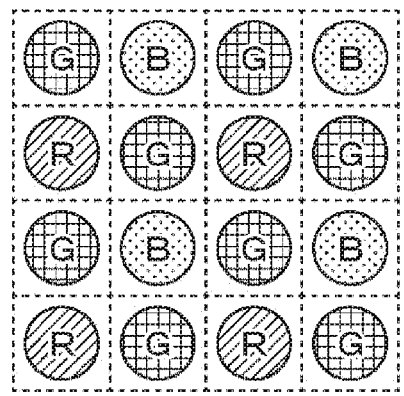
Figure 11C:
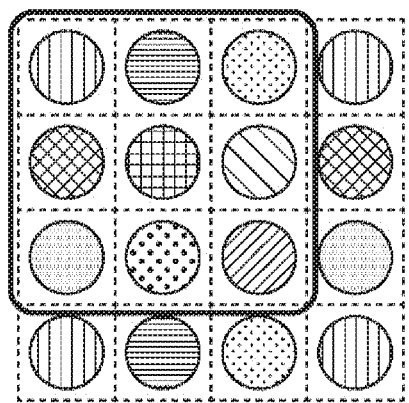

FIGS. 11A, 11B, and 11C are diagrams illustrating an example of a pixel array.

FIG. 11A illustrates an example of a pixel array similar to that of FIG. 7. FIG. 11A is an example in which four light sources of R, G, B, and IR are used as SL light sources forming a dot pattern and light of the dot pattern is irradiated so as to correspond to each projection area of 2×2 pixels. By using a combination of the four SL light sources of R, G, B, and IR and a corresponding dot pattern, it becomes possible to acquire a visible image and an IR image, similar to the first embodiment.

FIG. 11B is an example in which an IR pattern of the combination of the SL light sources illustrated in FIG. 11A is replaced with a G pattern. By using a dot pattern corresponding to a combination of four SL light sources of R, G, B, and G, it becomes possible to acquire a high-resolution color image, similar to a sensor using a filter of a Bayer pattern.

FIG. 11C is an example in which a dot pattern is developed in a wide range of area of 3×3 surrounded by a thick line using a plurality of light sources (in a case of FIG. 11C, nine types of light sources) having wavelength bands other than wavelength bands of R, G, B, and IR. By using a combination of such nine SL light sources and a corresponding dot pattern, it is possible to acquire spectral characteristics of a subject required for multi-spectral spectroscopic analysis. Note that the dot pattern may be developed in a wide range of area of 4×4.

As described above, by changing the combination of the SL light sources, it is possible to switch the same camera system according to a purpose. In use such as spectral analysis of the subject, or the like, wavelength bands to be acquired are different from each other depending on a material of the subject. Therefore, a camera system that can flexibly change a probe wavelength for analysis, such as the camera system according to the present technology, is useful.

<Modification 2>

As described above, in the second embodiment, a case where a pattern shape of the SL light source is the dot pattern has been described by way of example, but the pattern shape of the SL light source is not limited to the dot pattern, and may be another shape such as a pattern or the like formed so that light is applied across a plurality of pixels as long as such a shape corresponds to the projection areas of the pixels.

In the second embodiment, a case of only one light source has been described as an arrangement of the SL light source, but a plurality of SL light sources for irradiating light to a dot pattern corresponding to the same pixel may be used, for example, in order to increase an intensity of irradiated light.

In the second embodiment, only pattern light of one type of SL light source has been projected onto the projection area of each pixel, but pattern light from a plurality of types of SL light sources having different wavelength bands may be projected onto the same pixel projection area. These are selected depending on a purpose of spectroscopic analysis.

As an application example of the second embodiment, the camera system according to the second embodiment can be used for spectroscopic analysis and the like in a technical field such as a biotechnology, a medical field or the like. Capturing of a normal color image, acquisition of a multi-spectral spectral image, observation of specific fluorescence, and the like, become possible by using the camera system according to the second embodiment.

Moreover, by applying the camera system according to the second embodiment to the technical field such as the biotechnology or the medical field, it is possible to simultaneously perform fluorescent observation for observing fluorescent reflection by excitation light and normal color image imaging.

As described above, in the present technology, an image of the subject has been generated on the basis of pixel signals obtained by performing imaging in a state where light of a predetermined pattern from the structured light (SL) light source is irradiated to projection areas of specific pixels of an imaging unit that images the subject.

According to the present technology, it is possible to realize a camera system that can separate and simultaneously acquire images having different characteristics, for example, a visible image and an IR image without causing crosstalk.

According to the present technology, imaging with spectral characteristics similar to those of a case where an on-chip color filter is arranged can be performed with one sensor.

Here, conventionally, in a spectral analysis field, a multi-spectral spectrum camera has been proposed. The multi-spectral spectrum camera can obtain each pixel signal by arranging many color filters corresponding to various wavelength bands in each pixel of the sensor. By using the multi-spectral spectrum camera, spectral reflection characteristics of a subject have been analyzed or identification and analysis of a material of the subject have been performed.

However, in the multi-spectral spectrum camera, various color filters need to be formed on the sensor. Therefore, a manufacturing process has been complicated and a cost of the sensor has been increased. Furthermore, in order to acquire data of many wavelength bands, it has been necessary to develop various types of color filters in a two-dimensional manner, such that it has been difficult to increase spatial resolution of a spectral analysis result.

On the other hand, according to the present technology, the imaging with the spectral characteristics similar to those of the case where the on-chip color filter is arranged can be performed with one sensor, without requiring the on-chip color filter.

Therefore, in spectroscopic analysis or the like, by switching an irradiation light source, it is possible to cope with various purposes with a single camera system.

Third Embodiment

<Configuration Example of Camera System>

Figure 12:
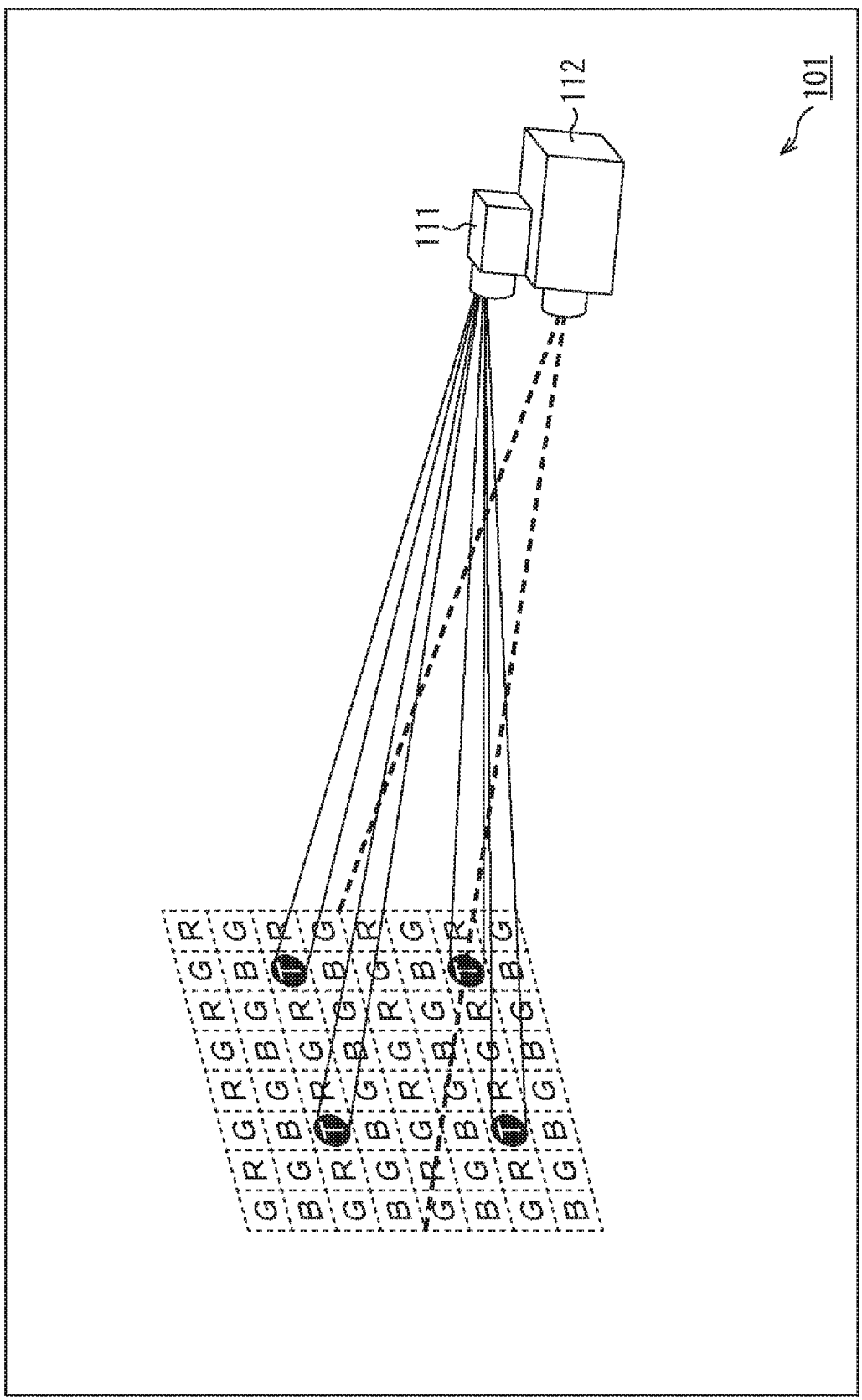
FIG. 12 is a diagram illustrating a third configuration example of a camera system to which the present technology is applied.

FIG. 12 is a diagram illustrating a third configuration example of a camera system to which the present technology is applied.

The camera system 101 of FIG. 12 includes an IR light irradiating device 111 as an IR-SL light source and an imaging device 112. In FIG. 12, projection areas of pixels are virtually indicated by broken lines on a plane assumed to be a subject. The projection areas include areas corresponding to a pixel array in the imaging device 112. Characters R, G, B, and T shown in each projection area indicate that pixels corresponding to each projection area are R, G, or B pixels, or time of flight (TOF) pixels, respectively.

The IR light irradiating device 111 is a device that irradiates IR light, and is fixedly arranged close to the imaging device 112. The IR light irradiating device 111 blinks and irradiates IR light of a dot pattern to be irradiated only to projection areas corresponding to the TOF pixels. Each dot of the dot pattern is projected as the IR light from the IR light irradiating device 111, as illustrated by a colored circle, onto the projection areas of the TOF pixels among the projection areas.

The imaging device 112 includes an image sensor in which R, G, and B pixels, and TOF pixels are arranged. A shutter system of the image sensor may be a rolling shutter system or may be a global shutter system.

The imaging device 112 images a subject in a state where the IR light of the dot pattern to be irradiated only to the projection areas corresponding to the TOF pixels is irradiated by the IR light irradiating device 111. The R, G, and B pixels receive visible light from a predetermined light source. Therefore, in the imaging device 112, a visible image corresponding to signals from the R, G, and B pixels is generated, and distance information is obtained using signals from the TOF pixels.

Note that also in the camera system 101, the IR light irradiating device 111 may be configured integrally with the imaging device 112 or may be configured to be detachable from the imaging device 112, as described above with reference to FIGS. 6A and 6B.

<Principle of Structured Light (SL) Light Source>

Figure 13:
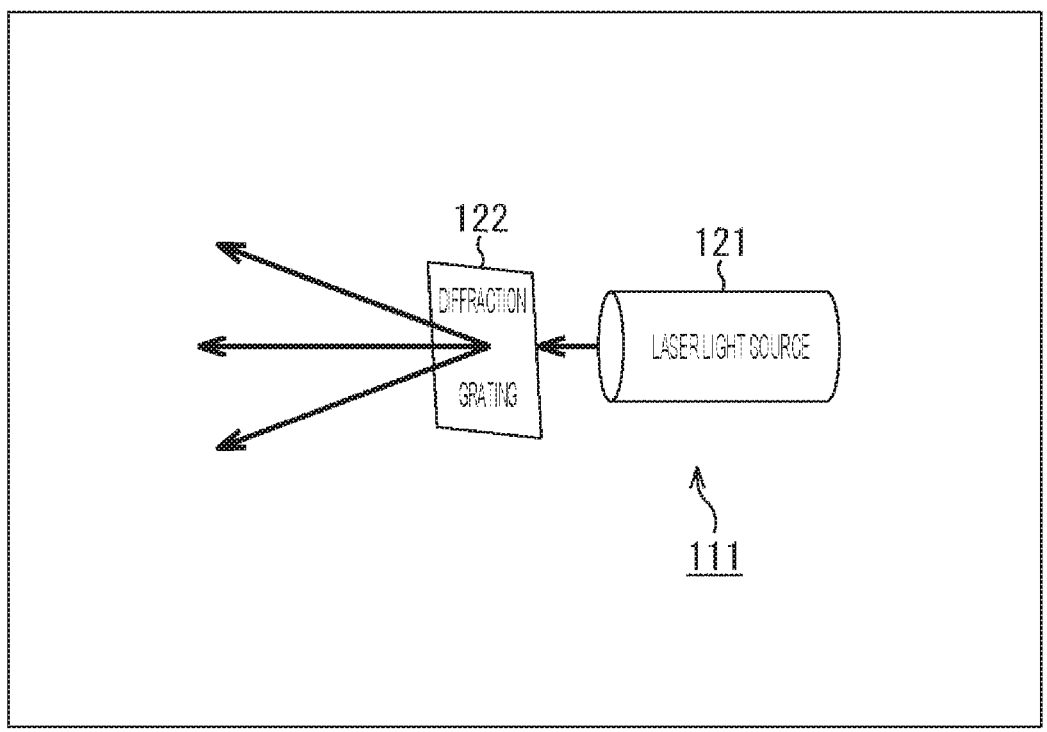
FIG. 13 is a diagram for describing a principle of an SL light source.

FIG. 13 is a diagram for describing a principle of an SL light source.

The IR light irradiating device 111 has a configuration in which a diffraction grating 122 is provided in front of a laser light source 121. By appropriately designing the diffraction grating 122, it becomes possible to irradiate arbitrary positions (for example, the projection areas of the TOF pixels of FIG. 12) of a matrix shape with the IR light of the dot pattern.

<Configuration Example of IR Light Irradiating Device and Imaging Device>

Figure 14:
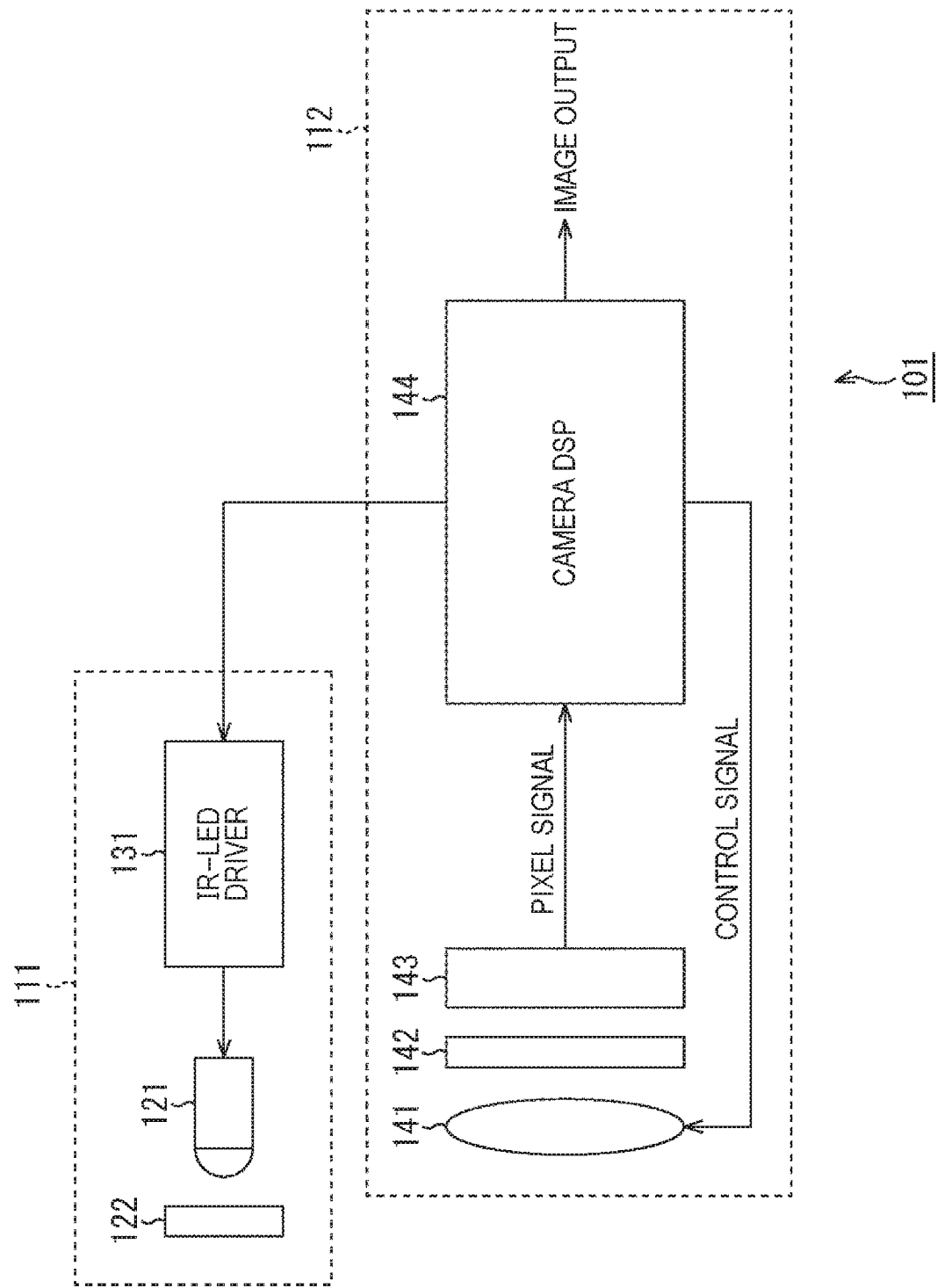
FIG. 14 is a block diagram illustrating a configuration example of an IR light irradiating device and an imaging device.

FIG. 14 is a block diagram illustrating a configuration example of an IR light irradiating device and an imaging device.

The IR light irradiating device 111 includes a laser light source 121, a diffraction grating 122, and an IR-light emitting diode (LED) driver 131.

The IR-LED driver 131 controls a blinking irradiation operation of the laser light source 121 according to an LED ON/OFF signal and an LED intensity adjustment signal supplied from the imaging device 112. The LED ON/OFF signal is a signal indicating ON and OFF of an LED. The LED intensity adjustment signal is a signal for adjusting an intensity of the LED.

The imaging device 112 includes an optical system 141 such as a lens and the like, an IR bandpass filter 142, an image sensor 143, and a camera digital signal processor (DSP) 144.

Light from the subject is incident on the image sensor 143 via the optical system 141 and the IR bandpass filter 142. The image sensor 143 has a pixel array unit in which R, G, and B pixels and TOF pixels are arranged. The image sensor 143 photoelectrically converts the incident light, and performs A/D conversion on a pixel value of each pixel in the pixel array unit to generate pixel signals.

The camera DSP 144 generates a color image using R, G, and B signals from the R, G, and B pixels among a plurality of pixels configuring the pixel array unit of the image sensor 143, and outputs the generated color image to a signal processing unit (not illustrated) of a subsequent stage. Furthermore, the camera DSP 144 calculates a distance using TOF signals from the TOF pixels among the plurality of pixels configuring the pixel array unit of the image sensor 143. The camera DSP 144 generates an AF control signal for controlling an auto focus (AF) from distance information indicating the calculated distance. The generated AF control signal is used for driving the optical system 141.

The camera DSP 144 generates the LED ON/OFF signal and the LED intensity adjustment signal, and outputs the generated LED ON/OFF signal and LED intensity adjustment signal to the IR-LED driver 131.

<Example of Pixel Array>

Figure 15:
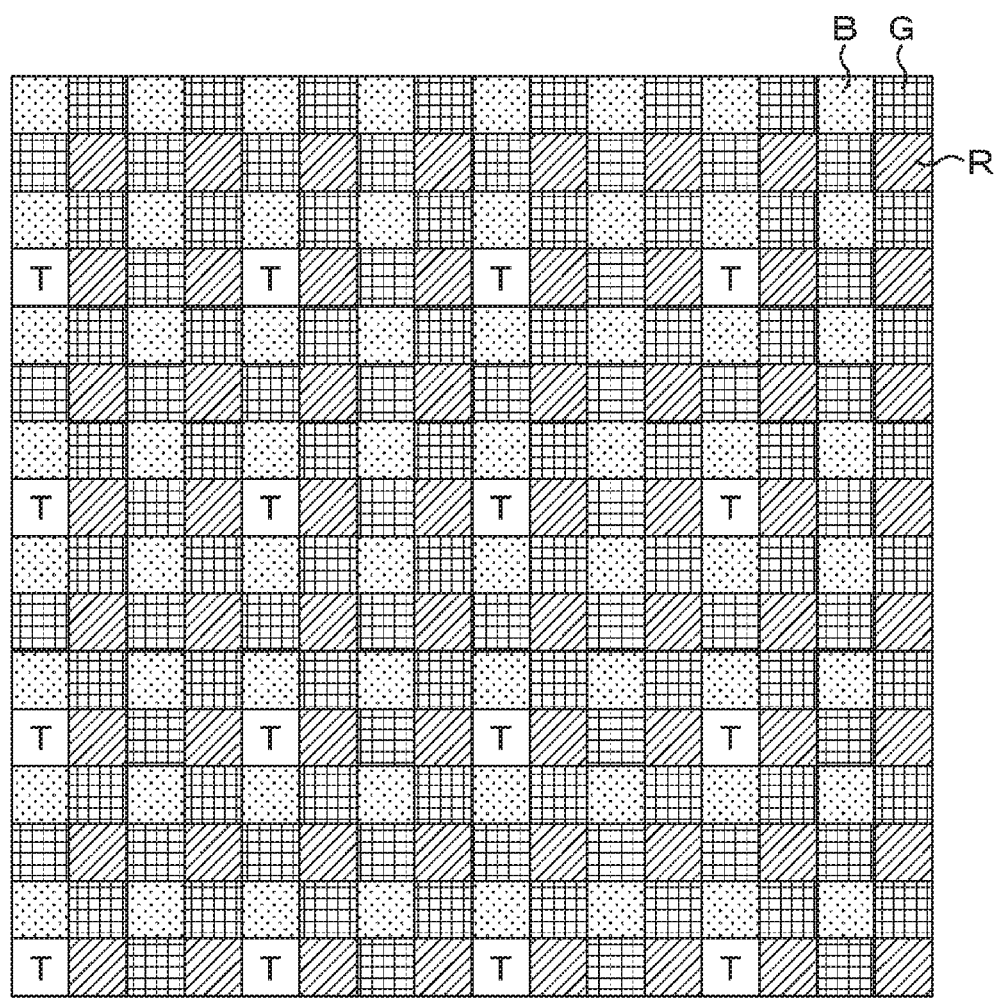
FIG. 15 is a diagram illustrating an example of a pixel array of an image sensor.

FIG. 15 is a diagram illustrating an example of a pixel array of an image sensor.

The pixel array unit of the image sensor 143 is configured by a pixel array in which G pixels are replaced by TOF pixels every four pixels in horizontal and vertical directions of a Bayer array, as illustrated in FIG. 15.

<Relationship Between Angle of View of Imaging Device and Irradiation Angle of IR-SL Light Source>

Figure 16:
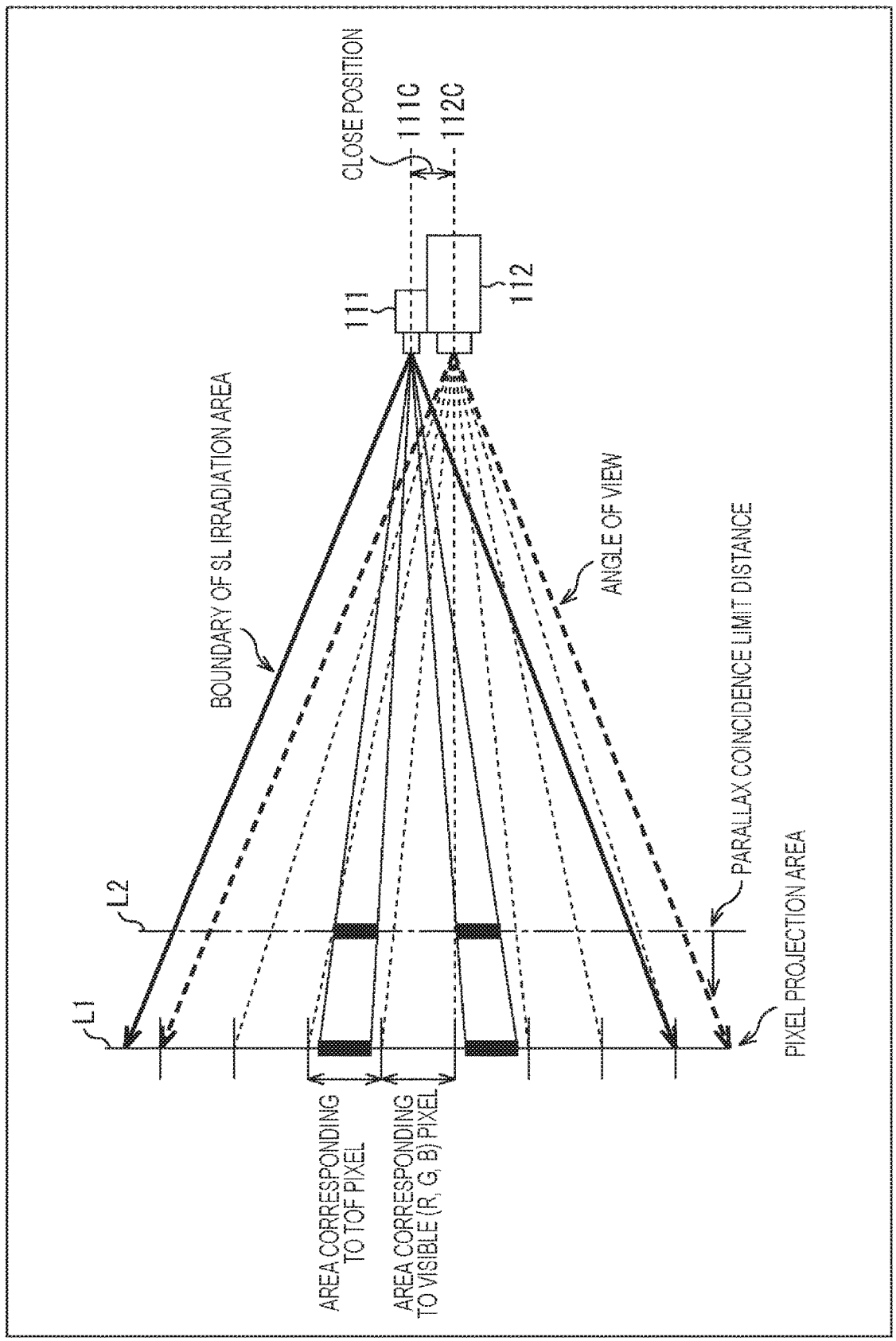
FIG. 16 is a diagram for describing a relationship between an angle of view of an imaging device and an irradiation angle of an IR-SL light source.

FIG. 16 is a diagram for describing a relationship between an angle of view of an imaging device and an irradiation angle of an IR-SL light source.

Each solid line within an SL irradiation angle around an optical axis 111C of the IR light irradiating device 111 indicates a boundary of an SL irradiation area, and each broken line within an angle of view around an optical axis 112C of the imaging device 112 indicates a boundary of a pixel area. The SL irradiation area is an area where dots are irradiated from the IR-SL light source to the pixel area. In the camera system 101, the SL irradiation angle of the IR light irradiating device 111 and the angle of view of the imaging device 112 are set to approximately coincide with each other.

A solid line L1 on the left side of FIG. 16 indicates a projection area of the imaging device 112. A range indicated by a bidirectional arrow corresponds to a projection area of one pixel. An alternate long and short dash line L2 on the right side of a pixel projection area indicates the parallax coincidence limit distance described above with reference to FIG. 3. Black rectangles on the solid line L1 and on the alternate long and short dash line L2 represent each dot of the dot pattern.

The IR light of the dot pattern from the IR light irradiating device 111 of FIG. 16 is irradiated only to areas corresponding to the TOF pixels in the pixel array of the imaging device 112. At that time, the imaging device 112 and the IR light irradiating device 111 are fixed.

Therefore, if a distance is more distant than the parallax coincidence limit distance indicated by the alternate long and short dash line L2 when viewed from the IR light irradiating device 111 and the imaging device 112, the IR light of the dot pattern irradiated from the IR light irradiating device 111 and the pixel projection area of the imaging device 112 do not deviate from each other regardless of a distance of a subject. Therefore, a projection boundary area of the IR pixel and the IR light of the dot pattern correspond to each other in a one-to-one manner. Reflected light of the IR light does not arrive at the R, G, and B pixels, and is received only by the IR pixels.

Note that the parallax coincidence limit distance is similar to that in a case of FIG. 3, and a description thereof will thus be omitted.

Figure 17:
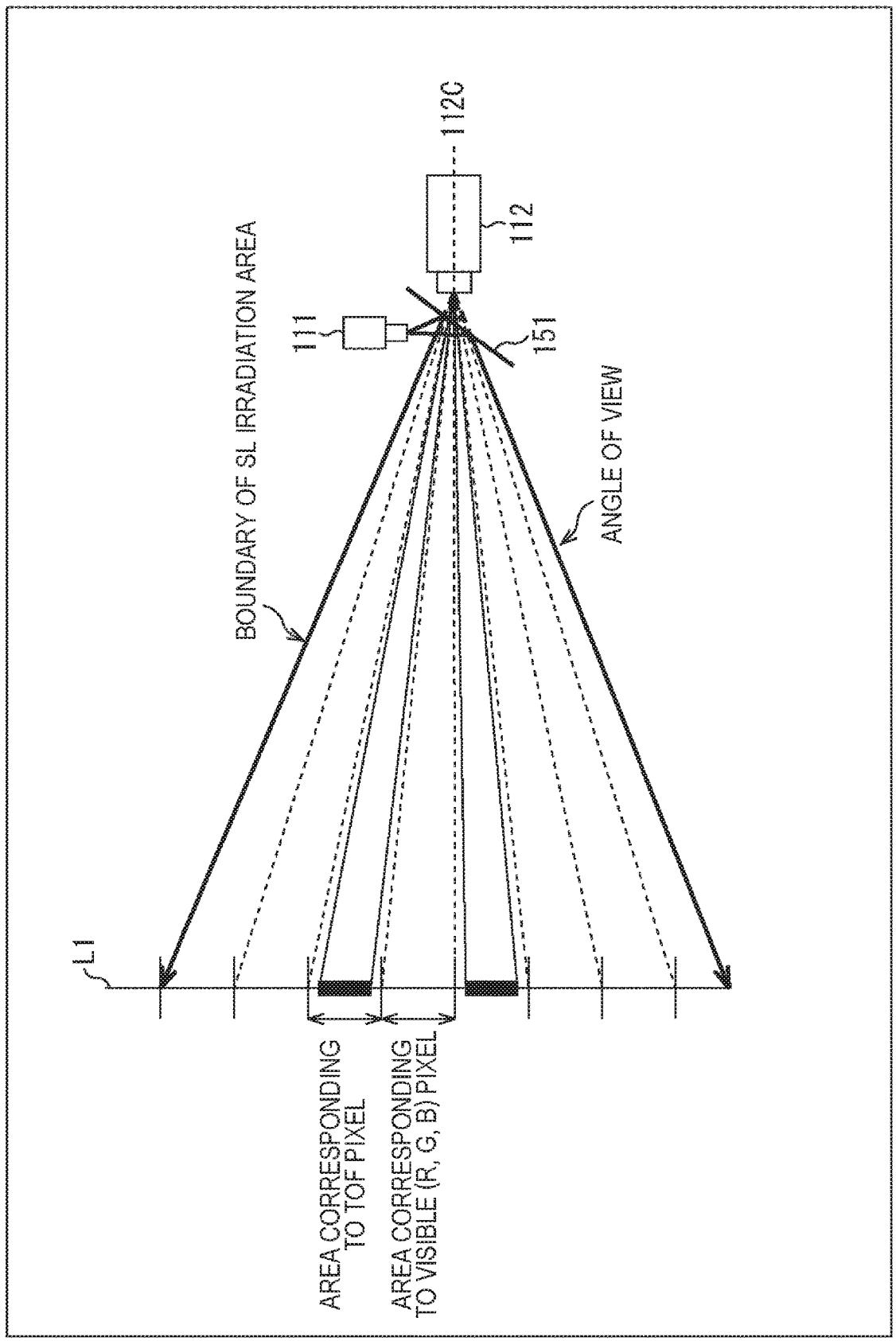
FIG. 17 is a diagram for describing a relationship between an angle of view of an imaging device and an irradiation angle of an IR-SL light source in a case where a dichroic mirror is used.

FIG. 17 is a diagram for describing a relationship between an angle of view of an imaging device and an irradiation angle of an IR-SL light source in a case where a dichroic mirror is used.

The dichroic mirror 151 is formed so as to reflect light in a direction perpendicular to an incident surface and transmit light in a direction parallel to the incident surface. The dichroic mirror 151 is arranged in front of the optical system 141 of the imaging device 112 so that the center of an optical axis of the dichroic mirror 151 after reflection and the center of an optical axis 112C of the imaging device 112 substantially coincide with each other.

Furthermore, the IR light irradiating device 111 is arranged perpendicular to the optical axis 112C of the imaging device 112 so as to irradiate light in the direction perpendicular to the incident surface of the dichroic mirror 151.

With such an arrangement, the center of the optical axis of the dichroic mirror 151 after the reflection and the center of the optical axis 112C of the imaging device 112 can substantially coincide with each other. Furthermore, since the dichroic mirror 151 reflects IR light of a dot pattern irradiated from the IR light irradiating device 111 and transmits light from a subject, the IR light of approximately 50% can be received by the imaging device 112.

Therefore, it is possible to make the dot pattern and a projection area of a pixel substantially coincide with each other at a short distance.

Note that a dichroic prism, a deflecting beam splitter or the like may be arranged instead of the dichroic mirror 151. The dichroic mirror 151 may also be used in a camera system according to another embodiment.

<Cross-Sectional Example of Part of Image Sensor>

Figure 18:
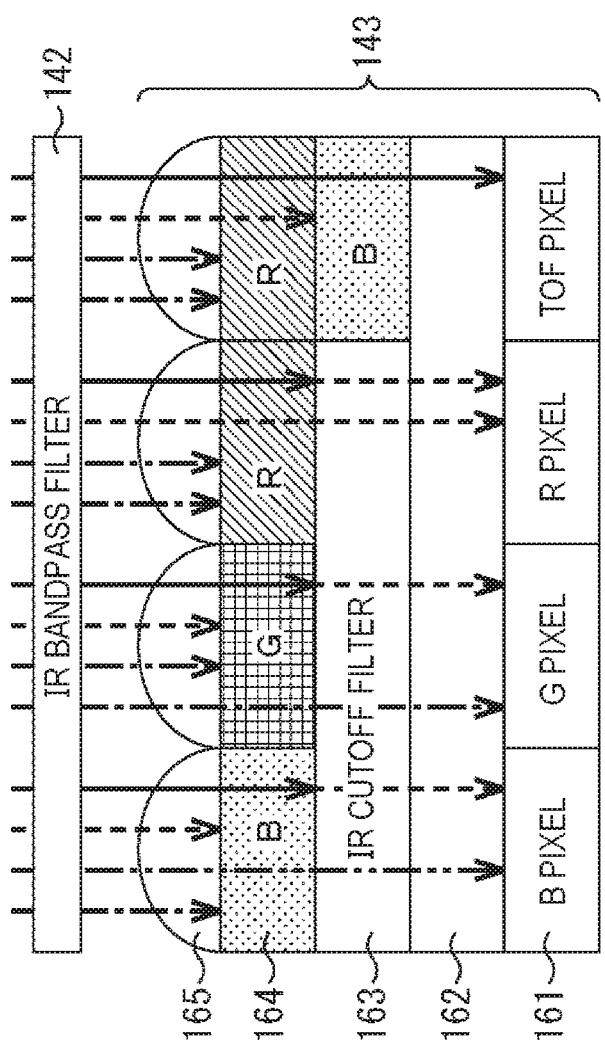
FIG. 18 is a cross-sectional view illustrating a configuration example of a part of a light incident side in the image sensor.

FIG. 18 is a cross-sectional view illustrating a configuration example of a part of a light incident side in the image sensor.

In the example of FIG. 18, a light receiving pixel 161, an insulating layer 162, a filter layer 163, a color filter layer 164, and an on-chip lens 165 are illustrated as a partial configuration of the light incident side in the image sensor 143.

The light receiving pixel 161 includes a B pixel, a G pixel, an R pixel, and a TOF pixel arranged sequentially from the left.

The insulating layer 162 allows light transmitted through the filter layer 163 to pass up to the light receiving pixel 161.

The filter layer 163 includes an IR cutoff filter disposed on the B pixel, the G pixel, and the R pixel, and a blue filter disposed on the TOF pixel. The IR cutoff filter blocks light in a wavelength region (for example, about 850 nm) of the IR light. The blue filter is arranged so as to overlap with a red filter of the color filter layer 164 to transmit only the IR light.

The color filter layer 164 includes a blue filter arranged above the B pixel, a green filter arranged above the G pixel, red filters arranged above the R pixel and the TOF pixel. The blue filter blocks light in a wavelength region of G and light in a wavelength region of R, and transmits light in a wavelength region of B. The green filter blocks the light in the wavelength region of B and the light in the wavelength region of R, and transmits the light in the wavelength region of G. The red filter blocks the light in the wavelength region of G and the light in the wavelength region of B, and transmits the light in the wavelength region of R.

The on-chip lens 165 includes lenses arranged above each pixel of the light receiving pixel 161.

Furthermore, the IR bandpass filter 142 is arranged between the optical system 141 and the image sensor 143. The IR bandpass filter 142 is a bandpass filter that has transparency in a visible region and a portion of the wavelength region of the IR light.

With the configuration as described above, the light in the wavelength region of B is incident on the B pixel, the light in the wavelength region of G is incident on the G pixel, the light in the wavelength region of R is incident on the R pixel, and the light in the wavelength region of the IR light is incident on the TOF pixel.

However, actually, even though the IR cutoff filter is used, transmission afterglow of the IR light is incident on the B pixel, the G pixel, and the R pixel. This is because the IR cutoff filter has the following spectral characteristics.

<Filter Spectral Characteristics>

Figure 19:
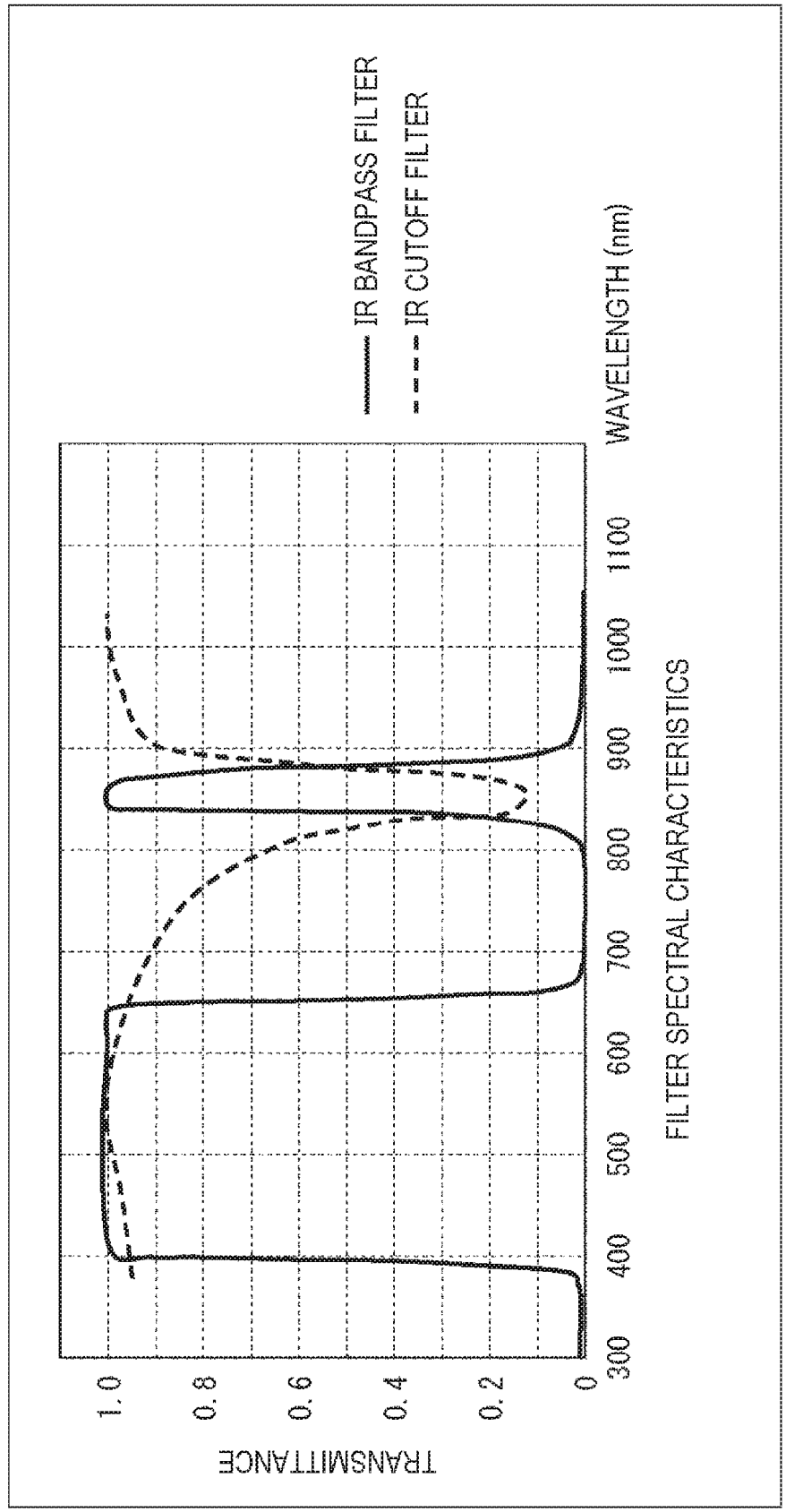
FIG. 19 is a diagram illustrating spectral characteristics of an IR bandpass filter and an IR cutoff filter.

FIG. 19 is a diagram illustrating spectral characteristics of an IR bandpass filter and an IR cutoff filter.

The IR bandpass filter 142 transmits light in wavelength regions of 400 nm to 680 nm and 830 nm to 870 nm, and blocks light in wavelength regions other than the wavelength regions of 400 nm to 680 nm and 830 nm to 870 nm.

The IR cutoff filter blocks light in a wavelength region about 850 nm until a transmittance becomes 0.1.

That is, the IR bandpass filter 142 completely (with a transmittance of 0) blocks light in wavelength regions other than a visible range and the wavelength region of the IR light. On the other hand, the IR cutoff filter does not completely block the light in the wavelength region of the IR light.

Therefore, as shown below, a transmittance of the wavelength region of the IR light is not zero.

<Spectral Characteristics Corresponding to Each Pixel>

Figure 20:
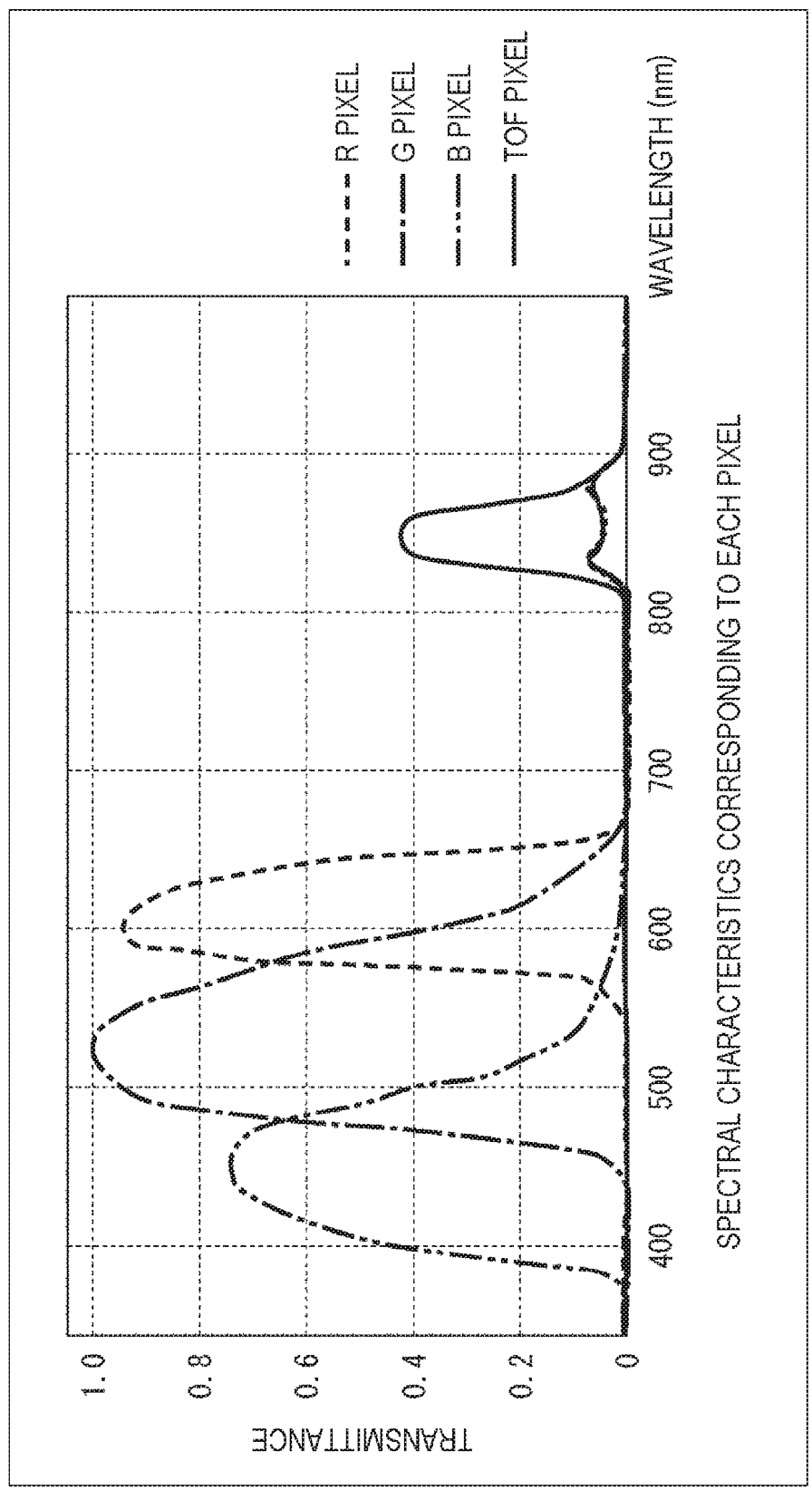
FIG. 20 is a diagram illustrating spectral characteristics corresponding to each pixel.

FIG. 20 is a diagram illustrating spectral characteristics corresponding to each pixel.

A spectral sensitivity of a sensor is also added to the spectral characteristics of FIG. 20.

The R pixel is set to have a sensitivity to light in a wavelength region of approximately 590 nm to 630 nm. The G pixel is set to have a sensitivity to light in a wavelength region of approximately 490 nm to 550 nm. The B pixel is set to have a sensitivity to light in a wavelength region of approximately 440 nm to 470 nm. The TOF pixel is set to have a sensitivity to light in a wavelength region of approximately 840 nm to 860 nm.

However, when viewing spectral characteristics of the B pixel, the G pixel, and the R pixel, a transmittance of light in the wavelength region (for example, about 850 nm) of the IR light is not completely zero. Transmission afterglow of the IR light to visible pixels has little influence on color reproduction of a visible image if the IR light is IR light existing in a natural environment, but becomes a level that has an influence on the color reproduction of the visible image in a case where artificial IR light is mixed.

Therefore, in the present technology, the IR light is set to be irradiated only to the TOF pixels. Therefore, according to the present technology, it becomes possible to almost completely avoid mixing of the IR light projected onto the visible pixels.

<Configuration Example of Camera DSP>

Figure 21:
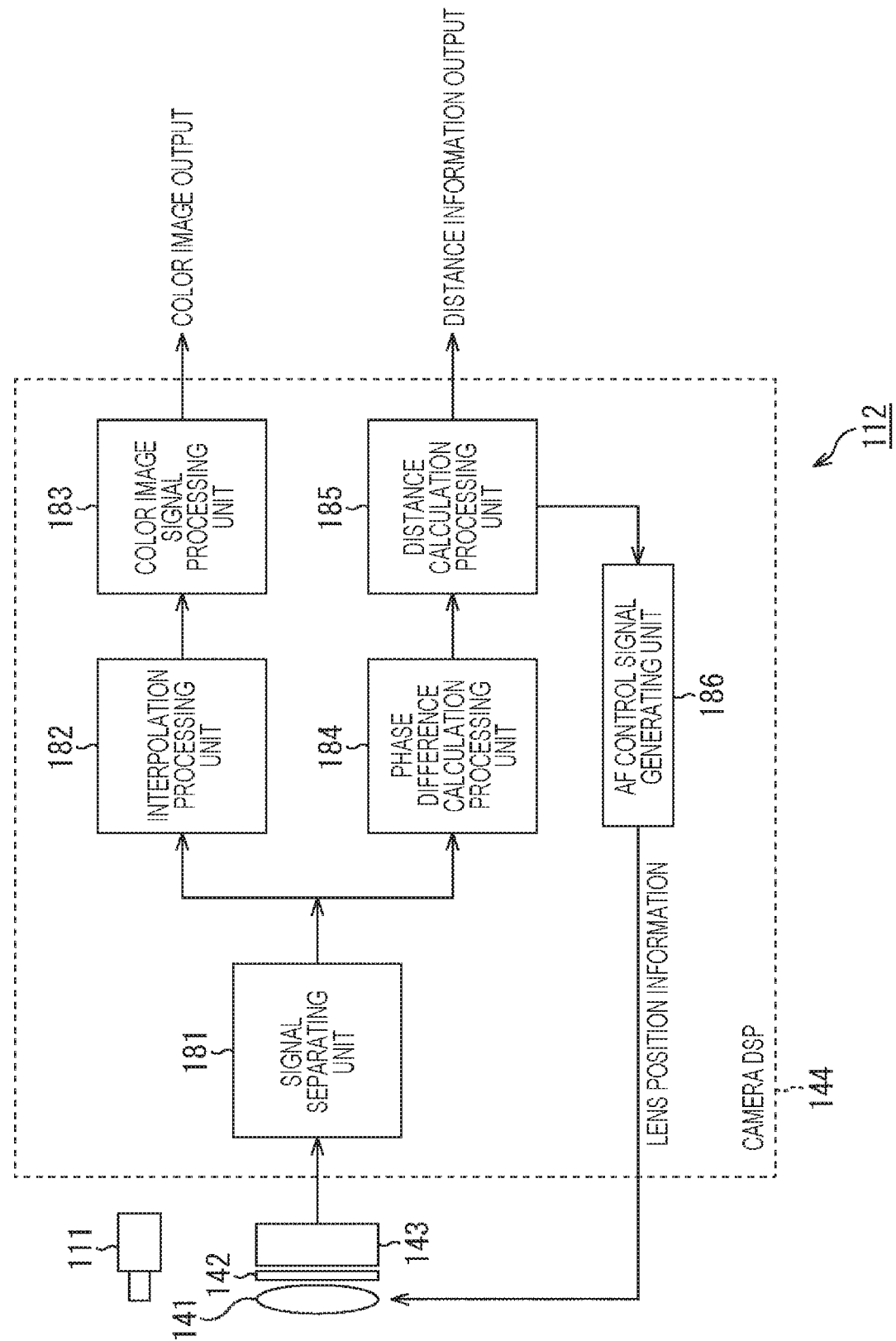
FIG. 21 is a block diagram illustrating a configuration example of a camera digital signal processor (DSP) in the imaging device.

FIG. 21 is a block diagram illustrating a configuration example of a camera DSP in the imaging device.

The camera DSP 144 includes a signal separating unit 181, an interpolation processing unit 182, a color image signal processing unit 183, a phase difference calculation processing unit 184, a distance calculation processing unit 185, and an AF control signal generating unit 186.

The signal separating unit 181 separates the R, G, and B signals from the signals of the image sensor 143 and outputs the R, G, and B signals to the interpolation processing unit 182. Furthermore, the signal separating unit 181 separates the TOF signals from the signals of the image sensor 143 and outputs the TOF signals to the phase difference calculation processing unit 184.

The interpolation processing unit 182 performs interpolation processing such as demosaic processing or the like that generates a pixel signal of a missing color according to an array of the R, G, B pixels, using the R, G, B signals supplied from the signal separating unit 181. The interpolation processing unit 182 outputs a color image generated by performing the interpolation processing to the color image signal processing unit 183.

The color image signal processing unit 183 performs predetermined signal processing on the color image supplied from the interpolation processing unit 182, and outputs the color image after the signal processing to a signal processing unit of a subsequent stage.

The phase difference calculation processing unit 184 calculates a phase difference using the TOF signals supplied from the signal separating unit 181 and outputs phase difference information indicating the calculated phase difference to the distance calculation processing unit 185.

The distance calculation processing unit 185 calculates a distance using the phase difference information supplied from the phase difference calculation processing unit 184, and outputs distance information indicating the calculated distance. The distance information output from the distance calculation processing unit 185 is supplied to the AF control signal generating unit 186 and a signal processing unit (not illustrated) at a subsequent stage.

The AF control signal generating unit 186 calculates lens position information using the distance information supplied from the distance calculation processing unit 185 and a conversion formula from the distance information to the lens position information. The AF control signal generating unit 186 generates an AF control signal on the basis of the calculated lens position information. The AF control signal is output to a drive unit (not illustrated) of the optical system 141.

<Operation of Camera System>

Figure 22:
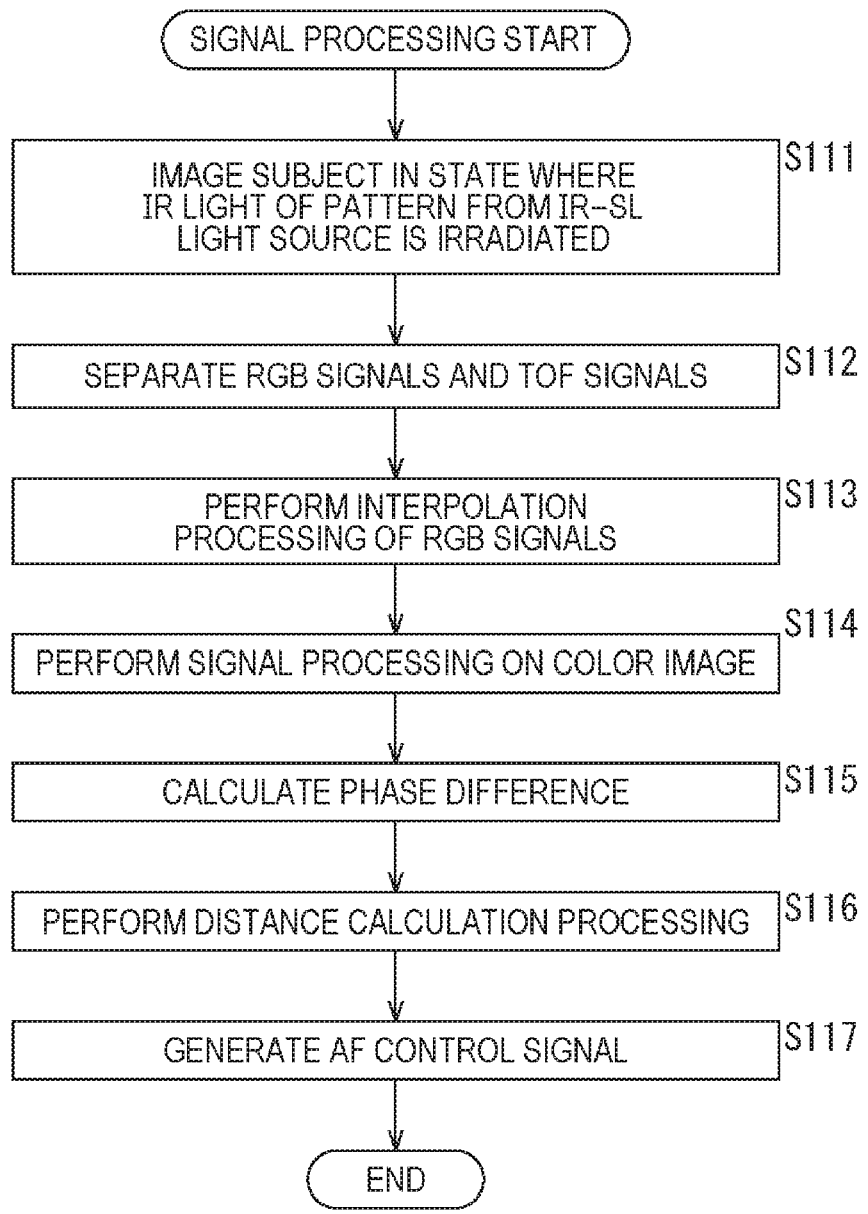
FIG. 22 is a flowchart for describing signal processing of an imaging device of FIG. 12.

Next, signal processing of the imaging device of FIG. 12 will be described with reference to a flowchart of FIG. 22.

In step S111, the image sensor 143 images the subject in a state where the IR light of the dot pattern from the IR light irradiating device 111, which is the IR-SL light source, is irradiated. The image sensor 143 photoelectrically converts the incident light, and performs the A/D conversion on the pixel value of each pixel in the pixel array unit to generate the pixel signals.

In step S112, the signal separating unit 181 separates the RGB signals and the TOF signals from the signals from the image sensor 143.

In step S113, the interpolation processing unit 182 generates a color image by performing interpolation processing of the R, G, and B signals supplied from the signal separating unit 181 and outputs the color image to the color image signal processing unit 183.

In step S114, the color image signal processing unit 183 performs the predetermined signal processing on the color image supplied from the interpolation processing unit 182 and outputs the color image after the signal processing to the signal processing unit of the subsequent stage.

In step S115, the phase difference calculation processing unit 184 calculates the phase difference using the TOF signals supplied from the signal separating unit 181 and outputs the phase difference information indicating the calculated phase difference to the distance calculation processing unit 185.

In step S116, the distance calculation processing unit 185 performs distance calculation processing using the phase difference information supplied from the phase difference calculation processing unit 184. The distance information output as a result of the distance calculation processing is supplied to the AF control signal generating unit 186 and the signal processing unit (not illustrated) at the subsequent stage.

In step S117, the AF control signal generating unit 186 calculates the lens position information using the conversion formula from the distance information supplied from the distance calculation processing unit 185 to the lens position information, and generates the AF control signal on the basis of the calculated lens position information. The AF control signal is output to a drive unit (not illustrated) of the optical system 141.

The color image and the distance information obtained as described above are used according to an application.

For example, the color image and the distance information are used for AF control of a mobile terminal such as a smartphone and the like, a security purpose that requires the color image and the distance information, such as face recognition and the like, and gesture recognition of a game and the like, and the like.

Modification 3

As described above, in the third embodiment, a description has been provided on the assumption that the image sensor is a sensor having an RGB Bayer array, but the present technology can also be applied to a case of using a monochrome sensor or a sensor having a color filter array other than the RGB Bayer array.

In the third embodiment, in the RGB Bayer array of the image sensor, the TOF pixels have been configured to be arranged every four pixels, but the TOF pixels may be configured to have a density different from that of the description described above. Furthermore, an array of the TOF pixels may be asymmetric in longitudinal and transverse directions. Moreover, both of the TOF pixels and image plane phase difference pixels may be arranged.

In the third embodiment, a case where a pattern shape of the SL light source is the dot pattern has been described by way of example, but the pattern shape of the SL light source is not limited to the dot pattern, and may be another shape such as a pattern or the like formed so that light is applied across a plurality of pixels as long as such a shape corresponds to the projection areas of the pixels.

In the third embodiment, a case where the IR cutoff filter is used has been described, but the IR cutoff filter does not need to be necessarily used. The IR cutoff filter is not required, particularly in a case where the IR light is not included in ambient light, such as a case where the IR cutoff filter is used indoor, or the like.

As described above, according to the present technology, since the reflected light from the subject due to the irradiation of the IR light is received only by the TOF pixels, it does not affect the visible signal obtained by the RGB pixels. Therefore, it becomes possible to separate the visible signal and the TOF signal, which are signals having different characteristics.

According to the present technology, it is possible to use a single chip sensor system for a purpose for which a TOF sensor and an image sensor have been used together till now.

Fourth Embodiment

<Configuration Example of Camera System>

Figure 23:
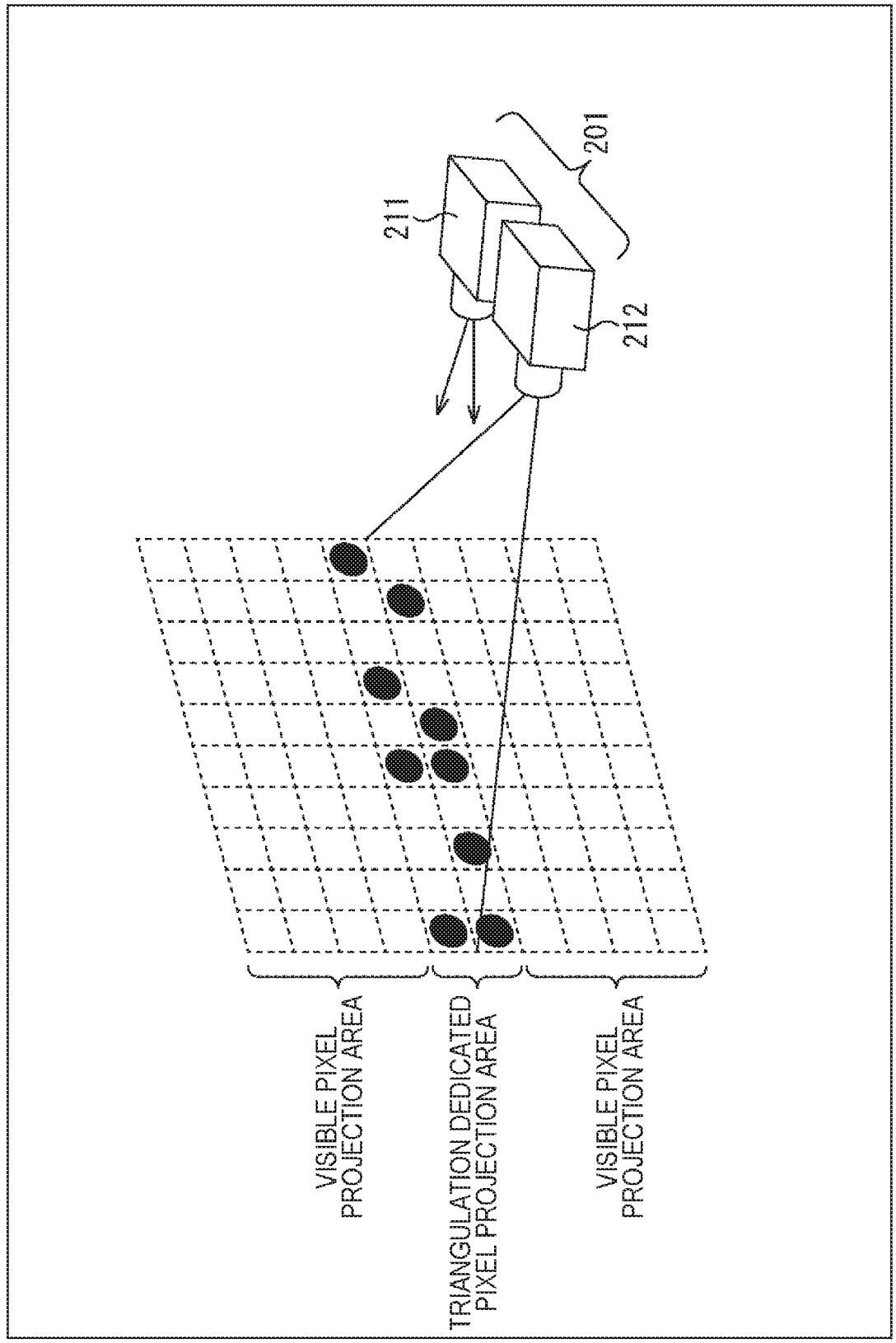
FIG. 23 is a diagram illustrating a fourth configuration example of a camera system to which the present technology is applied.

FIG. 23 is a diagram illustrating a fourth configuration example of a camera system to which the present technology is applied.

The camera system 201 of FIG. 23 includes an IR light irradiating device 211 as an IR-SL light source and an imaging device 212. In FIG. 23, projection areas of pixels are virtually indicated by broken lines on a plane assumed to be a subject. The projection area includes a visible pixel projection area and a triangulation projection area that correspond to a pixel array of the imaging device 212. The visible pixel projection area is an area where visible pixels of R, G, and B pixels are arranged. The triangulation projection area is an area in which pixels for triangulation are arranged.

In FIG. 23, the triangulation projection area is formed at the center of the visible pixel projection area in a longitudinal direction. The triangulation projection area is a band-shaped area having a width of two rows.

The IR light irradiating device 211 is a device that irradiates IR light, and is arranged to fixed to the imaging device 212 in a state of being spaced apart from the imaging device 212 at a predetermined distance required for triangulation. The IR light irradiating device 211 irradiates IR light of a dot pattern to be irradiated only to predetermined pixels randomly located in the triangulation projection area. Each dot of the dot pattern is projected as the IR light from the IR light irradiating device 211, as illustrated by a colored circle, onto projection areas of predetermined pixels in the triangulation projection area.

The imaging device 212 includes an image sensor in which R, G, and B pixels, and pixels for triangulation are arranged. A shutter system of the image sensor may be a rolling shutter system or may be a global shutter system.

The imaging device 212 images a subject in a state where the IR light of the dot pattern to be irradiated only to the predetermined pixels in the triangulation projection area is irradiated by the IR light irradiating device 211. The R, G, and B pixels receive visible light from a predetermined light source. Therefore, in the imaging device 212, a visible image corresponding to signals from the R, G, and B pixels is generated, and distance information is obtained using signals from the pixels for triangulation.

Note that also in the camera system 201, the IR light irradiating device 211 may be configured integrally with the imaging device 212 or may be configured to be detachable from the imaging device 212, as described above with reference to FIGS. 6A and 6B.

<Configuration Example of IR Light Irradiating Device and Imaging Device>

Figure 24:
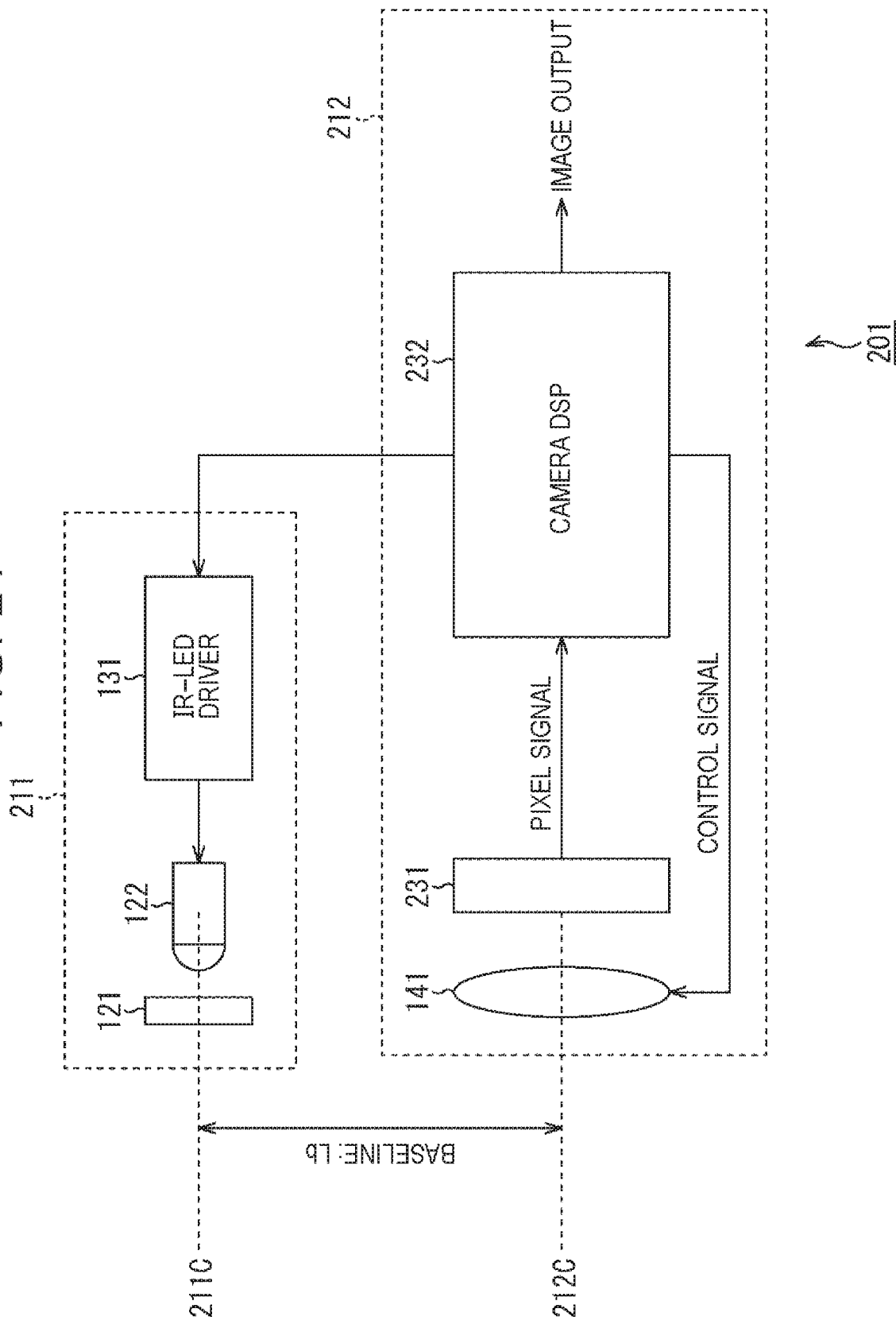
FIG. 24 is a block diagram illustrating a configuration example of an IR light irradiating device and an imaging device.

FIG. 24 is a diagram illustrating a configuration example of an IR light irradiating device and an imaging device. The same configurations as those described with reference to FIG. 14 among the configurations illustrated in FIG. 24 are denoted by the same reference numerals. An overlapping description will be appropriately omitted.

The IR light irradiating device 211 is installed to be fixed to the imaging device 212 in a state where an optical axis 211C of the IR light irradiating device 211 and an optical axis 212C of the image sensor (lens) of the imaging device 212 are spaced apart from each other by a baseline distance Lb.

The IR light irradiating device 211 includes a laser light source 121, a diffraction grating 122, and an IR-LED driver 131, similar to a case of FIG. 14.

The imaging device 212 includes an optical system 141, an image sensor 231, and a camera DSP 232.

The image sensor 231 has a pixel array unit in which R, G, and B pixels and pixels for triangulation are arranged. The image sensor 231 photoelectrically converts the incident light, and performs A/D conversion on a pixel value of each pixel in the pixel array unit to generate pixel signals.

The camera DSP 232 generates a color image using R, G, and B signals from the R, G, and B pixels among a plurality of pixels configuring the pixel array unit of the image sensor 231, and outputs the generated color image to a signal processing unit (not illustrated) of a subsequent stage. Furthermore, the camera DSP 232 calculates a distance using signals for triangulation from the pixels for triangulation among the plurality of pixels configuring the pixel array unit of the image sensor 231, and generates an AF control signal from distance information regarding the calculated distance. The generated AF control signal is used for driving the optical system 141.

The camera DSP 232 generates an LED ON/OFF signal and an LED intensity adjustment signal, and outputs the generated LED ON/OFF signal and LED intensity adjustment signal to the IR-LED driver 131.

<Example of Pixel Array>

Figure 25:
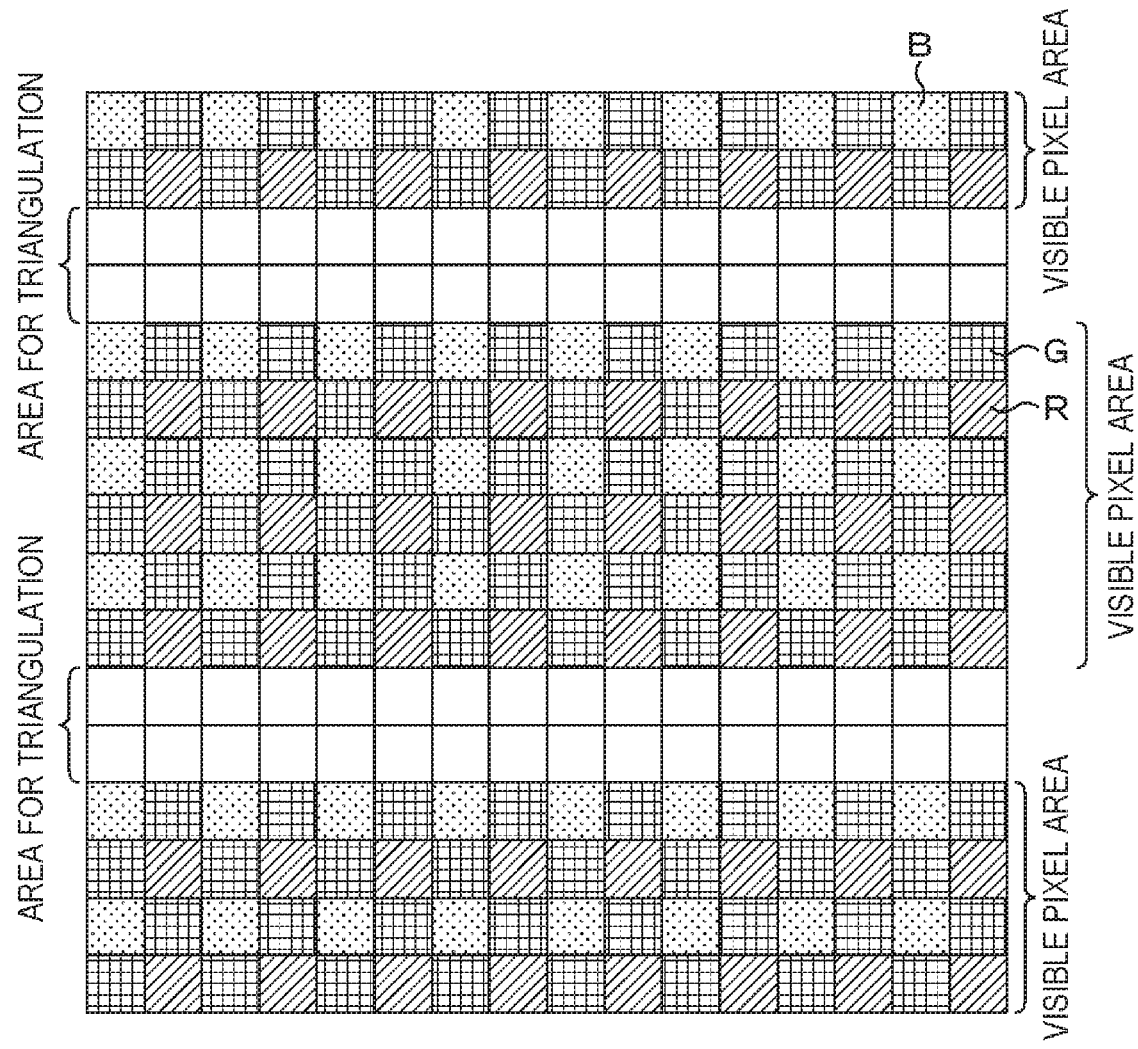
FIG. 25 is a diagram illustrating an example of a pixel array of an image sensor.

FIG. 25 is a diagram illustrating an example of a pixel array of an image sensor.

The pixel array unit of the image sensor 231 includes visible pixel areas in which the R, G, and B pixels are arranged and areas for triangulation in which the pixels for triangulation are arranged, as illustrated in FIG. 25.

The pixel array unit of the image sensor 231 is configured such that every first to third rows of a 2×2 Bayer array is the visible pixel area and every fourth row of the 2×2 Bayer array is the area for triangulation.

<Configuration Example of Camera DSP>

Figure 26:
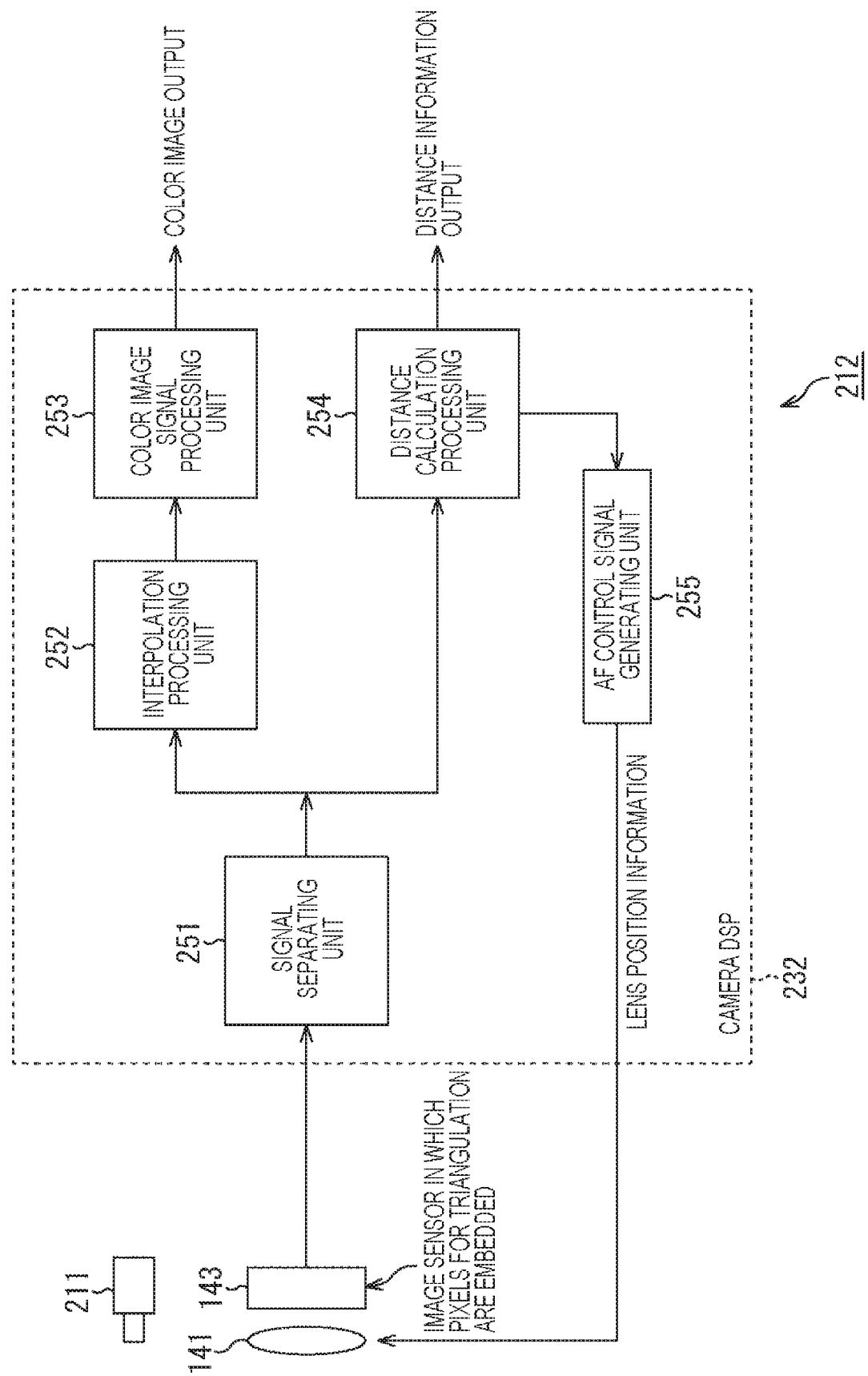
FIG. 26 is a block diagram illustrating a configuration example of a camera DSP in the imaging device.

FIG. 26 is a block diagram illustrating a configuration example of a camera DSP in the imaging device.

The camera DSP 232 includes a signal separating unit 251, an interpolation processing unit 252, a color image signal processing unit 253, a distance calculation processing unit 254, and an AF control signal generating unit 255.

The signal separating unit 251 separates the R, G, and B signals from the signals of the image sensor 143 and outputs the R, G, and B signals to the interpolation processing unit 252. Furthermore, the signal separating unit 251 separates the signals for triangulation from the signals of the image sensor 143 and outputs the signals for triangulation to the distance calculation processing unit 254.

The interpolation processing unit 252 generates a color image by performing interpolation processing such as demosaic processing or the like that generates a pixel signal of a missing color according to an array of the R, G, B pixels, using the R, G, B signals supplied from the signal separating unit 251, and outputs the color image to the color image signal processing unit 253.

The color image signal processing unit 253 performs predetermined signal processing on the color image supplied from the interpolation processing unit 252, and outputs the color image after the signal processing to a signal processing unit of a subsequent stage.

The distance calculation processing unit 254 calculates a distance using the signals for triangulation supplied from the interpolation processing unit 252, and outputs distance information indicating the calculated distance. The output distance information is supplied to the AF control signal generating unit 255 and a signal processing unit (not illustrated) at a subsequent stage.

The AF control signal generating unit 255 calculates lens position information using a conversion formula from the distance information supplied from the distance calculation processing unit 254 to the lens position information, and generates an AF control signal on the basis of the calculated lens position information. The generated AF control signal is output to a drive unit (not illustrated) of the optical system 141.

<Operation of Camera System>

Next, signal processing of the imaging device of FIG. 23 will be described with reference to a flowchart of FIG. 27.

Figure 27:
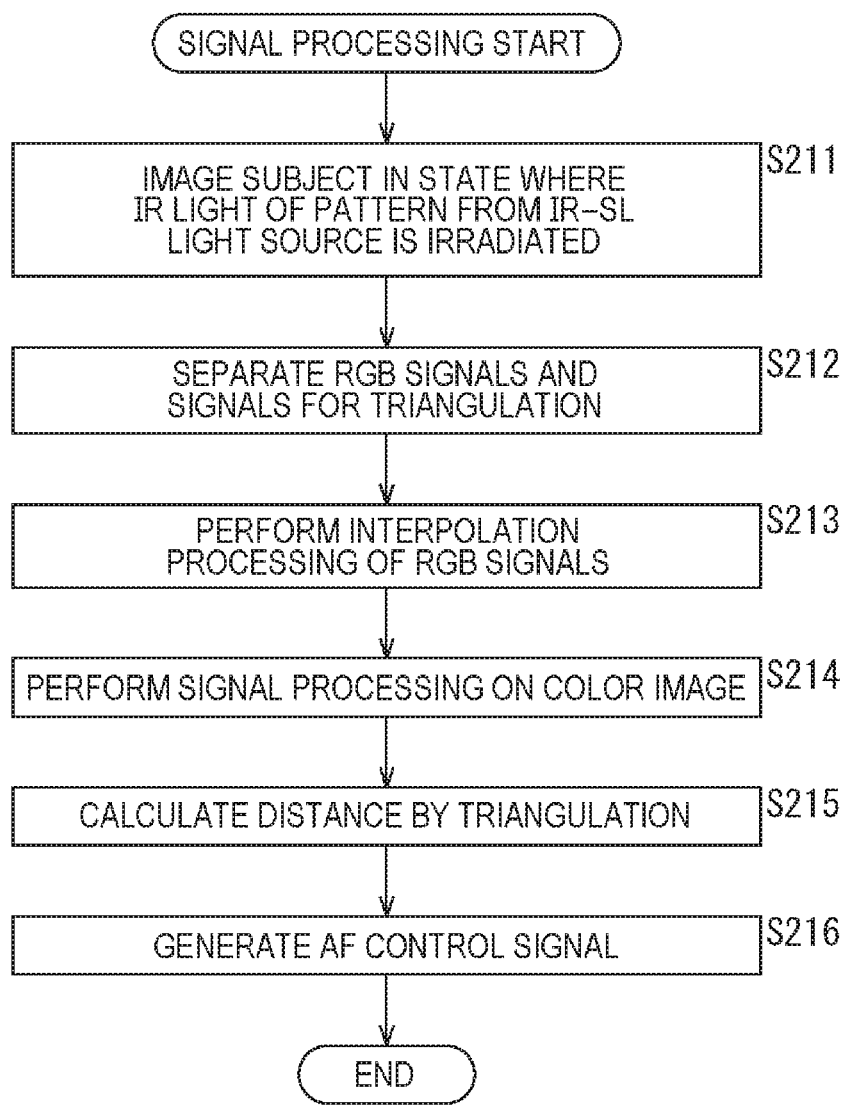
FIG. 27 is a flowchart for describing signal processing of an imaging device of FIG. 23.

In step S211 of FIG. 27, the image sensor 143 images the subject in a state where the IR light of the dot pattern from the IR light irradiating device 211, which is the IR-SL light source, is irradiated. The image sensor 143 photoelectrically converts the incident light, and performs the A/D conversion on the pixel value of each pixel in the pixel array unit to generate the pixel signals.

In step S212, the signal separating unit 251 separates the RGB signals and the signals for triangulation from the signals from the image sensor 143. The separated RGB signals are output to the interpolation processing unit 252, and the separated signals for triangulation are output to the distance calculation processing unit 254.

In step S213, the interpolation processing unit 252 generates a color image by performing interpolation processing of the R, G, and B signals supplied from the signal separating unit 251 and outputs the color image to the color image signal processing unit 253.

In step S214, the color image signal processing unit 253 performs the predetermined signal processing on the color image supplied from the interpolation processing unit 252, and outputs the color image after the signal processing to the signal processing unit of the subsequent stage.

In step S215, the distance calculation processing unit 254 performs distance calculation processing using the signals for triangulation supplied from the signal separating unit 251. The distance information output as a result of the distance calculation processing is supplied to the AF control signal generating unit 255 and the signal processing unit (not illustrated) at the subsequent stage.

In step S216, the AF control signal generating unit 255 calculates the lens position information using the conversion formula from the distance information supplied from the distance calculation processing unit 254 to the lens position information, and generates the AF control signal on the basis of the calculated lens position information. The generated AF control signal is output to a drive unit (not illustrated) of the optical system 141.

The color image and the distance information obtained as described above are used according to an application.

For example, the color image and the distance information are used for AF control of a mobile terminal such as a smartphone and the like, a security purpose that requires the color image and the distance information, such as face recognition and the like, and gesture recognition of a game and the like, and the like.

Modification 4

As described above, in the fourth embodiment, a description has been provided on the assumption that the image sensor is a sensor having an RGB Bayer array, but the present technology can be applied to a monochrome sensor or a sensor having a color filter array other than the RGB Bayer array.

In the fourth embodiment, in the sensor having the RGB Bayer array, the pixels for triangulation have been configured to be arranged every four rows of a longitudinal Bayer array, but the pixels for triangulation may be configured to have a different density. Furthermore, in the description described above, an example in which the area for triangulation which is the band-shaped area is configured at the width of the two rows has been described, but the area for triangulation may be configured at a width of one row or may be configured at another width.

In the fourth embodiment, an example in which the pixels for triangulation are arranged has been described, but the pixels for triangulation described in the third and fourth embodiments may be combined with the TOF pixels for described in the third embodiment. That is, it is also possible to arrange the pixels for triangulation and the TOF pixels in the band-shaped triangulation projection areas according to the fourth embodiment to simultaneously perform the triangulation and distance measurement in a TOF manner. In this case, accuracy of distance measurement can be improved.

As described above, according to the present technology, since the reflected light from the subject due to the irradiation of the IR light is received only by the pixels for triangulation, it does not affect the visible signal obtained by the RGB pixels. Therefore, it becomes possible to separate the visible signal and the signal for triangulation, which are signals having different characteristics.

According to the present technology, it is possible to use a single chip sensor system for a purpose for which a sensor for triangulation and an image sensor have been used together till now.

Fifth Embodiment

<Hardware Configuration Example of Computer>

The series of processing described above can be executed by hardware or can be executed by software. In a case where the series of processing is executed by the software, programs configuring the software are installed in a computer. Here, the computer includes a computer incorporated in dedicated hardware, or, for example, a general-purpose personal computer that can execute various functions by installing various programs, or the like.

Figure 28:
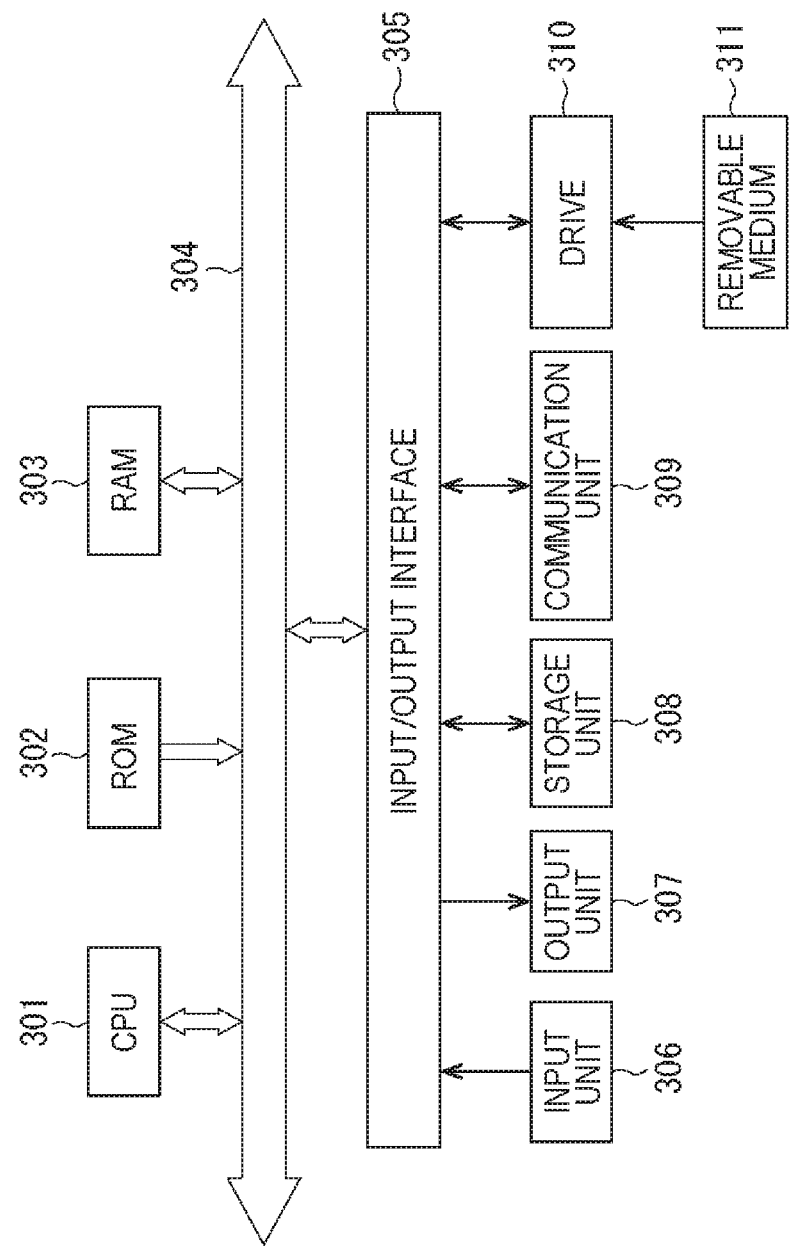
FIG. 28 is a block diagram illustrating a configuration example of a computer.

FIG. 28 is a block diagram illustrating a hardware configuration example of a computer that executes the series of processing described above by a program.

In the computer illustrated in FIG. 28, a central processing unit (CPU) 301, a read only memory (ROM) 302, and a random access memory (RAM) 303 are connected to each other via a bus 304.

An input/output interface 305 is also connected to the bus 304. An input unit 306, an output unit 307, a storage unit 308, a communication unit 309, and a drive 310 are connected to the input/output interface 305.

The input unit 306 includes, for example, a keyboard, a mouse, a microphone, a touch panel, an input terminal, and the like. The output unit 307 includes, for example, a display, a speaker, an output terminal, and the like. The storage unit 308 includes, for example, a hard disc, a RAM disc, a nonvolatile memory, and the like. The communication unit 309 includes, for example, a network interface. The drive 310 drives a removable medium 311 such as a magnetic disc, an optical disc, a magneto-optical disc, a semiconductor memory, or the like.

In the computer configured as described above, the CPU 301 performs the series of processing described above by loading, for example, a program stored in the storage unit 308 into the RAM 303 via the input/output interface 305 and the bus 304 and executing the program. Furthermore, the RAM 303 also appropriately stores data and the like necessary for the CPU 301 to execute various processing.

The program executed by the computer (CPU 301) can be applied by being recorded on the removable medium 311 as, for example, a package medium and the like. In that case, the program can be installed in the storage unit 308 via the input/output interface 305 by mounting the removable medium 311 on the drive 310.

Furthermore, the program can be provided via a wired or wireless transmission medium such as a local area network, the Internet, or digital satellite broadcasting. In that case, the program can be received by the communication unit 309 and installed in the storage unit 308.

In addition, the program can be installed in the ROM 302 or the storage unit 308 in advance.

Note that the program executed by a communication device may be a program by which processing is performed in time series according to the order described in the present specification or may be a program by which processing is performed in parallel or at a necessary timing such as a timing when a call is made, or the like.

Hereinabove, the preferred embodiments of the present disclosure have been described in detail with reference to the accompanying drawings, but the present disclosure is not limited to such embodiments. It is apparent to those skilled in the art to which the present disclosure belongs that various modifications or alterations can be conceived within the scope of the technical idea described in the claims, and it is naturally understood that these modifications or alterations also fall within the technical scope of the present disclosure.

Application Example 1

The technology according to the present disclosure can be applied to various products. For example, the technology according to the present disclosure may be realized as a device mounted in any type of moving body such as a vehicle, an electric vehicle, a hybrid electric vehicle, a motorcycle, a bicycle, a personal mobility, an airplane, a drone, a ship, a robot, a construction machine, an agricultural machine (tractor), and the like.

Figure 29:
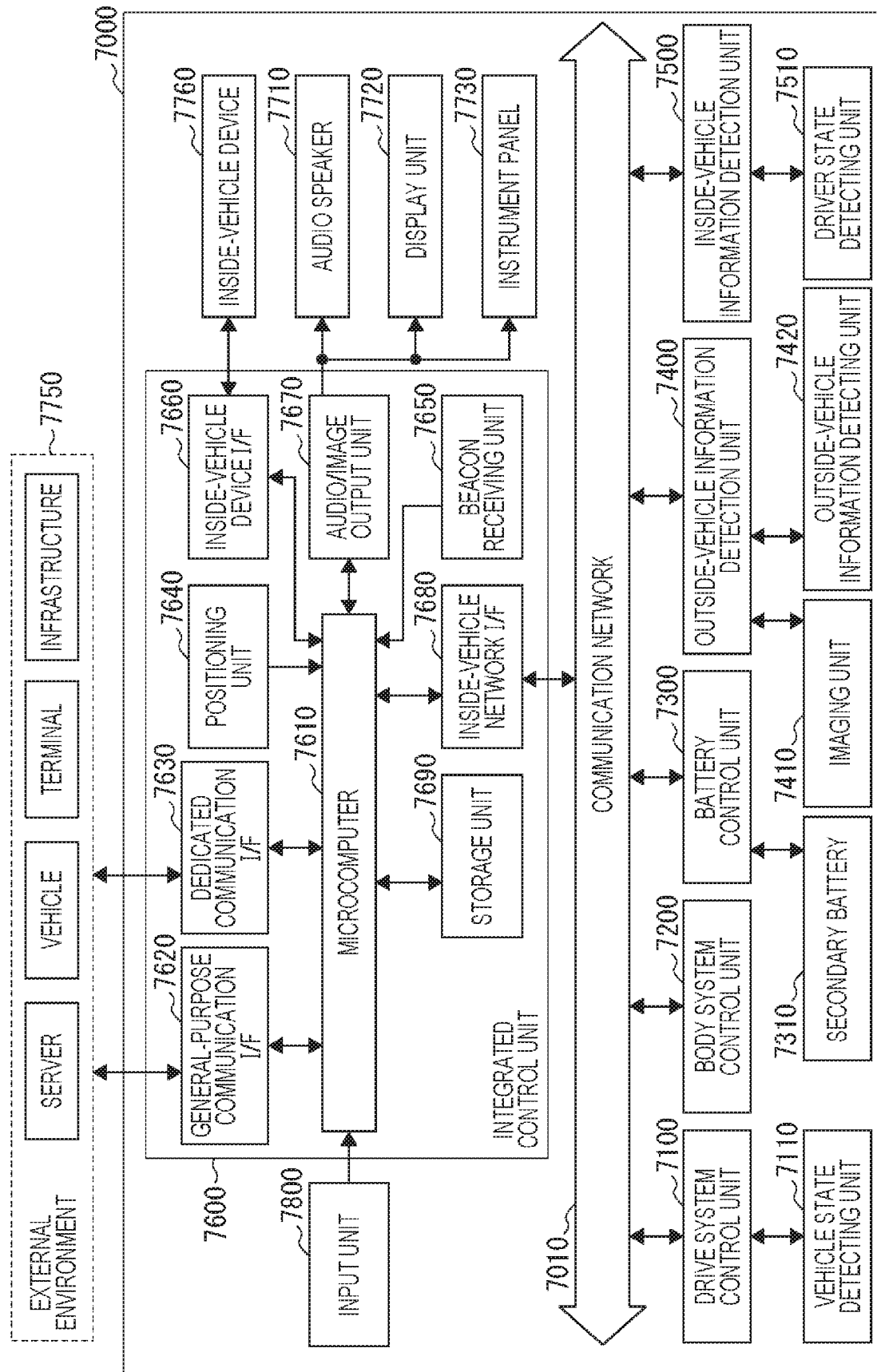
FIG. 29 is a block diagram illustrating an example of a schematic configuration of a vehicle control system.

FIG. 29 is a block diagram illustrating a schematic configuration example of a vehicle control system 7000 which is an example of a moving body control system to which the technology according to the present disclosure can be applied. The vehicle control system 7000 includes a plurality of electronic control units connected to each other via a communication network 7010. In the example illustrated in FIG. 29, the vehicle control system 7000 includes a drive system control unit 7100, a body system control unit 7200, a battery control unit 7300, an outside-vehicle information detection unit 7400, an inside-vehicle information detection unit 7500, and an integrated control unit 7600. The communication network 7010 connecting a plurality of these control units to each other may be, for example, an inside-vehicle communication network according to an arbitrary standard such as a controller area network (CAN), a local interconnect network (LIN), a local area network (LAN), FlexRay (registered trademark), and the like.

Each control unit includes a microcomputer that performs arithmetic processing according to various programs, a storage unit that stores programs executed by the microcomputer, parameters used for various operations, or the like, and a drive circuit that drives various control target devices. Each control unit includes a network interface (I/F) for performing communication with other control units via the communication network 7010, and includes a communication I/F for performing communication with devices, sensors or the like inside and outside a vehicle by wire communication or wireless communication. In FIG. 29, as a functional configuration of the integrated control unit 7600, a microcomputer 7610, a general-purpose communication I/F 7620, a dedicated communication I/F 7630, a positioning unit 7640, a beacon receiving unit 7650, an inside-vehicle device I/F 7660, an audio/image output unit 7670, an inside-vehicle network I/F 7680, and a storage unit 7690 are illustrated. Similarly, other control units include a microcomputer, a communication I/F, a storage unit, and the like.

The drive system control unit 7100 controls operations of devices related to a drive system of the vehicle according to various programs. For example, the drive system control unit 7100 functions as a control device of a driving force generation device for generating a driving force of the vehicle, such as an internal combustion engine, a drive motor or the like, a driving force transfer mechanism for transferring the driving force to wheels, a steering mechanism for adjusting a steering angle of the vehicle, a braking device for generating a braking force of the vehicle, and the like. The drive system control unit 7100 may have a function as a control device such as an antilock brake system (ABS), an electronic stability control (ESC) or the like.

A vehicle state detecting unit 7110 is connected to the drive system control unit 7100. The vehicle state detecting unit 7110 includes at least one of, for example, a gyro sensor that detects an angular velocity of an axial rotational motion of a vehicle body, an acceleration sensor that detects an acceleration of the vehicle, or a sensor for detecting an operation amount of an accelerator pedal, an operation amount of a brake pedal, a steering angle of a steering wheel, an engine speed, a rotation speed of a wheel, or the like. The drive system control unit 7100 performs arithmetic processing using a signal input from the vehicle state detecting unit 7110 to control the internal combustion engine, the drive motor, an electric power steering device, a brake device, or the like.

The body system control unit 7200 controls operations of various devices mounted on the vehicle body according to various programs. For example, the body system control unit 7200 functions as a control device of a keyless entry system, a smart key system, a power window device, or various lamps such as a headlamp, a back lamp, a brake lamp, a blinker, a fog lamp, and the like. In this case, electric waves or signals of various switches transmitted from a portable device substituting for a key can be input to the body system control unit 7200. The body system control unit 7200 receives inputs of these electric waves or signals, and controls a door lock device, a power window device, a lamp, and the like of the vehicle.

The battery control unit 7300 controls a secondary battery 7310, which is a power supply source of the drive motor, according to various programs. For example, information such as a battery temperature, a battery output voltage, the remaining capacity of a battery, or the like is input from a battery device including the secondary battery 7310 to the battery control unit 7300. The battery control unit 7300 performs arithmetic processing using these signals, and performs temperature adjustment control of the secondary battery 7310 or control of a cooling device and the like provided in the battery device.

The outside-vehicle information detection unit 7400 detects information regarding the outside of the vehicle in which the vehicle control system 7000 is mounted. For example, at least one of an imaging unit 7410 or an outside-vehicle information detecting unit 7420 is connected to the outside-vehicle information detection unit 7400. The imaging unit 7410 includes at least one of a time of flight (ToF) camera, a stereo camera, a monocular camera, an infrared camera, or other cameras. The outside-vehicle information detecting unit 7420 includes at least one of, for example, an environmental sensor for detecting current weather or atmospheric phenomena or a surrounding information detecting sensor for detecting other vehicles, obstacles, pedestrians, or the like, around the vehicle in which the vehicle control system 7000 is mounted.

The environmental sensor may be, for example, at least one of a raindrop sensor that detects rainy weather, a fog sensor that detects fog, a sunshine sensor that detects a sunshine degree, or a snow sensor that detects snowfall. The surrounding information detecting sensor may be at least one of an ultrasonic sensor, a radar device, or a light detection and ranging or laser imaging detection and ranging (LIDAR) device. The imaging unit 7410 and the outside-vehicle information detecting unit 7420 may be provided as independent sensors or devices, respectively, or may be provided as a device in which a plurality of sensors or devices is integrated.

Figure 30:
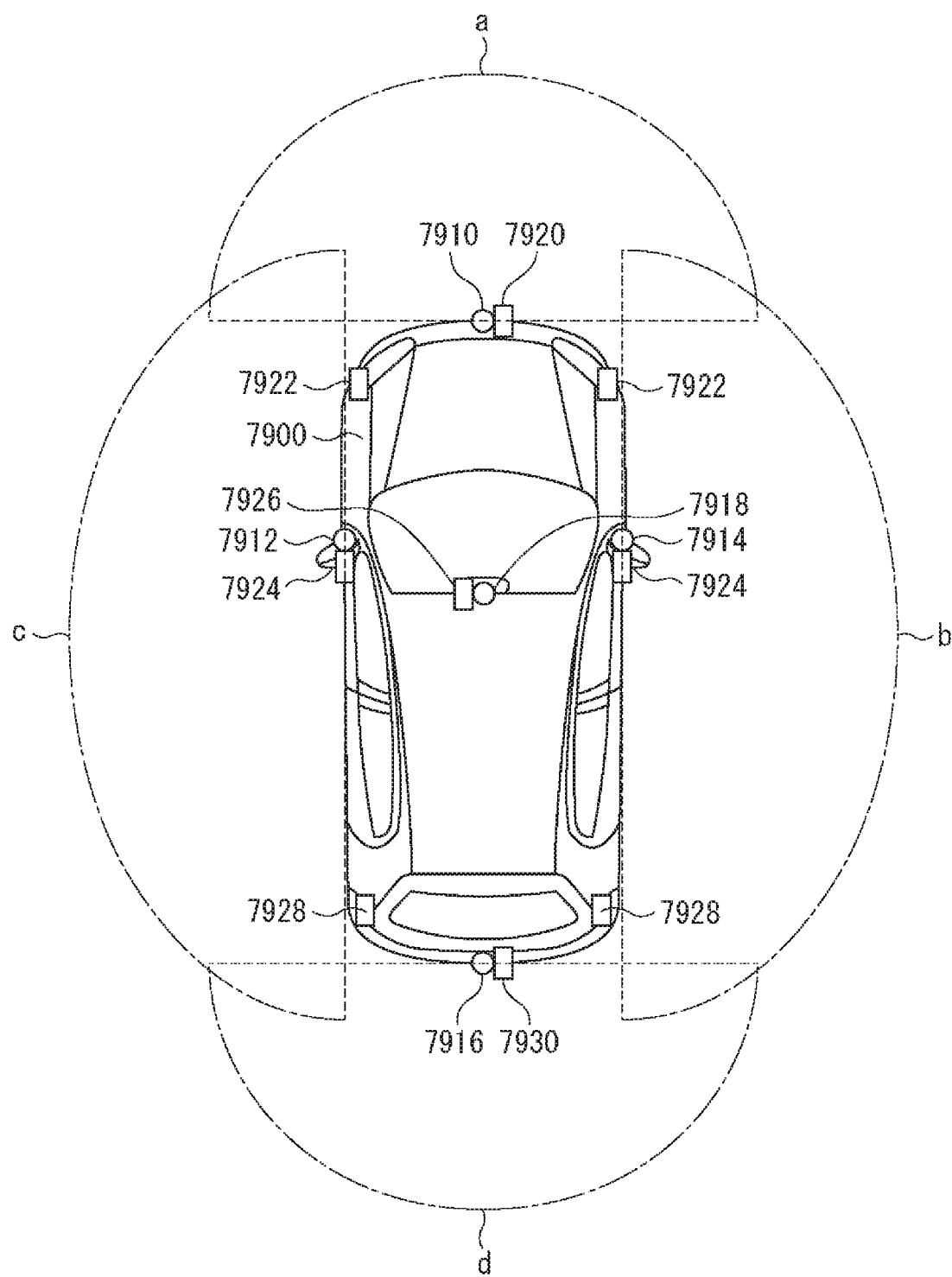
FIG. 30 is an explanatory diagram illustrating an example of installation positions of an outside-vehicle information detecting unit and an imaging unit.

Here, FIG. 30 illustrates an example of installation positions of the imaging unit 7410 and the outside-vehicle information detecting unit 7420. Imaging units 7910, 7912, 7914, 7916, and 7918 are provided on, for example, at least one position of a front nose, side mirrors, a rear bumper, a back door, and an upper portion of a windshield of a vehicle interior, and the like, of a vehicle 7900. The imaging unit 7910 provided on the front nose and the imaging unit 7918 provided on the upper portion of the windshield of the vehicle interior mainly acquire images of a region in front of the vehicle 7900. The imaging units 7912 and 7914 provided on the side mirrors mainly acquire images of side regions of the vehicle 7900. The imaging units 7916 provided on the rear bumper or the back door mainly acquire an image of a region behind the vehicle 7900. The imaging unit 7918 provided on the upper portion of the windshield in the vehicle interior is mainly used to detect preceding vehicles, pedestrians, obstacles, traffic lights, traffic signs, lanes, or the like.

Note that FIG. 30 illustrates an example of imaging ranges of the respective imaging units 7910, 7912, 7914, and 7916. An imaging range a indicates an imaging range of the imaging unit 7910 provided on the front nose, imaging ranges b and c indicate imaging ranges of the imaging units 7912 and 7914 provided on the side mirrors, respectively, and an imaging range d indicates an imaging range of the imaging unit 7916 provided on the rear bumper or the back door. For example, by overlaying image data captured by the imaging units 7910, 7912, 7914, and 7916 with each other, a bird's eye view image of the vehicle 7900 viewed from above can be obtained.

Vehicle-outside information detecting units 7920, 7922, 7924, 7926, 7928, 7930 provided on the front, the rear, the sides, the corners, and the upper portion of the windshield of the vehicle interior of the vehicle 7900 may be, for example, ultrasonic sensors or radar devices. The vehicle-outside information detecting units 7920, 7926, and 7930 provided on the front nose, the rear bumper, the back door, and the upper portion of the windshield in the vehicle interior of the vehicle 7900 may be, for example, LIDAR devices. These outside-vehicle information detecting units 7920 to 7930 are mainly used for detecting preceding vehicles, pedestrians, obstacles, or the like.

A description will be continued again with reference to FIG. 29. The outside-vehicle information detection unit 7400 causes the imaging unit 7410 to capture an image of the outside of the vehicle, and receives the captured image data. Furthermore, the outside-vehicle information detection unit 7400 receives detection information from the outside-vehicle information detecting unit 7420 connected thereto. In a case where the outside-vehicle information detecting unit 7420 is the ultrasonic sensor, the radar device, or the LIDAR device, the outside-vehicle information detection unit 7400 transmits an ultrasonic wave, an electromagnetic wave or the like, and receives information of received reflected wave. The outside-vehicle information detection unit 7400 may perform object detection processing or distance detection processing of a person, a vehicle, an obstacle, a sign, characters on a road surface, or the like on the basis of the received information. The outside-vehicle information detection unit 7400 may perform environment recognition processing for recognizing rainfall, fog, a road surface situation, or the like, on the basis of the received information. The outside-vehicle information detection unit 7400 may calculate a distance to an object outside the vehicle on the basis of the received information.

Furthermore, the outside-vehicle information detection unit 7400 may perform image recognition processing or distance detection processing for recognizing the person, the vehicle, the obstacle, the sign, the characters on the road surface, or the like on the basis of the received image data. The outside-vehicle information detection unit 7400 may perform processing such as distortion correction, alignment or the like on the received image data, and synthesize image data captured by different imaging units 7410 with each other to generate a bird's eye view image or a panoramic image. The outside-vehicle information detection unit 7400 may perform viewpoint conversion processing using the image data captured by the different imaging units 7410.

The inside-vehicle information detection unit 7500 detects information regarding the inside of the vehicle. For example, a driver state detecting unit 7510 detecting a state of a driver is connected to the inside-vehicle information detection unit 7500. The driver state detecting unit 7510 may include a camera imaging the driver, a biological sensor detecting biological information of the driver, a microphone collecting an audio in the vehicle interior, or the like. The biological sensor is provided on, for example, a seat surface, a steering wheel or the like, and detects biological information of a passenger sitting on a seat or the driver holding the steering wheel. The inside-vehicle information detection unit 7500 may calculate a fatigue degree or a concentration degree of the driver or may determine whether or not the driver is dozing, on the basis of detection information input from the driver state detecting unit 7510. The inside-vehicle information detection unit 7500 may perform processing such as noise canceling processing and the like on a collected audio signal.

The integrated control unit 7600 generally controls an operation within the vehicle control system 7000 according to various programs. An input unit 7800 is connected to the integrated control unit 7600. The input unit 7800 is realized by, for example, a device that can be input-operated by a passenger, such as a touch panel, a button, a microphone, a switch, a lever, or the like. Data obtained by recognizing an audio input by the microphone may be input to the integrated control unit 7600. The input unit 7800 may be, for example, a remote control device using an infrared ray or other electric waves, or may be an external connection device such as a mobile phone, a personal digital assistant (PDA) or the like corresponding to an operation of the vehicle control system 7000. The input unit 7800 may be, for example, a camera. In that case, the passenger can input information by a gesture. Alternatively, data obtained by detecting movement of a wearable device worn by the passenger may be input. Moreover, the input unit 7800 may include, for example, an input control circuit or the like that generates an input signal on the basis of the information input by the passenger or the like using the input unit 7800 described above and outputs the generated input signal to the integrated control unit 7600. The passenger or the like inputs various data to the vehicle control system 7000 or instructs the vehicle control system 7000 to perform a processing operation by operating the input unit 7800.

The storage unit 7690 may include a ROM storing various programs executed by a microcomputer and a RAM storing various parameters, calculation results, sensor values, or the like. Furthermore, the storage unit 7690 may be realized by, for example, a magnetic storage unit device such as a hard disc drive (HDD) and the like, a semiconductor storage device, an optical storage device, a magneto-optical storage device, or the like.

The general-purpose communication I/F 7620 is a general-purpose communication I/F mediating communication with various devices existing in an external environment 7750. The general-purpose communication I/F 7620 may implement a cellular communication protocol such as global system of mobile communications (GSM) (registered trademark), WiMAX (registered trademark), long term evolution (LTE) (registered trademark), LTE-Advanced (LTE-A), or the like, or other wireless communication protocols such as a wireless LAN (also referred to as Wi-Fi (registered trademark)), Bluetooth (registered trademark), and the like. The general-purpose communication I/F 7620 may be connected to a device (for example, an application server or a control server) existing on an external network (for example, the Internet, a cloud network, or a network unique to an operator) via a base station or an access point, for example. Furthermore, the general-purpose communication I/F 7620 may be connected to a terminal (for example, a terminal of a driver, a pedestrian, or a shop or a machine type communication (MTC) terminal) existing near the vehicle using a peer to peer (P2P) technology, for example.

The dedicated communication I/F 7630 is a communication I/F supporting a communication protocol formulated for use in the vehicle. The dedicated communication I/F 7630 may implement a standard protocol such as wireless access in vehicle environment (WAVE), dedicated short range communications (DSRC), or a cellular communication protocol, which is a combination of IEEE 802.11p of a lower layer and IEEE 1609 of an upper layer, for example. The dedicated communication I/F 7630 typically performs V2X communication, which is a concept including one or more of vehicle-to-vehicle communication, vehicle-to-infrastructure communication, vehicle-to-home communication, and vehicle-to-pedestrian communication.

The positioning unit 7640 receives, for example, a global navigation satellite system (GNSS) signal from a GNSS satellite (for example, a global positioning system (GPS) signal from a GPS satellite) and executes positioning to generate position information including latitude, longitude, and altitude of the vehicle. Note that the positioning unit 7640 may specify a current position by exchanging a signal with a wireless access point or may acquire position information from a terminal such as a mobile phone, a personal handyphone service (PHS), or a smartphone having a positioning function.

The beacon receiving unit 7650 receives, for example, a radio wave or an electromagnetic wave transmitted from a wireless station or the like installed on a road to acquire information such as a current position, congestion, suspension of traffic, required time, and the like. Note that a function of the beacon receiving unit 7650 may be included in the dedicated communication I/F 7630 described above.

The inside-vehicle device I/F 7660 is a communication interface mediating connection between the microcomputer 7610 and various inside-vehicle devices 7760 existing in the vehicle. The inside-vehicle device I/F 7660 may establish wireless connection using a wireless communication protocol such as wireless LAN, Bluetooth (registered trademark), near field communication (NFC), or a wireless universal serial bus (WUSB). Furthermore, the inside-vehicle device I/F 7660 may establish wired connection such as a universal serial bus (USB), a high-definition multimedia interface (HDMI) (registered trademark), a mobile high-definition link (MHL), or the like, via a connection terminal (not illustrated) (and a cable if necessary). The inside-vehicle device 7760 may include at least one of, for example, a mobile device or a wearable device possessed by the passenger, or an information device that is carried or mounted in the vehicle. Furthermore, the inside-vehicle device 7760 may include a navigation device that searches for a route to an arbitrary destination. The inside-vehicle device I/F 7660 exchanges control signals or data signals with these inside-vehicle devices 7760.

The inside-vehicle network I/F 7680 is an interface mediating communication between the microcomputer 7610 and the communication network 7010. The inside-vehicle network I/F 7680 transmits and receives a signal and the like in accordance with a predetermined protocol supported by the communication network 7010.

The microcomputer 7610 of the integrated control unit 7600 controls the vehicle control system 7000 according to various programs on the basis of the information acquired via at least one of the general-purpose communication I/F 7620, the dedicated communication I/F 7630, the positioning unit 7640, the beacon receiving unit 7650, the inside-vehicle device I/F 7660, or the inside-vehicle network I/F 7680. For example, the microcomputer 7610 calculates a control target value of the driving force generation device, the steering mechanism, or the braking device on the basis of the acquired information inside and outside the vehicle, and outputs a control command to the drive system control unit 7100. For example, the microcomputer 7610 may perform cooperation control for the purpose of realizing a function of an advanced driver assistance system (ADAS) including collision avoidance or shock mitigation of the vehicle, following traveling based on an inter-vehicle distance, vehicle speed maintenance traveling, collision warning of the vehicle, lane departure warning of the vehicle, and the like. Furthermore, the microcomputer 7610 may perform cooperation control for the purpose of automatic drive or the like in which the vehicle autonomously travels without depending on a driver's operation by controlling the driving force generating device, the steering mechanism, the braking device, or the like, on the basis of the acquired surrounding information of the vehicle.

The microcomputer 7610 may generate three-dimensional distance information between the vehicle and an object such as a structure, a person or the like around the vehicle, on the basis of the information acquired via at least one of the general-purpose communication I/F 7620, the dedicated communication I/F 7630, the positioning unit 7640, the beacon receiving unit 7650, the inside-vehicle device I/F 7660, or the inside-vehicle network I/F 7680, and create local map information including surrounding information of a current position of the vehicle. Furthermore, the microcomputer 7610 may predict a danger such as collision of the vehicle, approach of the pedestrian or the like, approach to a restricted road, or the like, on the basis of the acquired information, and generate a warning signal. The warning signal may be, for example, a signal for generating a warning sound or turning on a warning lamp.

The audio/image output unit 7670 transmits at least one of an audio output signal and an image output signal to an output device capable of visually or auditorily notifying the passenger of the vehicle or the outside of the vehicle of information. In the example of FIG. 29, an audio speaker 7710, a display unit 7720, and an instrument panel 7730 are exemplified as the output device. The display unit 7720 may include, for example, at least one of an on-board display or a head-up display. The display unit 7720 may have an augmented reality (AR) display function. The output device may be another device such as a headphone, a wearable device such as a glasses-type display or the like worn by the passenger, a projector, a lamp, or the like, other than the devices described above. In a case where the output device is a display device, the display device visually displays results obtained by various processing performed by the microcomputer 7610 or information received from other control units in various formats such as a text, an image, a table, a graph, and the like. Furthermore, in a case where the output device is an audio output device, the audio output device converts an audio signal including reproduced audio data, acoustic data, or the like into an analog signal and auditorily outputs the analog signal.

Note that in the example illustrated in FIG. 29, at least two control units connected to each other via the communication network 7010 may be integrated as one control unit. Alternatively, individual control units may be configured by a plurality of control units, respectively. Moreover, the vehicle control system 7000 may include another control unit (not illustrated). Furthermore, in the description described above, some or all of the functions of any one of the control units may be undertaken by other control units. That is, as long as information is transmitted and received via the communication network 7010, predetermined arithmetic processing may be performed by any one of the control units. Similarly, a sensor or device connected to any one of the control units may be connected to the other control units, and the plurality of control units may transmit/receive detection information to/from each other via the communication network 7010.

In the vehicle control system 7000 described above, the camera system according to the present embodiment described with reference to FIGS. 1, 2, 3, 4, 5, 6A, 6B, 7, 8, 9A, 9B, 10, 11A, 11B, 11C, 12, 13, 14, 15, 16, 17, 18, 19, 20, 21, 22, 23, 24, 25, 26, and 27 can be applied to the imaging unit 7410 or the outside-vehicle information detecting unit 7420 in FIG. 29. For example, by applying the present technology to the imaging unit 7410 or the outside-vehicle information detecting unit 7420, it is possible to accurately perform detection of a surrounding preceding vehicle, a pedestrian, an obstacle, or the like, or distance measurement.

Application Example 2

The technology according to the present disclosure can be applied to various products. For example, the technology according to the present disclosure may be applied to an operating room system.

Figure 31:
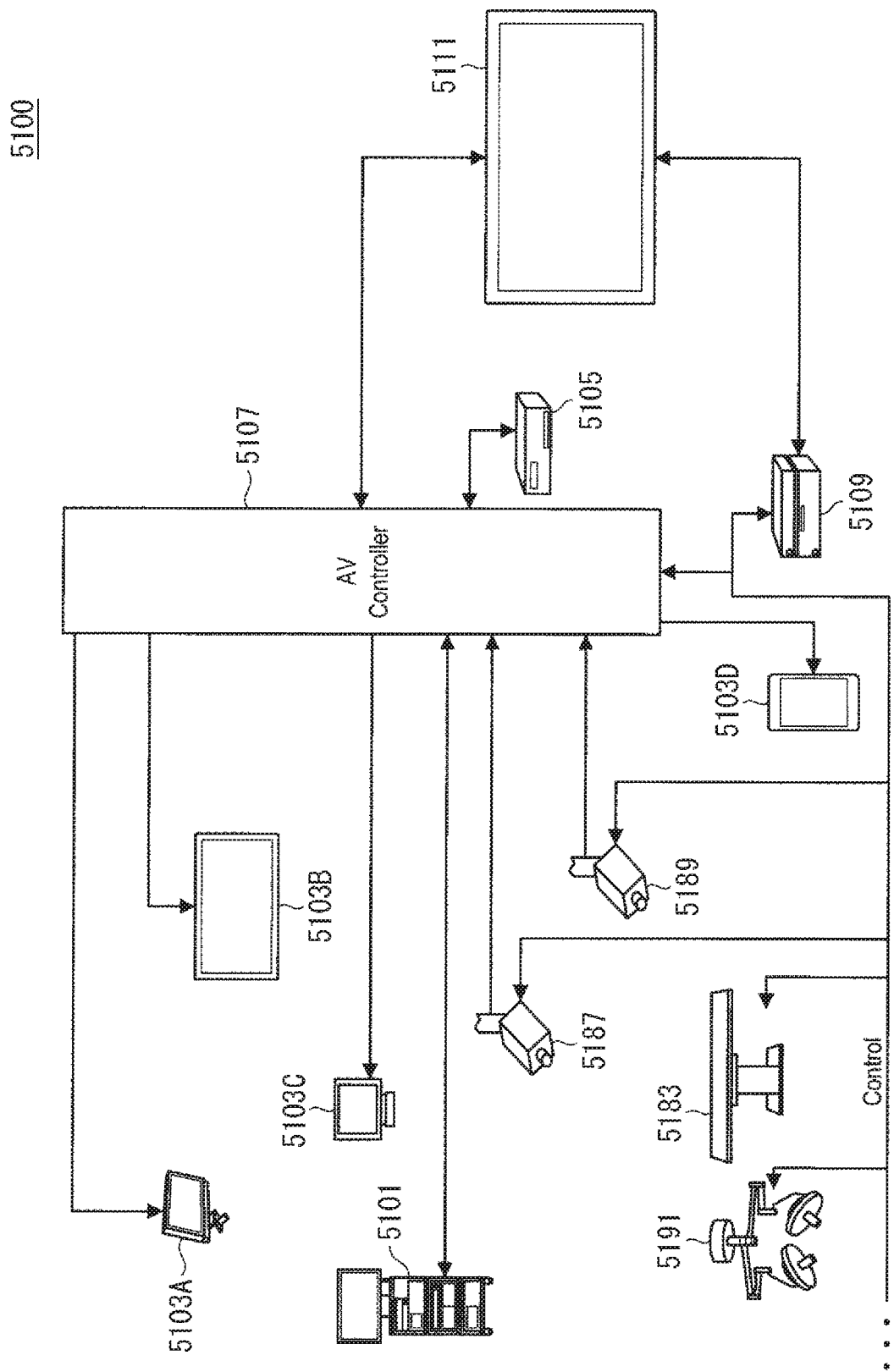
FIG. 31 is a diagram schematically illustrating an entire configuration of an operating room system.

FIG. 31 is a diagram schematically illustrating an entire configuration of an operating room system 5100 to which the technology according to the present disclosure can be applied. Referring to FIG. 31, the operating room system 5100 is configured by connecting devices of a device group installed in an operating room to each other via an audiovisual (AV) controller 5107 and an operating room control device 5109 so as to be able to cooperate with each other.

Various devices can be installed in the operating room. In FIG. 31, as an example, a device group 5101 of various devices for endoscopic surgery, a ceiling camera 5187 provided on the ceiling of the operating room and imaging the vicinity of an operator, an operating place camera 5189 provided on the ceiling of the operating room and imaging a state of the entire operating room, a plurality of display devices 5103A to 5103D, a recorder 5105, a patient bed 5183, and an illuminator 5191 are illustrated.

Here, the device group 5101 among these devices belongs to an endoscopic surgery system 5113 as described later, and includes an endoscope, a display device displaying an image captured by the endoscope, or the like. Each device belonging to the endoscopic surgery system 5113 is also called a medical device. Meanwhile, the display devices 5103A to 5103D, the recorder 5105, the patient bed 5183, and the illuminator 5191 are devices provided separately from the endoscopic surgery system 5113, for example, in the operating room. Each device that does not belong to the endoscopic surgery system 5113 is also called a non-medical device. The audiovisual controller 5107 and/or the operating room control device 5109 control operations of these medical devices and non-medical devices in cooperation with each other.

The audiovisual controller 5107 comprehensively controls processing related to an image display in the medical devices and the non-medical devices. Specifically, the device group 5101, the ceiling camera 5187, and the operating place camera 5189 among the devices provided in the operating room system 5100 can be devices (hereinafter, also referred to as transmission source devices) having a function of transmitting information to be displayed during surgery (hereinafter, also referred to as display information). Furthermore, the display devices 5103A to 5103D can be devices (hereinafter, also referred to as output destination devices) to which the display information is output. Furthermore, the recorder 5105 can be a device corresponding to both of the transmission source device and the output destination device. The audiovisual controller 5107 has a function of controlling operations of the transmission source device and the output destination device to acquire the display information from the transmission source device, transmit the display information to the output destination device, and cause the output destination device to display or record the display information. Note that the display information is various images captured during the surgery, various information regarding the surgery (for example, physical information of a patient, the past examination result, information about a surgical procedure, or the like), or the like.

Specifically, information about an image of a surgical site in a body cavity of the patient captured by the endoscope can be transmitted as the display information from the device group 5101 to the audiovisual controller 5107. Furthermore, information about an image of the vicinity of the operator captured by the ceiling camera 5187 may be transmitted as the display information from the ceiling camera 5187 to the audiovisual controller 5107. Furthermore, information about an image indicating the state of the entire operating room, captured by the operating place camera 5189 may be transmitted as the display information from the operating place camera 5189 to the audiovisual controller 5107. Note that in a case where another device having an imaging function exists in the operating room system 5100, the audiovisual controller 5107 may acquire information about an image captured by another device as the display information from another device.

Alternatively, for example, in the recorder 5105, information about these images captured in the past is recorded by the audiovisual controller 5107. The audiovisual controller 5107 can acquire the information about the images captured in the past from the recorder 5105 as the display information. Note that various information regarding the surgery may also be stored in the recorder 5105 in advance.

The audiovisual controller 5107 causes at least any one of the display devices 5103A to 5103D, which are the output destination devices, to display the acquired display information (that is, an image captured during the surgery and various information regarding the surgery). In the illustrated example, the display device 5103A is a display device installed so as to be suspended from the ceiling of the operating room, the display device 5103B is a display device installed on a wall of the operating room, the display device 5103C is a display device installed on a desk in the operating room, and the display device 5103D is a mobile device (for example, a tablet personal computer (PC)) having a display function.

Furthermore, although not illustrated in FIG. 31, the operating room system 5100 may include an external device of the operating room. The external device of the operating room can be, for example, a server connected to a network constructed inside or outside a hospital, a PC used by medical staff, a projector installed in a conference room of the hospital, and the like. In a case where such an external device is outside the hospital, the audiovisual controller 5107 can also cause a display device of another hospital to display the display information via a video conference system or the like for telemedicine.

The operating room control device 5109 comprehensively controls processing other than the processing related to the image display in the non-medical devices. For example, the operating room control device 5109 controls drive of the patient bed 5183, the ceiling camera 5187, the operating place camera 5189, and the illuminator 5191.

The operating room system 5100 is provided with a centralized operation panel 5111, and a user can give an instruction about the image display to the audiovisual controller 5107 and give an instruction about an operation of the non-medical device to the operating room control device 5109, via the centralized operation panel 5111. The centralized operation panel 5111 is configured by providing a touch panel on a display surface of a display device.

Figure 32:
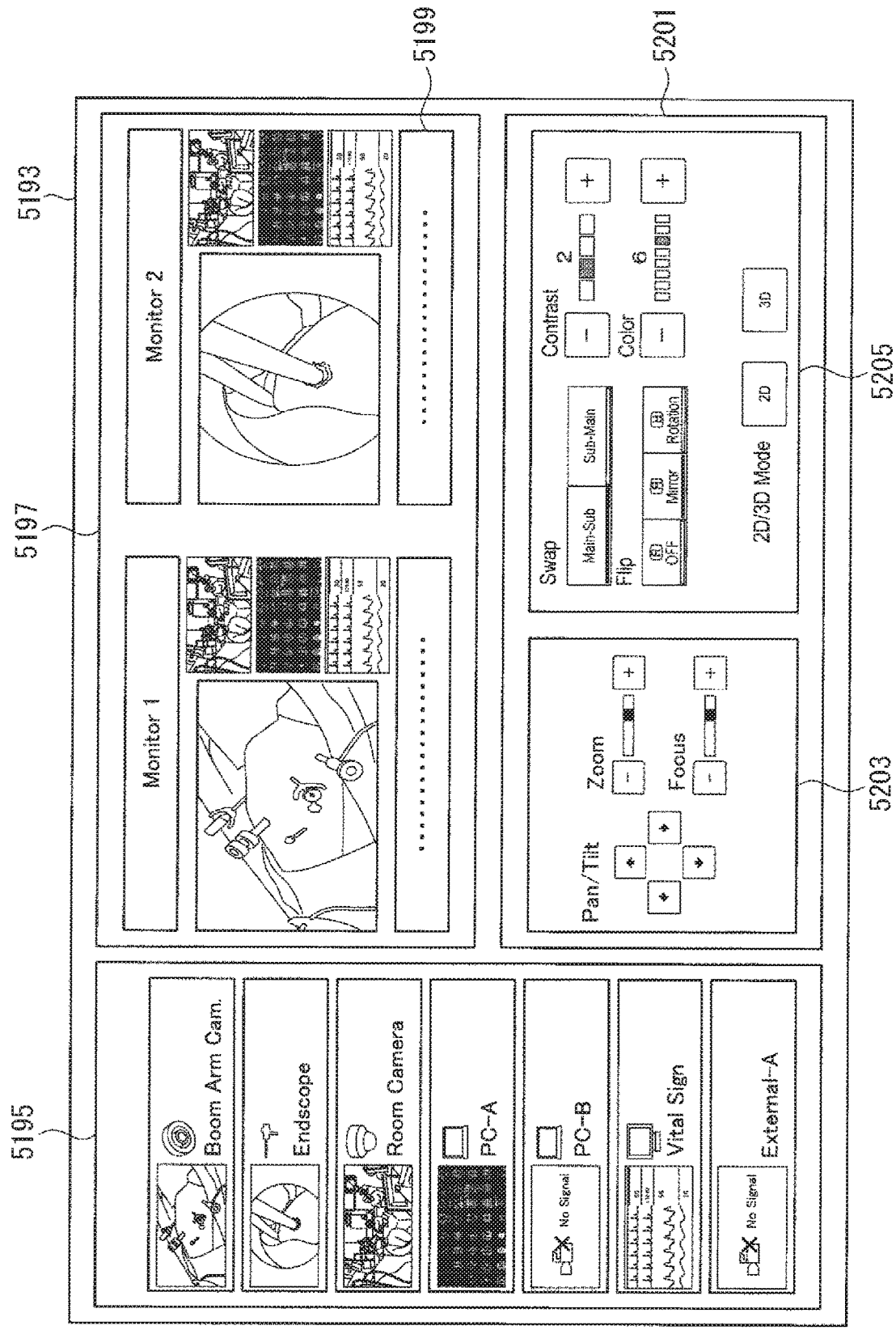
FIG. 32 is a diagram illustrating a display example of an operation screen on a centralized operation panel.

FIG. 32 is a diagram illustrating a display example of an operation screen on the centralized operation panel 5111. In FIG. 32, as an example, an operation screen corresponding to a case where the operating room system 5100 is provided with two display devices as the output destination devices is illustrated. Referring to FIG. 32, an operation screen 5193 is provided with a transmission source selection area 5195, a preview area 5197, and a control area 5201.

In the transmission source selection area 5195, the transmission source devices provided in the operating room system 5100 and thumbnail screens representing display information that the transmission source devices have are displayed in association with each other. The user can select display information that he/she wants to cause the display device to display from any one of the transmission source devices displayed in the transmission source selection area 5195.

In the preview area 5197, previews of screens displayed on the two display devices Monitor 1 and Monitor 2 which are the output destination devices are displayed. In the illustrated example, four images are displayed in a picture-in-picture (PinP) manner on one display device. The four images correspond to the display information transmitted from the transmission source device selected in the transmission source selection area 5195. One of the four images is displayed relatively large as a main image, and the remaining three images are displayed relatively small as sub-images. The user can replace the main image and the sub-images with each other by appropriately selecting an area where the four images are displayed. Furthermore, a status display area 5199 is provided below the area where the four images are displayed, and a status (for example, an elapse time of the surgery, physical information of a patient, or the like) related to the surgery can be appropriately displayed in the status display area 5199.

The control area 5201 includes a transmission source operation area 5203 in which graphical user interface (GUI) components for operating the transmission source device are displayed and an output destination operation area 5205 in which GUI components for operating the output destination device are displayed. In the illustrated example, the transmission source operation area 5203 is provided with GUI components for performing various operations (pan, tilt, and zoom) on a camera in the transmission source device having an imaging function. The user can operate an operation of the camera in the transmission source device by appropriately selecting these GUI components. Note that although not illustrated, in a case where the transmission source device selected in the transmission source selection area 5195 is the recorder (that is, in a case where an image recorded in the past in the recorder is displayed on the preview area 5197), the transmission source operation area 5203 can be provided with GUI components for performing operations such as reproduction, reproduction stop, rewind, fast forward, and the like, of the image.

Furthermore, the output destination operation area 5205 is provided with GUI components for performing various operations (swap, flip, color adjustment, contrast adjustment, and switching between a two-dimensional (2D) display and a three-dimensional (3D) display) for the display on the display device which is the output destination device. The user can operate the display on the display device by appropriately selecting these GUI components.

Note that the operation screen displayed on the centralized operation panel 5111 is not limited to the illustrated example, and the user may be able to input an operation for each device that is provided in the operating room system 5100 and can be controlled by the audiovisual controller 5107 and the operating room control device 5109, via the centralized operation panel 5111.

Figure 33:
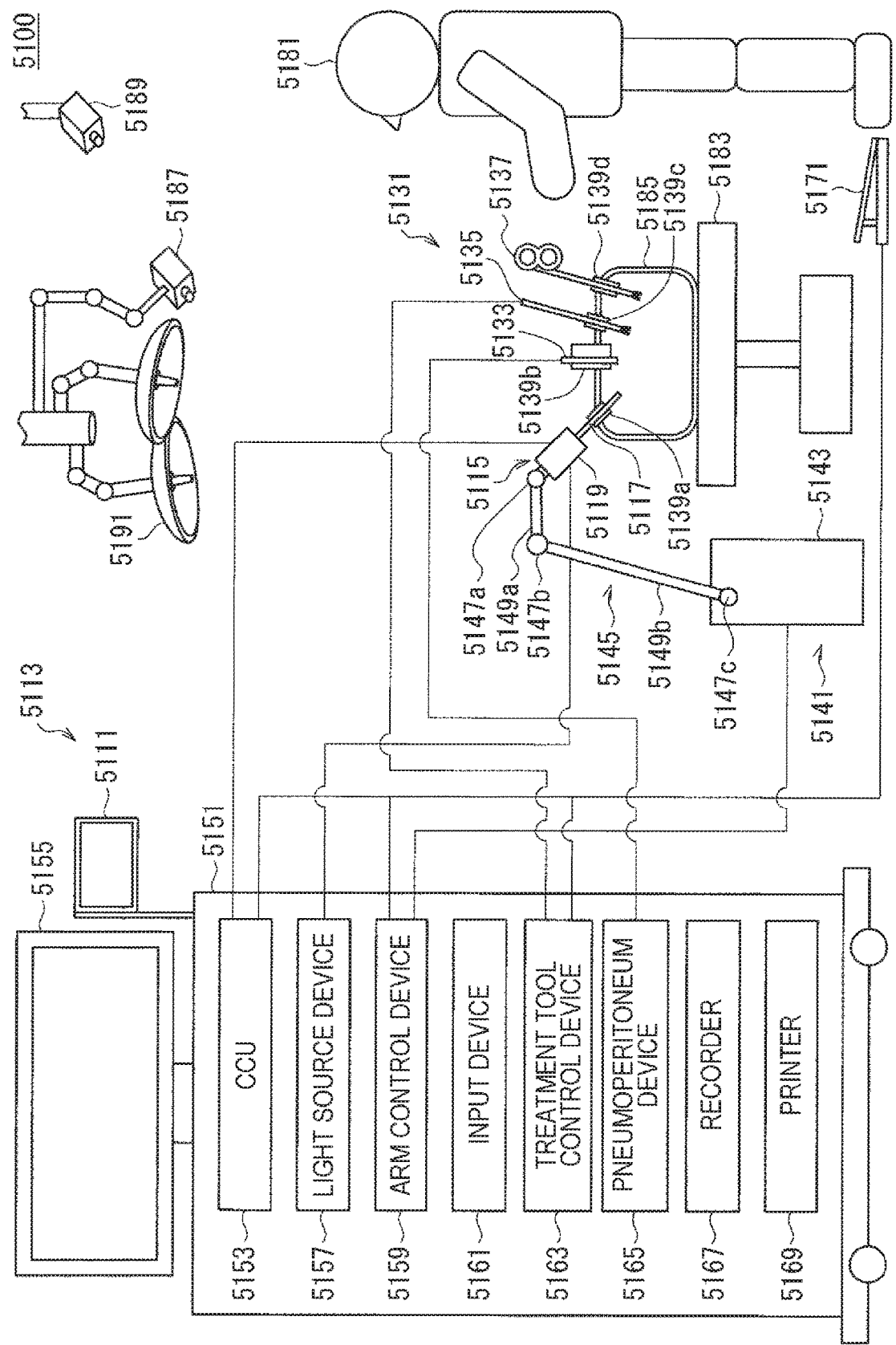
FIG. 33 is a diagram illustrating an example of a state of surgery to which the operating room system is applied.

FIG. 33 is a diagram illustrating an example of a state of surgery to which the operating room system described above is applied. The ceiling camera 5187 and the operating place camera 5189 are provided on the ceiling of the operating room, and can image the vicinity of an operator (surgeon) 5181 who performs a treatment on the affected part of a patient 5185 on the patient bed 5183 and the state of the entire operating room, respectively. The ceiling camera 5187 and the operating place camera 5189 can be provided with a magnification adjustment function, a focal length adjustment function, an imaging direction adjustment function, and the like. The illuminator 5191 is provided on the ceiling of the operating room and irradiates light to at least the vicinity of the operator 5181. The illuminator 5191 may be able to appropriately adjust an amount of irradiated light, a wavelength (color) of the irradiated light, an irradiation direction of the light, and the like.

The endoscopic surgery system 5113, the patient bed 5183, the ceiling camera 5187, the operating place camera 5189, and the illuminator 5191 are connected to each other via the audiovisual controller 5107 and the operating room control device 5109 (which are not illustrated in FIG. 33) so as to be able to cooperate with each other, as illustrated in FIG. 31. The centralized operation panel 5111 is provided in the operating room, and as described above, the user can appropriately operate these devices existing in the operating room via the centralized operation panel 5111.

Hereinafter, a configuration of the endoscopic surgery system 5113 will be described in detail. As illustrated in FIG. 33, the endoscopic surgery system 5113 includes an endoscope 5115, other surgical tools 5131, a support arm device 5141 supporting the endoscope 5115, and a cart 5151 on which various devices for endoscopic surgery are mounted.

In the endoscopic surgery, a plurality of tubular opening tools called trocars 5139a to 5139d is punctured into the abdominal wall instead of cutting the abdominal wall to open the abdomen. Then, a lens barrel 5117 of the endoscope 5115 and other surgical tools 5131 are inserted from the trocars 5139a to 5139d into the body cavity of the patient 5185. In the illustrated example, a pneumoperitoneum tube 5133, an energy treatment tool 5135, and forceps 5137 are inserted as other surgical tools 5131 into the body cavity of the patient 5185. Furthermore, the energy treatment tool 5135 is a treatment tool performing incision and ablation of a tissue, sealing of blood vessels, or the like, by using a high-frequency current and ultrasonic vibrations. However, the illustrated surgical tool 5131 is merely an example, and various surgical tools generally used in the endoscopic surgery, such as, for example, tweezers, a retractor and the like, may be used as the surgical tool 5131.

An image of the surgical site in the body cavity of the patient 5185 captured by the endoscope 5115 is displayed on a display device 5155. The operator 5181 performs a treatment such as, for example, excision of the affected part, or the like, using the energy treatment tool 5135 or the forceps 5137 while viewing the image of the surgical site displayed on the display device 5155 in real time. Note that although not illustrated, the pneumoperitoneum tube 5133, the energy treatment tool 5135, and the forceps 5137 are supported by the operator 5181, an assistant or the like during the surgery.

(Support Arm Device)

The support arm device 5141 includes an arm portion 5145 extending from a base portion 5143. In the illustrated example, the arm portion 5145 includes joint portions 5147a, 5147b, and 5147c, and links 5149a and 5149b, and is driven by control of an arm control device 5159. The endoscope 5115 is supported by the arm portion 5145, such that a position and a posture of the endoscope 5115 are controlled. Therefore, stable fixing of the position of the endoscope 5115 can be realized.

(Endoscope)

The endoscope 5115 includes the lens barrel 5117 whose region of a predetermined length from a tip is inserted into the body cavity of the patient 5185, and a camera head 5119 connected to a base end of the lens barrel 5117. The endoscope 5115 configured as a so-called rigid scope having a rigid lens barrel 5117 is illustrated in the illustrated example, but the endoscope 5115 may be configured as a so-called flexible scope having a flexible lens barrel 5117.

An opening into which an objective lens is fitted is provided at the tip of the lens barrel 5117. A light source device 5157 is connected to the endoscope 5115, such that light generated by the light source device 5157 is guided up to the tip of the lens barrel by a light guide extended inside the lens barrel 5117 and is irradiated toward an observation target in the body cavity of the patient 5185 via the objective lens. Note that the endoscope 5115 may be a forward-viewing endoscope or may be an oblique-viewing endoscope or a side-viewing endoscope.

An optical system and an imaging element are provided inside the camera head 5119, and reflected light (observation light) from the observation target is collected on the imaging element by the optical system. The observation light is photoelectrically converted by the imaging element, such that an electric signal corresponding to the observation light, that is, an image signal corresponding to an observation image is generated. The image signal is transmitted as RAW data to a camera control unit (CCU) 5153. Note that the camera head 5119 has a function of adjusting a magnification and a focal length by appropriately driving the optical system.

Note that the camera head 5119 may be provided with a plurality of imaging elements in order to support, for example, stereoscopic vision (3D display) and the like. In this case, a plurality of relay optical systems is provided inside the lens barrel 5117 in order to guide observation light to each of the plurality of imaging elements.

(Various Devices Mounted on Cart)

The CCU 5153 includes a CPU, a graphics processing unit (GPU), or the like, and comprehensively controls operations of the endoscope 5115 and the display device 5155. Specifically, the CCU 5153 performs various image processing for displaying an image based on the image signal, such as, for example, development processing (demosaic processing) and the like, on the image signal received from the camera head 5119. The CCU 5153 provides the image signal on which the image processing is performed to the display device 5155. Furthermore, the CCU 5153 is connected to the audiovisual controller 5107 illustrated in FIG. 31. The CCU 5153 also provides the image signal on which the image processing is performed to the audiovisual controller 5107. Furthermore, the CCU 5153 transmits a control signal to the camera head 5119 to control drive of the camera head 5119. The control signal can include information regarding an imaging condition such as a magnification, a focal length or the like. The information regarding the imaging condition may be input via an input device 5161 or may be input via the centralized operation panel 5111 described above.

The display device 5155 displays the image based on the image signal on which the image processing is performed by the CCU 5153, under control of the CCU 5153. In a case where the endoscope 5115 is an endoscope corresponding to imaging of high resolution such as, for example, 4K (3840 horizontal pixels×2160 vertical pixels), 8K (7680 horizontal pixels×4320 vertical pixels), or the like and/or in a case where the endoscope 5115 is an endoscope corresponding to a 3D display, a display device capable of a high resolution display and/or a display device capable of the 3D display can be used as the display device 5155, so as to correspond to these cases, respectively. In a case where the endoscope 5115 is the endoscope corresponding to the imaging of the high resolution such as 4K, 8K, or the like, a more immersive feeling can be obtained by using a display device having a size of 55 inches or more as the display device 5155. Furthermore, a plurality of display devices 5155 having different resolutions and sizes may be provided depending on a purpose.

The light source device 5157 includes a light source such as, for example, a light emitting diode (LED) or the like, and supplies irradiated light to the endoscope 5115 at the time of imaging the surgical site.

The arm control device 5159 includes a processor such as, for example, a CPU, and operates according to a predetermined program to control the drive of the arm portion 5145 of the support arm device 5141 according to a predetermined control manner.

The input device 5161 is an input interface for the endoscopic surgery system 5113. The user can input various information or various instructions to the endoscopic surgery system 5113 via the input device 5161. For example, the user inputs various information regarding the surgery, such as physical information of the patient, information about a surgical procedure, or the like, via the input device 5161. Furthermore, for example, the user inputs an instruction to drive the arm portion 5145, an instruction to change the imaging condition (a type of irradiated light, a magnification, a focal length, and the like) by the endoscope 5115, an instruction to drive the energy treatment tool 5135, or the like, via the input device 5161.

A type of the input device 5161 is not limited, and the input device 5161 may be various known input devices. As the input device 5161, for example, a mouse, a keyboard, a touch panel, a switch, a foot switch 5171, a lever, or the like, can be applied. In a case where the touch panel is used as the input device 5161, the touch panel may be provided on a display surface of the display device 5155.

Alternatively, the input device 5161 is a device worn by the user, such as, for example, a glasses-type wearable device, a head mounted display (HMD) or the like, and various inputs are performed according to a gesture or a line-of-sight of the user detected by these devices. Furthermore, the input device 5161 includes a camera capable of detecting movement of the user, and various inputs are performed according to a gesture or a line-of-sight of the user detected from a video captured by the camera. Moreover, the input device 5161 includes a microphone capable of collecting a voice of the user, and various inputs are performed by the voice via the microphone. As described above, the input device 5161 is configured to be able to input various information in a non-contact manner, such that in particular, a user belonging to a clean area (for example, the operator 5181) can operate a device belonging to an unclean area in a non-contact manner. Furthermore, since the user can operate the device without releasing his/her hand from the surgical tool that he/she possesses, convenience for the user is improved.

A treatment tool control device 5163 controls the drive of the energy treatment tool 5135 for cautery and incision of tissue, sealing of a blood vessel, or the like. A pneumoperitoneum device 5165 sends a gas into the body cavity of the patient 5185 via the pneumoperitoneum tube 5133 in order to inflate the body cavity of the patient 5185 for the purpose of securing a visual field by the endoscope 5115 and securing a working space of the operator. A recorder 5167 is a device capable of recording various information regarding the surgery. A printer 5169 is a device capable of printing the various information regarding the surgery in various formats such as a text, an image, a graph, or the like.

Hereinafter, a particularly characteristic configuration of the endoscopic surgery system 5113 will be described in more detail.

(Support Arm Device)

The support arm device 5141 includes the base portion 5143, which is a base, and the arm portion 5145 extending from the base portion 5143. In the illustrated example, the arm portion 5145 includes a plurality of joint portions 5147a, 5147b, and 5147c and a plurality of links 5149a and 5149b connected to each other by the joint portion 5147b, and in FIG. 33, a configuration of the arm portion 5145 is illustrated in a simplified form for simplicity. Actually, shapes, the numbers, and arrangements of the joint portions 5147a to 5147c and the links 5149a and 5149b, directions of rotation axes of the joint portions 5147a to 5147c, and the like, can be appropriately set so that the arm portion 5145 has a desired degree of freedom. For example, the arm portion 5145 can be preferably configured to have six or more degrees of freedom. Therefore, it becomes possible to freely move the endoscope 5115 within a movable range of the arm portion 5145, and it becomes thus possible to insert the lens barrel 5117 of the endoscope 5115 into the body cavity of the patient 5185 from a desired direction.

The joint portions 5147a to 5147c are provided with actuators, and the joint portions 5147a to 5147c are configured to be rotatable around predetermined rotation axes by drive of the actuators. By controlling the drive of the actuators by the arm control device 5159, rotation angles of the joint portions 5147a to 5147c are controlled, such that the drive of the arm portion 5145 is controlled. Therefore, the control of the position and the posture of the endoscope 5115 can be realized. At this time, the arm control device 5159 can control the drive of the arm portion 5145 by various known control manners such as force control, position control or the like.

For example, the operator 5181 appropriately performs an operation input via the input device 5161 (including the foot switch 5171) to allow the drive of the arm portion 5145 to be appropriately controlled by the arm control device 5159 according to the operation input, such that the position and the posture of the endoscope 5115 may be controlled. With this control, it is possible to move the endoscope 5115 of a tip of the arm portion 5145 from an arbitrary position to an arbitrary position and then fixedly support the endoscope 5115 at the position after the movement. Note that the arm portion 5145 may be operated in a so-called master slave manner. In this case, the arm portion 5145 can be remotely controlled by the user via the input device 5161 installed at a place spaced apart from the operating room.

Furthermore, in a case where the force control is applied, the arm control device 5159 may receive an external force from the user, and perform so-called power assist control to drive the actuators of each of the joint portions 5147a to 5147c so that the arm portion 5145 smoothly moves according to the external force. Therefore, when the user moves the arm portion 5145 while directly touching the arm portion 5145, he/she can move the arm portion 5145 with a relatively small force. Accordingly, it becomes possible to move the endoscope 5115 more intuitively and with a simpler operation, such that convenience of the user can be improved.

Here, generally, in the endoscopic surgery, the endoscope 5115 has been supported by a doctor called a scopist. On the other hand, by using the support arm device 5141, the position of the endoscope 5115 can be fixed more certainly without depending on manpower. Therefore, an image of the surgical site can be stably obtained, such that the surgery can be smoothly performed.

Note that the arm control device 5159 does not need to be necessarily provided in the cart 5151. Furthermore, the arm control device 5159 does not need to be necessarily one device. For example, the arm control device 5159 may be provided in each of the joint portions 5147a to 5147c of the arm portion 5145 of the support arm device 5141, and the drive control of the arm portion 5145 may be realized by cooperation between the plurality of arm control devices 5159.

(Light Source Device)

The light source device 5157 supplies irradiated light to the endoscope 5115 at the time of imaging the surgical site. The light source device 5157 includes, for example, a white light source including an LED, a laser light source, or a combination thereof. At this time, in a case where the white light source by a combination of RGB laser light sources is configured, it is possible to control an output intensity and an output timing of each color (each wavelength) with high accuracy, and it is thus possible to adjust a white balance of a captured image in the light source device 5157. Furthermore, in this case, by irradiating laser light from each of the RGB laser light sources to an observation target in a time division manner and controlling the drive of the imaging element of the camera head 5119 in synchronization with an irradiation timing of the laser light, it is also possible to capture images corresponding to each of RGB in a time division manner. According to such a method, it is possible to obtain a color image without providing a color filter to the imaging element.

Furthermore, the drive of the light source device 5157 may be controlled so as to change an intensity of light output by the light source device 5157 every predetermined time. By controlling the drive of the imaging element of the camera head 5119 in synchronization with a timing of the change in the intensity of the light to acquire images in a time division manner and synthesizing the images with each other, it is possible to generate a high dynamic range image without a so-called black spot and white spot.

Furthermore, the light source device 5157 may be configured to be able to supply light of a predetermined wavelength band corresponding to special light observation. In the special light observation, for example, so-called narrow band imaging in which a predetermined tissue such as a blood vessel or the like in a mucous membrane surface layer is imaged with high contrast by irradiating light of a narrow band as compared with irradiated light (that is, white light) at the time of normal observation using wavelength dependency of absorption of light in a body tissue is performed. Alternatively, in the special light observation, fluorescence observation in which an image is obtained by fluorescence generated by irradiating excitation light may be performed. In the fluorescence observation, it can be performed to irradiate excitation light to a body tissue and observe fluorescence from the body tissue (self-fluorescence observation) or locally inject a reagent such as indocyanine green (ICG) or the like to the body tissue and irradiate excitation light corresponding to a fluorescence wavelength of the reagent to the body tissue to obtain a fluorescence image. The light source device 5157 can be configured to be able to supply the light of the narrow band and/or the excitation light corresponding to such special light observation.

(Camera Head and CCU)

Figure 34:
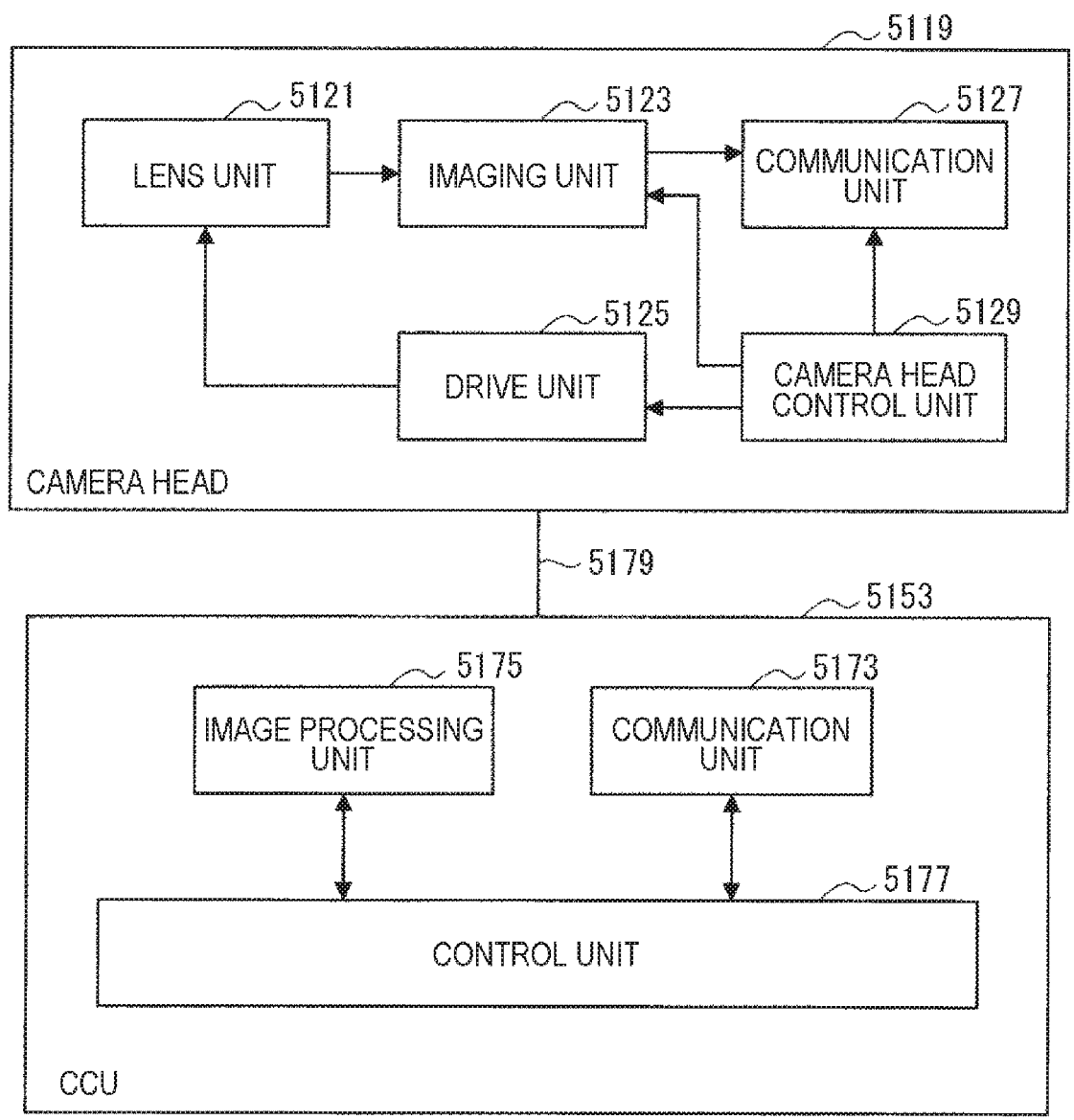
FIG. 34 is a block diagram illustrating an example of functional configurations of a camera head and a camera control unit (CCU) illustrated in FIG. 33.

Functions of the camera head 5119 of the endoscope 5115 and the CCU 5153 will be described in more detail with reference to FIG. 34. FIG. 34 is a block diagram illustrating an example of functional configurations of the camera head 5119 and the CCU 5153 illustrated in FIG. 33.

Referring to FIG. 34, the camera head 5119 includes a lens unit 5121, an imaging unit 5123, a drive unit 5125, a communication unit 5127, and a camera head control unit 5129 as its functions. Furthermore, the CCU 5153 includes a communication unit 5173, an image processing unit 5175, and a control unit 5177 as its functions. The camera head 5119 and the CCU 5153 are bi-directionally communicably connected to each other by a transmission cable 5179.

First, a functional configuration of the camera head 5119 will be described. The lens unit 5121 is an optical system provided at a connected portion with the lens barrel 5117. Observation light taken in from the tip of the lens barrel 5117 is guided to the camera head 5119 and is incident on the lens unit 5121. The lens unit 5121 is configured by combining a plurality of lenses including a zoom lens and a focus lens with each other. Optical characteristics of the lens unit 5121 are adjusted so that the observation light is condensed on a light receiving surface of the imaging element of the imaging unit 5123. Furthermore, the zoom lens and the focus lens are configured so that positions of the zoom lens and the focus lens on an optical axis are movable for adjusting a magnification and a focus of a captured image.

The imaging unit 5123 includes an imaging element, and is arranged at a subsequent stage of the lens unit 5121. The observation light that has passed through the lens unit 5121 is condensed on the light receiving surface of the image sensor, and an image signal corresponding to an observation image is generated by photoelectric conversion of the observation light. The image signal generated by the imaging unit 5123 is provided to the communication unit 5127.

As the imaging element configuring the imaging unit 5123, for example, an image element that is a complementary metal oxide semiconductor (CMOS)-type image sensor and has a Bayer array and can perform color imaging is used. Note that, as the imaging element, an imaging element capable of capturing an image having high resolution of, for example, 4K or more may be used. The image of the surgical site is obtained with high resolution, such that the operator 5181 can grasp the state of the surgical site in more detail and can thus perform the surgery more smoothly.

Furthermore, the imaging element configuring the imaging unit 5123 may include a pair of imaging elements for acquiring respectively image signals for a right eye and a left eye corresponding to a 3D display. By performing the 3D display, the operator 5181 can more accurately grasp a depth of a biological tissue in the surgical site. Note that in a case where the imaging unit 5123 is configured in the multi-plate type, a plurality of lens units 5121 is also provided to correspond to the respective imaging elements.

Furthermore, the imaging unit 5123 does not need to be necessarily provided in the camera head 5119. For example, the imaging unit 5123 may be provided immediately after the objective lens, inside the lens barrel 5117.

The drive unit 5125 includes an actuator, and moves the zoom lens and the focus lens of the lens unit 5129 by a predetermined distance along the optical axis under control of the camera head control unit 5121. Therefore, a magnification and a focus of the captured image by the imaging unit 5123 can be appropriately adjusted.

The communication unit 5127 includes a communication device for transmitting and receiving various information to and from the CCU 5153. The communication unit 5127 transmits the image signal obtained from the imaging unit 5123 as RAW data to the CCU 5153 via the transmission cable 5179. At this time, it is preferable that the image signal is transmitted by optical communication in order to display a captured image of the surgical site with low latency. This is because the operator 5181 performs the surgery while observing a state of the affected part by the captured image at the time of the surgery, and it is thus required that a moving image of the surgical site is displayed in real time as much as possible for safer and more certain surgery. In a case where the optical communication is performed, the communication unit 5127 is provided with a photoelectric conversion module converting an electric signal into an optical signal. After the image signal is converted into an optical signal by the photoelectric conversion module, the image signal is transmitted to the CCU 5153 via the transmission cable 5179.

Furthermore, the communication unit 5127 receives the control signal for controlling the drive of the camera head 5119 from the CCU 5153. The control signal includes, for example, information regarding imaging conditions such as information indicating that a frame rate of the captured image is designated, information indicating that an exposure value at the time of capturing the image is designated, information indicating that a magnification and a focus of the captured image are designated, and the like. The communication unit 5127 provides the received control signal to the camera head control unit 5129. Note that the control signal from the CCU 5153 may also be transmitted by the optical communication. In this case, the communication unit 5127 is provided with a photoelectric conversion module converting an optical signal into an electric signal, and the control signal is converted into an electric signal by the photoelectric conversion module and is then provided to the camera head control unit 5129.

Note that the imaging conditions such as the frame rate, the exposure value, the magnification, the focus, and the like, described above are automatically set by the control unit 5177 of the CCU 5153 on the basis of the acquired image signal. That is, a so-called auto exposure (AE) function, an auto focus (AF) function, and an auto white balance (AWB) function are mounted in the endoscope 5115.

The camera head control unit 5129 controls the drive of the camera head 5119 on the basis of the control signal from the CCU 5153 received via the communication unit 5127. For example, the camera head control unit 5129 controls the drive of the imaging element of the imaging unit 5123 on the basis of the information indicating that the frame rate of the captured image is designated and/or information indicating that exposure at the time of capturing the image is designated. Furthermore, for example, the camera head control unit 5129 appropriately moves the zoom lens and the focus lens of the lens unit 5121 via the drive unit 5125 on the basis of the information indicating that the magnification and the focus of the captured image are designated. The camera head control unit 5129 may further have a function of storing information for identifying the lens barrel 5117 or the camera head 5119.

Note that by arranging a configuration such as the lens unit 5121 or the imaging unit 5123 or the like in a sealing structure having high airtightness and waterproofness, it is possible to cause the camera head 5119 to have resistance to autoclave sterilization.

Next, a functional configuration of the CCU 5153 will be described. The communication unit 5173 includes a communication device for transmitting and receiving various information to and from the camera head 5119. The communication unit 5173 receives the image signal transmitted from the camera head 5119 via the transmission cable 5179. At this time, as described above, the image signal can be preferably transmitted by the optical communication. In this case, the communication unit 5173 is provided with a photoelectric conversion module converting an optical signal into an electric signal so as to correspond to the optical communication. The communication unit 5173 provides the image signal converted into the electric signal to the image processing unit 5175.

Furthermore, the communication unit 5173 transmits the control signal for controlling the drive of the camera head 5119 to the camera head 5119. The control signal may also be transmitted by the optical communication.

The image processing unit 5175 performs various image processing on the image signal, which is the RAW data transmitted from the camera head 5119. The image processing includes, for example, various known signal processing such as development processing, image quality improvement processing (band emphasis processing, super-resolution processing, noise reduction (NR) processing, and/or camera shake correction processing, and the like), and/or enlargement processing (electronic zoom processing), and the like. Furthermore, the image processing unit 5175 performs detection processing on the image signal for performing AE, AF, and AWB.

The image processing unit 5175 includes a processor such as a CPU, a GPU or the like, and the image processing or the detection processing described above can be performed by operating the processor according to a predetermined program. Note that in a case where the image processing unit 5175 includes a plurality of GPUs, the image processing unit 5175 appropriately divides information regarding the image signal, and performs image processing in parallel by the plurality of GPUs.

The control unit 5177 performs various controls related to the imaging of the surgical site by the endoscope 5115 and a display of the captured image. For example, the control unit 5177 generates the control signal for controlling the drive of the camera head 5119. At this time, in a case where the imaging condition is input by the user, the control unit 5177 generates the control signal on the basis of the input by the user. Alternatively, in a case where the endoscope 5115 has the AE function, the AF function, and the AWB function, the control unit 5177 appropriately calculates an optimal exposure value, focal length, and white balance according to a result of the detection processing by the image processing unit 5175 and generates the control signal.

Furthermore, the control unit 5177 causes the display device 5155 to display the image of the surgical site on the basis of the image signal on which the image processing is performed by the image processing unit 5175. At this time, the control unit 5177 recognizes various objects in the image of the surgical site using various image recognition technologies. For example, the control unit 5177 can recognize a surgical tool such as forceps or the like, a specific biological site, bleeding, mist at the time of using the energy treatment tool 5135, and the like, by detecting a shape, a color or the like of an edge of an object included in the image of the surgical site. The control unit 5177 causes various surgical support information to be superimposed and displayed on the image of the surgical site using a result of the recognition, when the control unit 5177 causes the display device 5155 to display the image of the surgical site. The surgical support information is superimposed and displayed and is provided to the operator 5181, such that it becomes possible to more safely and certainly perform the surgery.

The transmission cable 5179 connecting the camera head 5119 and the CCU 5153 to each other is an electric signal cable corresponding to communication of an electric signal, an optical fiber corresponding to optical communication, or a composite cable of the electric signal cable and the optical fiber.

Here, communication has been performed in a wired manner using the transmission cable 5179 in the illustrated example, but communication between the camera head 5119 and the CCU 5153 may be performed in a wireless manner. In a case where the communication between the camera head 5119 and the CCU 5153 is performed in the wireless manner, it is not necessary to lay the transmission cable 5179 in the operating room, and a situation where movement of medical staff in the operating room is hindered by the transmission cable 5179 can thus be solved.

An example of the operating room system 5100 to which the technology according to the present disclosure can be applied has been described hereinabove. Note that here, a case where a medical system to which the operating room system 5100 is applied is the endoscopic surgery system 5113 has been described as an example, but a configuration of the operating room system 5100 is not limited to such an example. For example, the operating room system 5100 may be applied to a flexible endoscopic system for examination or a microsurgery system instead of the endoscopic surgery system 5113.

The camera system according to the present embodiment described with reference to FIGS. 1, 2, 3, 4, 5, 6A, 6B, 7, 8, 9A, 9B, 10, 11A, 11B, 11C, 12, 13, 14, 15, 16, 17, 18, 19, 20, 21, 22, 23, 24, 25, 26, and 27 can be preferably applied to the ceiling camera 5187, the operating place camera 5189, and the camera head 5119 of the endoscope 5115 among the configurations described above. By applying the technology according to the present disclosure to the ceiling camera 5187, the operating place camera 5189, and the camera head 5119 of the endoscope 5115, it is possible to accurately observe hemoglobin in blood or accurately measure depths of internal organs, or the like.

Note that in the present specification, the system means a set of a plurality of components (devices, modules (parts), or the like), and it does not matter whether or not all the components are in the same housing. Therefore, both of a plurality of devices housed in separate housings and connected to each other through a network and one device in which a plurality of modules is housed in one housing are systems.

Furthermore, effects described in the present specification are merely examples and are not limited, and other effects may be provided.

The embodiments of the present technology are not limited to the embodiments described above, and various modifications can be made without departing from the scope of the present technology.

Note that the present technology can also have the following configuration.

(1)

An imaging device including:

an imaging unit that images a subject; and an image generating unit that generates an image of the subject on the basis of pixel signals obtained by performing imaging in a state where light of a predetermined pattern from a structured light (SL) light source is irradiated to projection areas of specific pixels of the imaging unit.

(2)

The imaging device according to the above (1), in which the predetermined pattern is a dot pattern including dots irradiated to the projection areas of the specific pixels.

(3)

The imaging device according to the above (1) or (2), in which the image generating unit generates the image of the subject on the basis of pixel signals obtained by performing the imaging in a state where IR light is irradiated from the SL light source to projection areas of IR pixels.

(4)

The imaging device according to the above (3), in which the image generating unit generates an IR image on the basis of signals from the IR pixels to which the IR light from the SL light source is irradiated, and generates a visible image on the basis of signals from pixels to which the IR light is not irradiated.

(5)

The imaging device according to the above (1) or (2), in which the image generating unit generates the image of the subject on the basis of pixel signals obtained by performing the imaging in a state where light of predetermined patterns from a plurality of the SL light sources having different wavelength bands is each irradiated from the plurality of SL light sources to projection areas of pixels to which the plurality of SL light sources corresponds, respectively.

(6)

The imaging device according to the above (1) or (2), in which the image generating unit generates the image of the subject on the basis of pixel signals obtained by performing the imaging in a state where IR light is irradiated from the SL light source to projection areas of TOF pixels.

(7)

The imaging device according to the above (6), in which the image generating unit calculates a distance for AF control on the basis of signals from the TOF pixels to which the IR light from the SL light source is irradiated, and generates a visible image on the basis of signals from pixels to which the IR light is not irradiated.

(8)

The imaging device according to the above (1) or (2), in which the image generating unit generates the image of the subject on the basis of pixel signals obtained by performing the imaging in a state where IR light is irradiated from the SL light source to projection areas of pixels for triangulation.

(9)

The imaging device according to the above (8), in which the image generating unit calculates a distance for AF control on the basis of signals from the pixels for triangulation to which the IR light from the SL light source is irradiated, and generates a visible image on the basis of signals from pixels to which the IR light is not irradiated.

(10)

The imaging device according to any one of the above (1) to (9), in which the SL light source is arranged close to a lens of the imaging unit.

(11)

The imaging device according to any one of the above (1) to (10), further including a light irradiating unit that becomes the SL light source.

(12)

The imaging device according to the above (11), further including a mirror that reflects light irradiated from the light irradiating unit and transmits light reflected in the projection areas of the pixels, in order to make an irradiation area boundary of the light irradiating unit substantially coincide with an angle of view of the imaging unit.

(13)

The imaging device according to the above (11), in which the light irradiating unit includes a diffraction grating on a front surface thereof.

(14)

The imaging device according to any one of the above (11) to (13), in which the light irradiating unit is configured integrally with the imaging device.

(15)

The imaging device according to any one of the above (11) to (13), in which the light irradiating unit is replaceably mounted on the imaging device.

REFERENCE SIGNS LIST

1 Camera system

11 IR light irradiating device

11A IR light irradiating unit
12 Imaging device
21 Laser light source
22 Diffraction grating
31 Optical system
32 Image sensor
33 Image generating unit
41 Signal separating unit
42-1 Visible signal interpolation processing unit
42-2 IR signal interpolation processing unit
43-1 Visible signal image quality improvement signal processing unit
43-2 IR signal image quality improvement signal processing section
51 Camera system
61 Light irradiating device
61A-1 to 61A-4 Light irradiating unit
62 Imaging device
71 Optical system
72 Image sensor
73 Image generating unit
81 Signal separating unit
82-1 to 82-4 Signal interpolation processing unit
83-1 to 83-4 Image quality improvement signal processing unit

The invention claimed is:

1. An imaging device, comprising:
a camera; and
at least one processor configured to:
control a structured light (SL) light source to irradiate only specific projection areas, corresponding to a plurality of IR pixels of a plurality of pixels of the camera, with infrared (IR) light of a specific pattern;
calculate a distance for auto focus (AF) control based on signals from both time of flight (TOF) pixels and triangulation pixels simultaneously, wherein
the plurality of IR pixels comprises the TOF pixels and the triangulation pixels, and
the TOF pixels and the triangulation pixels are irradiated by the IR light from the SL light source;
control a position of a lens of the camera based on the calculated distance;
generate an IR image based on signals from the plurality of IR pixels; and
generate a visible image based on signals from a plurality of non-IR pixels of the plurality of pixels to which the IR light is not irradiated.

2. The imaging device according to claim 1, wherein the specific pattern is a dot pattern which includes a plurality of dots irradiated to the specific projection areas corresponding to the plurality of IR pixels.

3. The imaging device according to claim 1, wherein
an image of a subject is based on IR light of specific patterns from a plurality of the SL light sources having different wavelength bands, and
each IR light is irradiated from each SL light source of the plurality of SL light sources to a specific projection area corresponding to an IR pixel of the plurality of IR pixels.

4. The imaging device according to claim 1, wherein the IR light is irradiated from the SL light source to projection areas of the TOF pixels.

5. The imaging device according to claim 1, wherein the least one processor is further configured to generate an image of a subject based on the signals from the plurality of IR pixels obtained by the imaging based on the irradiation of the IR light from the SL light source to the specific projection areas of the plurality of IR pixels for triangulation.

6. The imaging device according to claim 1, wherein the SL light source is arranged close to the lens of the camera.

7. The imaging device according to claim 1, further comprising a light irradiating device configured to function as the SL light source.

8. The imaging device according to claim 7, further comprising a mirror configured to:
reflect light irradiated from the light irradiating device, and
transmit the light reflected in the specific projection areas corresponding to the plurality of IR pixels and projection areas corresponding to the plurality of non-IR pixels, to make an irradiation area boundary of the light irradiating device substantially coincide with an angle of view of the camera.

9. The imaging device according to claim 7, wherein the light irradiating device comprises a diffraction grating.

10. The imaging device according to claim 7, wherein the light irradiating device is configured integrally with the imaging device.

11. The imaging device according to claim 7, wherein the light irradiating device is replaceably mounted on the imaging device.

* * * * *